(12) United States Patent
Kuromizu et al.

(10) Patent No.: US 8,480,288 B2
(45) Date of Patent: Jul. 9, 2013

(54) LAMP HOLDER, MOUNTING MEMBER, ILLUMINATION DEVICE, DISPLAY DEVICE, AND TELEVISION RECEIVER APPARATUS

(75) Inventors: Yasumori Kuromizu, Osaka (JP); Masashi Yokota, Osaka (JP); Syuki Yamamoto, Osaka (JP); Kaori Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 444 days.

(21) Appl. No.: 12/811,417

(22) PCT Filed: Dec. 10, 2008

(86) PCT No.: PCT/JP2008/072434
§ 371 (c)(1),
(2), (4) Date: Jul. 1, 2010

(87) PCT Pub. No.: WO2009/093390
PCT Pub. Date: Jul. 30, 2009

(65) Prior Publication Data
US 2010/0283907 A1 Nov. 11, 2010

(30) Foreign Application Priority Data
Jan. 22, 2008 (JP) .................. 2008-012024

(51) Int. Cl.
*F21V 7/04* (2006.01)
*F21V 23/02* (2006.01)
*F21S 4/00* (2006.01)
(52) U.S. Cl.
USPC ............ 362/634; 362/225; 362/219; 362/260
(58) Field of Classification Search
USPC .................. 362/91.1–97.4, 217.01–225, 260, 362/632–634
See application file for complete search history.

(56) References Cited

U.S. PATENT DOCUMENTS

2005/0073858 A1 4/2005 Kim et al.
2006/0039163 A1* 2/2006 Yun ............................. 362/600
(Continued)

FOREIGN PATENT DOCUMENTS

CN 1928664 A 3/2007
JP 2007-018903 A 1/2007
(Continued)

OTHER PUBLICATIONS

Official Communication issued in International Patent Application No. PCT/JP2008/072434, mailed on Feb. 10, 2009.

*Primary Examiner* — Nimeshkumar Patel
*Assistant Examiner* — Jacob R Stern
(74) *Attorney, Agent, or Firm* — Keating & Bennett, LLP

(57) ABSTRACT

A lamp clip 18 includes a main body 27, a lamp gripping portion 28, a first mounting portion 30 and a second mounting portion 31. The main body 27 is mounted to a chassis 14 that houses a plurality of tubular cold cathode tubes 17. The lamp gripping portion 28 is provided on a surface of the main body 27 opposing the cold cathode tube 17 so as to grip the cold cathode tube 17. The first mounting portion 30 protrudes from the main body 27 so as to extend toward the chassis 14 and to be in a first mounting hole 32 formed in the chassis 14 so that a rim of the first mounting hole 32 is sandwiched between the first mounting portion 30 and the main body 27. The second mounting portion 31 protrudes from the main body 27 so as to extend toward the chassis 14 and to be inserted in a second mounting hole 33 formed in the chassis 14 so that a rim of the second mounting hole 33 is sandwiches between the second mounting portion 31 and the main body 27. The second mounting portion 31 has a width different from a width of the first mounting portion 30 in a mounting direction to the chassis 14.

18 Claims, 46 Drawing Sheets

U.S. PATENT DOCUMENTS

| | | |
|---|---|---|
| 2006/0109643 A1 | 5/2006 | Chang |
| 2007/0009820 A1 | 1/2007 | Ueda |
| 2007/0053171 A1 | 3/2007 | Park |
| 2007/0058397 A1 | 3/2007 | Aoki et al. |
| 2007/0070652 A1 | 3/2007 | Takata et al. |
| 2007/0242446 A1* | 10/2007 | Lee ................................. 362/29 |
| 2009/0046445 A1 | 2/2009 | Namiki et al. |
| 2009/0207335 A1* | 8/2009 | Lee ................................. 349/58 |
| 2009/0279320 A1 | 11/2009 | Yokota et al. |

FOREIGN PATENT DOCUMENTS

| | | |
|---|---|---|
| JP | 2007-073527 A | 3/2007 |
| JP | 2007-173250 A | 7/2007 |
| JP | 2007-180006 A | 7/2007 |
| WO | 2008/001710 A1 | 1/2008 |

* cited by examiner

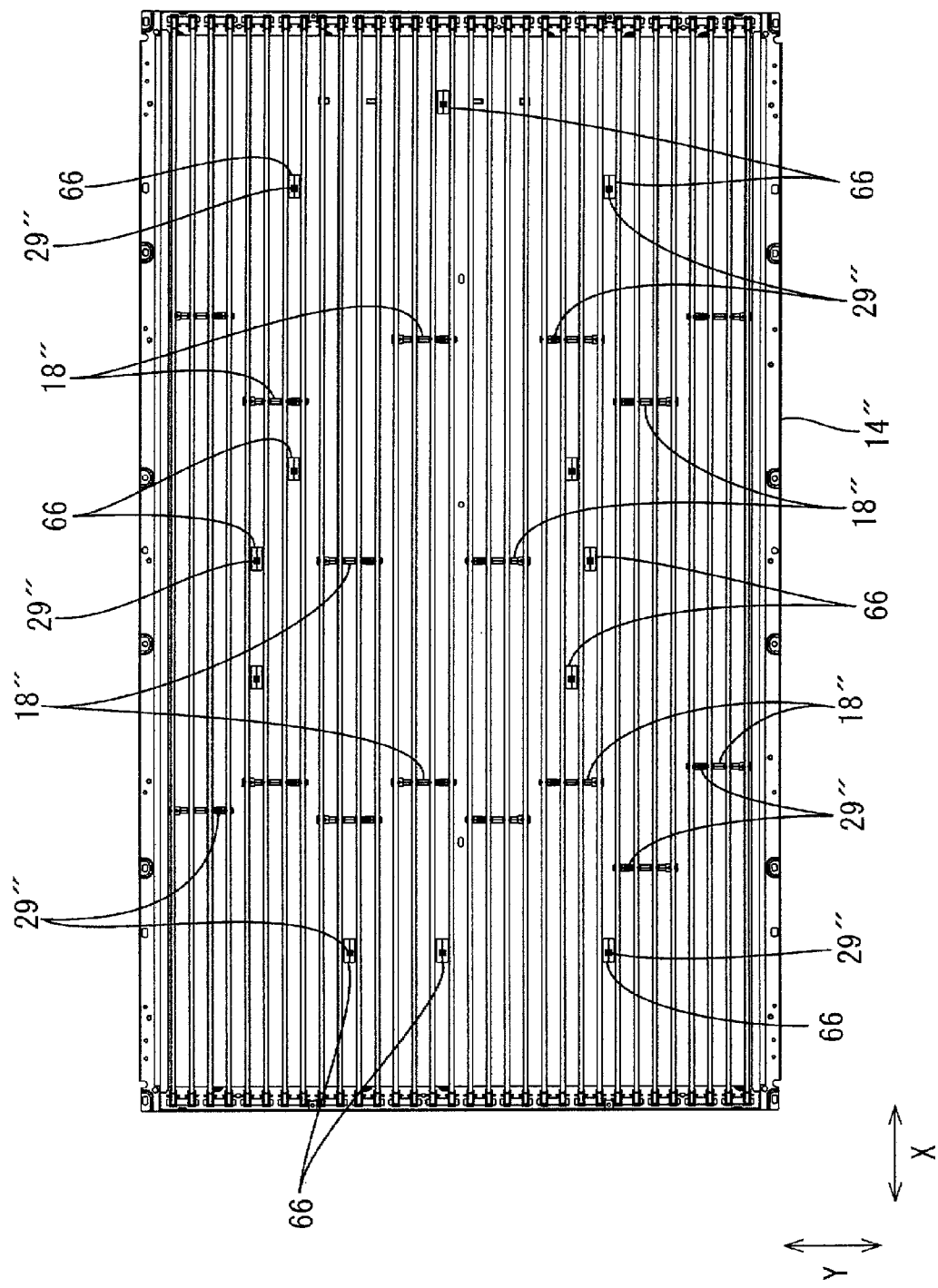

LAMP HOLDER, MOUNTING MEMBER, ILLUMINATION DEVICE, DISPLAY DEVICE, AND TELEVISION RECEIVER APPARATUS

TECHNICAL FIELD

The present invention relates to a lamp holder, a mounting member, an illumination device, a display device, and a television receiver apparatus.

BACKGROUND ART

For example, a liquid crystal panel used in a liquid crystal display device such as a liquid crystal television does not emit light by itself, and separately requires a backlight unit as an illumination device. The backlight unit is provided on a back side (on a side opposite a display surface) of the liquid crystal panel, and includes a chassis made of metal or resin and opening on a side of the liquid crystal panel, multiple fluorescent tubes (for example, cold cathode tubes) housed as lamps in the chassis, multiple optical members (diffusing sheets or the like) provided in the opening in the chassis for efficiently emitting lights emitted by the cold cathode tubes toward the liquid crystal panel, and a lamp clip that supports an intermediate portion of each of the cold cathode tubes having an elongated tubular shape. An example of such a lamp clip is described in Patent Document 1.
Patent Document 1: Japanese Patent Laid-Open No. 2007-173250

DISCLOSURE OF THE INVENTION

Problems to be Solved by the Invention

Depending on design of a backlight unit, a problem may occur if each lamp clip is not mounted to a chassis in a particular direction. However, for the conventional lamp clip, no consideration is given to such a case, and only measures with uncertainty are taken such as a thorough instruction to an operator who performs a mounting operation, with difficulty in addressing the problem.

The present invention is completed based on the above-described circumstances. An object of the present invention is to reduce improper mounting that is different from how a lamp holder is supposed to be mounted.

Means for Solving the Problems

A lamp holder of the present invention includes a main body, a lamp gripping portion, a first mounting portion and a second mounting portion. The main body is to be mounted to a mounting member that houses a plurality of lamps. The lamp gripping portion is provided on a surface of the main body that is to face the lamp for holding the lamp. The first mounting portion protrudes from the main body so as to extend toward the mounting member and to be inserted in a first mounting hole formed in the mounting member so that a rim of the first mounting hole is sandwiched between the first mounting portion and the main body. The second mounting portion protrudes from the main body so as to extend toward the mounting member and to be inserted in a second mounting hole formed in the mounting member so that a rim of the second mounting hole is sandwiched between the second mounting portion and the main body. The second mounting portion has a size different from a size of the first mounting portion.

As such, the first mounting portion and the second mounting portion have the different sizes. Thus, if a size relationship between the first mounting hole and the second mounting hole in the mounting member is matched with a size relationship between the first mounting portion and the second mounting portion, a larger mounting portion cannot be inserted into a smaller mounting hole unless each mounting portion is aligned with each corresponding mounting hole. This can reliably reduce improper mounting that is different from how a lamp holder is supposed to be mounted.

Preferable configurations as illustrative aspects of the present invention will be explained.

(1) Each of the first mounting portion and the second mounting portion includes a base portion protruding from the main body so as to extend toward the mounting member and an extending portion protruding from the base portion and extending along the main body. The extending portions are formed so as to be inserted in the first mounting hole and the second mounting hole, respectively, and to be slid in an extending direction in which the extending portions extend so that the rims of the first mounting hole and the second mounting hole are sandwiched between the extending portions and the main body, respectively. The first mounting portion and the second mounting portion have different sizes that measure in a sliding direction and in a direction perpendicular to the sliding direction. This is suitable for a sliding mounting type lamp holder.

(2) The main body has a substantially rectangular shape with a length direction defined to match the sliding direction. This is suitable for a lamp holder including a main body having a small width when the main body blocks the first mounting hole and the second mounting hole in a mounting state.

(3) The first mounting portion is formed to protrude in the sliding direction beyond a front edge of the main body. This allows a protruding portion of the first mounting portion to be easily previously inserted into the first mounting hole in mounting the main body, thereby providing high workability.

(4) The first mounting portion has a guide portion at a distal end portion thereof. The guide portion is formed such that a distance to the main body increases toward a distal end. Thus, the guide portion guides an inserting operation into the first mounting hole, thereby providing higher workability.

(5) A handling portion that protrudes higher than the lamp gripping portion is eccentrically located on a rear side of the main body with respect to the sliding direction so as to be accessible during mounting and removal of the lamp holder. Thus, while the handling portion eccentrically located on the rear side of the main body with respect to the sliding direction is handled, the first mounting portion protruding from the front edge portion on the other end with respect to the sliding direction can be previously inserted into the first mounting hole, thereby providing high workability.

(6) The handling portion is formed so as to support a planar optical member placed in a position opposite the mounting member via the lamp. This can provide the handling portion having a function of supporting the optical member, thereby extending functionality with a simple structure.

Next, to solve the above problem, a mounting member of the present invention includes a main body, a lamp gripping portion and a plurality of mounting portions. The lamp gripping portion is provided on the main body so as to grip a lamp. Each mounting portion protrudes from another side of the main body with respect to the lamp gripping portion. The mounting member includes a mounting body having a plurality of mounting holes into which the mounting portions are inserted such that rims of the mounting holes are sandwiched between the main body and the respective mounting portions. The mounting holes have different sizes.

As such, the mounting holes have the different sizes. Thus, if a size relationship between the mounting portions in the lamp holder is matched with a size relationship between the mounting holes, a larger mounting portion cannot be inserted into a smaller mounting hole unless each mounting portion is aligned with each corresponding mounting hole. This can reliably reduce improper mounting that is different from how a lamp holder is supposed to be mounted.

Next, to solve the above problem, an illumination device of the present invention includes a plurality of lamps, a mounting member and lamp holder. The mounting member houses the lamps and has a first mounting hole and a second mounting hole having different sizes. The lamp holder includes a main body, a lamp gripping portion, a first mounting portion and a second mounting portion. The main body is mounted to the mounting member. The lamp gripping portion protrudes from the main body toward the lamp so as to grip the lamp. The first mounting portion protrude from the main body toward the mounting member and is inserted in the first mounting hole such that a rim of the first mounting hole is sandwiched between the first mounting portion and the main body. The second mounting portion protrudes from the main body toward the mounting member and is inserted into the second mounting hole such that a rim of the second mounting hole is sandwiched between the second mounting portion and the main body. The second mounting portion has a size different from a size of the first mounting portion. Any one of the first mounting portion and the second mounting portion having a larger size is larger than any one of the first mounting hole and the second mounting hole having a smaller size.

Thus, the larger mounting portion cannot be inserted into the smaller mounting hole unless each mounting portion on the lamp holder is aligned with each corresponding mounting hole in the mounting member. This can reliably reduce improper mounting that is different from how a lamp holder is supposed to be mounted.

BRIEF DESCRIPTION OF THE DRAWINGS

FIG. 46 is a plan view of a chassis of a further embodiment (7).

BEST MODE FOR CARRYING OUT THE INVENTION

First Embodiment

A first embodiment of the present invention will be described with reference to FIGS. 1 to 21.

Figure 1:
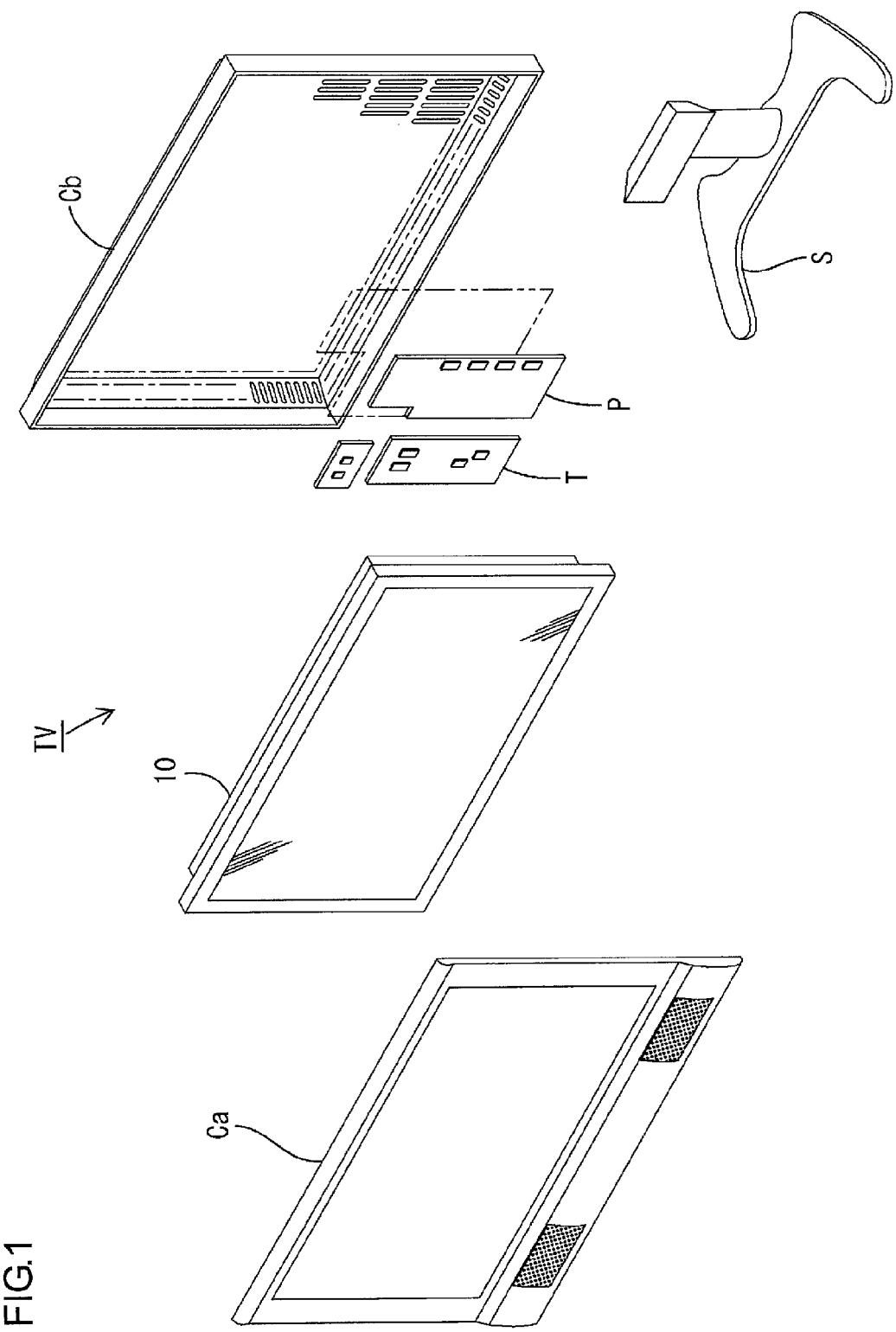
FIG. 1 is an exploded perspective view showing an outline configuration of a television receiver apparatus according to a first embodiment of the present invention.
Figure 2:
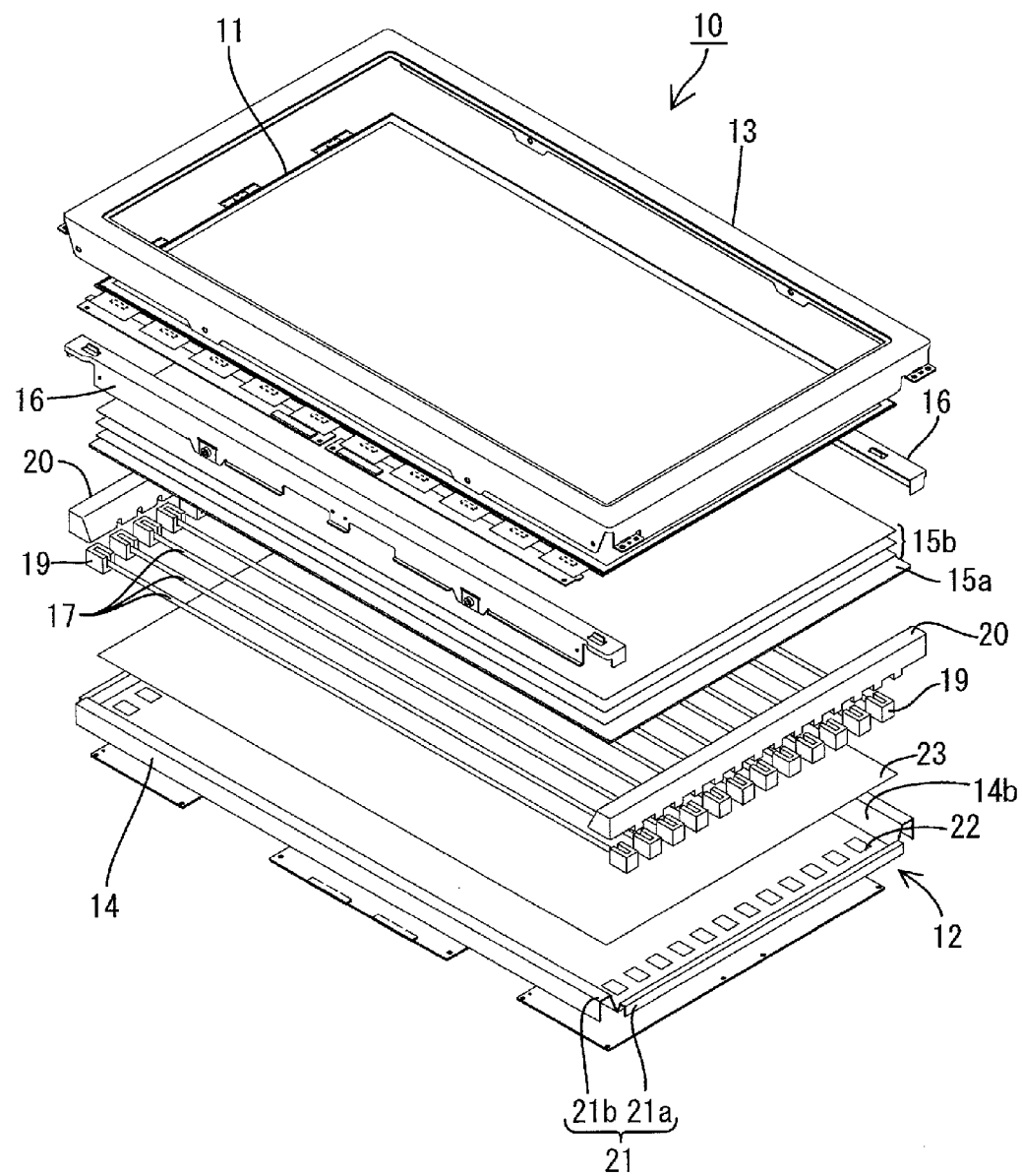
FIG. 2 is an exploded perspective view showing a general configuration of a liquid crystal display device.

A television receiver apparatus TV according to this embodiment includes, as shown in FIG. 1, a liquid crystal display device 10, front and back cabinets Ca and Cb that hold and house the liquid crystal display device 10 therebetween, a power source P, a tuner T, and a stand S. The liquid crystal display device (display device) 10 generally has a horizontally oriented rectangular shape, and is housed in a vertically placed state. The liquid crystal display device 10 includes, as shown in FIG. 2, a liquid crystal panel 11 as a display panel, and a backlight unit (illumination device) 12 as an external light source, which are integrally held by a frame-shaped bezel 13 or the like. In a part of the drawings, an X-axis, a Y-axis, and a Z-axis are shown so that axial directions are in directions shown in the drawings.

Figure 3:
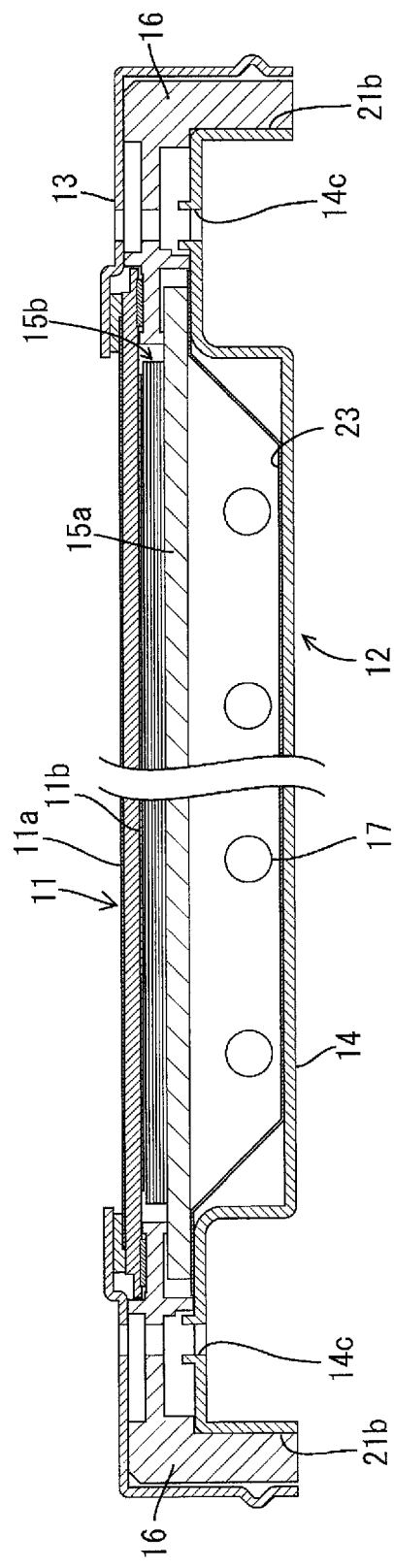
FIG. 3 is a sectional view showing the liquid crystal display device cut along a short-side direction.
Figure 4:
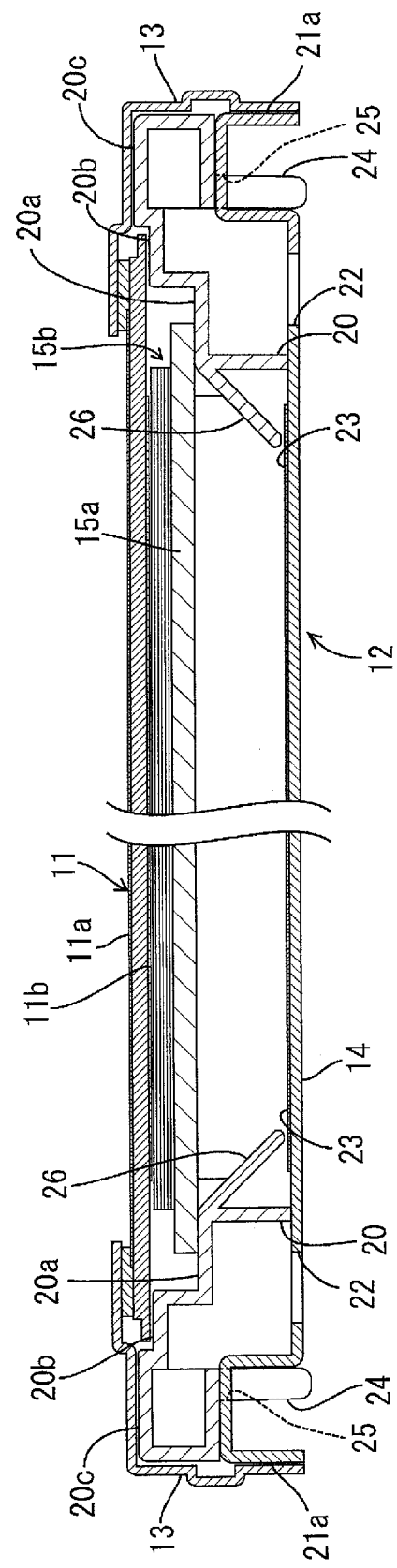
FIG. 4 is a sectional view showing the liquid crystal display device cut along a long-side direction.

Next, the liquid crystal panel 11 and the backlight unit 12 that constitute the liquid crystal display device 10 will be described (see FIGS. 2 to 4).

The liquid crystal panel (display panel) 11 is configured so that a pair of glass substrates are bonded to each other with a predetermined gap therebetween, and a liquid crystal is sealed between the glass substrates. On one of the glass substrates, a switching element (for example, TFT) connected to source wiring and gate wiring perpendicular to each other, a pixel electrode connected to the switching element, and further an orientation film or the like are provided. On the other of the glass substrates, a color filter in which coloring portions of such as R (red), G (green) and B (blue) are placed in a predetermined arrangement, a counter electrode, and further an orientation film or the like are provided. On outsides of the substrates, polarizing plates 11a and 11b are provided (see FIGS. 3 and 4).

As shown in FIG. 2, the backlight unit 12 includes a substantially box-shaped chassis 14 opening on a side of a light emission surface (liquid crystal panel 11), a diffuser plate 15a provided to cover an opening 14b in the chassis 14, a plurality of optical sheets 15b provided between the diffuser plate 15a and the liquid crystal panel 11, and a frame 16 that is provided along a long side of the chassis 14 and holds a long side edge part of the diffuser plate 15a between the frame 16 and the chassis 14. In the chassis 14, a cold cathode tube (light source) 17, a lamp clip 18 for mounting the cold cathode tube 17 to the chassis 14, a relay connector 19 that relays electrical connection at each edge portion of the cold cathode tube 17, and a holder 20 that collectively covers edge portions of a group of cold cathode tubes 17 and a group of relay connectors 19 are further provided. In the backlight unit 12, the side closer to the diffuser plate 15a than the cold cathode tube 17 is a light emission side. In FIGS. 2 to 4, the lamp clip 18 is not shown.

The chassis 14 is made of metal, and formed of sheet metal into a shallow substantially box shape including a rectangular bottom plate, and a folded outer edge part 21 (a folded outer edge part 21a in a short-side direction and a folded outer edge part 21b in a long-side direction) folded to rise from each side into a substantially U shape. In the bottom plate of the chassis 14, a plurality of mounting holes 22 in which the relay connectors 19 are mounted are provided in opposite edge portions in the long-side direction. Further, in an upper surface of the folded outer edge part 21b of the chassis 14, as shown in FIG. 3, a fixing hole 14c is provided so that the bezel 13, the frame 16, and the chassis 14 or the like can be integrated by a screw or the like.

A reflection sheet 23 is provided on an inner surface side (side opposing the cold cathode tube 17) of the bottom plate of the chassis 14. The reflection sheet 23 is made of synthetic resin, has a white surface with high reflectivity, and is placed along an inside of a bottom plate surface of the chassis 14 to cover substantially the entire bottom plate surface. As shown in FIG. 3, a long side edge part of the reflection sheet 23 rises to cover the folded outer edge part 21b of the chassis 14, and is held between the chassis 14 and the diffuser plate 15a. The reflection sheet 23 can reflect a light emitted from the cold cathode tube 17 toward the diffuser plate 15a.

The cold cathode tube 17 has an elongated tubular shape, and a plurality of cold cathode tubes 17 are housed in the chassis 14 in a state where the cold cathode tubes 17 are arranged in parallel with each other and a length direction (axial direction) thereof matching the long-side direction of the chassis 14 (see FIG. 2). The cold cathode tube 17 is slightly raised from the bottom plate (reflection sheet 23) of the chassis 14, each edge portions is fitted in the relay connector 19, and the holder 20 is mounted to cover the relay connectors 19.

The holder 20 is made of white synthetic resin, covers the edge portion of the cold cathode tube 17, and has an elongated substantially box shape extending along the short-side direction of the chassis 14. As shown in FIG. 4, the holder 20 has a stepped surface on which the diffuser plate 15a and the liquid crystal panel 11 can be placed on different steps, is provided to partially overlap the folded outer edge part 21a in the short-side direction of the chassis 14, and forms a side wall of the backlight unit 12 together with the folded outer edge part 21a. An insertion pin 24 protrudes from a surface of the holder 20 opposing the folded outer edge part 21a of the chassis 14, and the insertion pin 24 is inserted into an insertion hole 25 formed in an upper surface of the folded outer edge part 21a of the chassis 14 to mount the holder 20 to the chassis 14.

The stepped surface of the holder 20 includes three surfaces parallel to the bottom plate surface of the chassis 14, and a short side edge part of the diffuser plate 15a is placed on a first surface 20a in the lowest position. Further, a tilted cover 26 tilted toward the bottom plate surface of the chassis 14 extends from the first surface 20a. On a second surface 20b of the stepped surface of the holder 20, a short side edge part of the liquid crystal panel 11 is placed. A third surface 20c in the highest position of the stepped surface of the holder 20 is provided in a position overlapping the folded outer edge part 21a of the chassis 14, and in contact with the bezel 13.

The diffuser plate 15a is formed of a plate member made of synthetic resin in which light scattering particles are dispersed, and has a function of scatting a linear light emitted from the cold cathode tube 17 as a tubular light source. The short side edge part of the diffuser plate 15a is placed on the first surface 20a of the holder 20 as described above, and is not subjected to a vertical constraining force. A long side edge part of the diffuser plate 15a is held between the chassis 14 (reflection sheet 23) and the frame 16 and secured as shown in FIG. 3.

The optical sheet 15b provided on the diffuser plate 15a includes a diffusing sheet, a lens sheet, and a reflective polarizing plate stacked in order from the side of the diffuser plate 15a, and has a function of turning a light emitted from the cold cathode tube 17 and having passed through the diffuser plate 15a into a planer light. The liquid crystal panel 11 is provided on an upper surface of the optical sheet 15b, and the optical sheet 15b is held between the diffuser plate 15a and the liquid crystal panel 11.

The lamp clip 18 will be described in detail. The lamp clip 18 is made of synthetic resin (for example, polycarbonate), has a white surface with high light reflectivity, and includes, as shown in FIGS. 5 to 8, a main body 27 (mounting plate, base portion) having a substantially plate shape along the bottom plates of the chassis 14 and the reflection sheet 23 and a substantially rectangular shape on the plan view. The lamp clip 18 is mounted to the chassis 14 with a length direction of the main body 27 substantially parallel to the short-side direction (Y-axis direction) of the chassis 14, that is, a position (direction) substantially parallel to a direction perpendicular to the axial direction (length direction, X-axis direction) of the cold cathode tube 17. Hereinafter, the long-side direction and the short-side direction are described with reference to the bottom plates of the chassis 14 and the reflection sheet 23 if not otherwise specified. The Z-axis direction is described with an upper side in FIGS. 3 and 4 being a front side and an opposite lower side being a back side.

Figure 5:
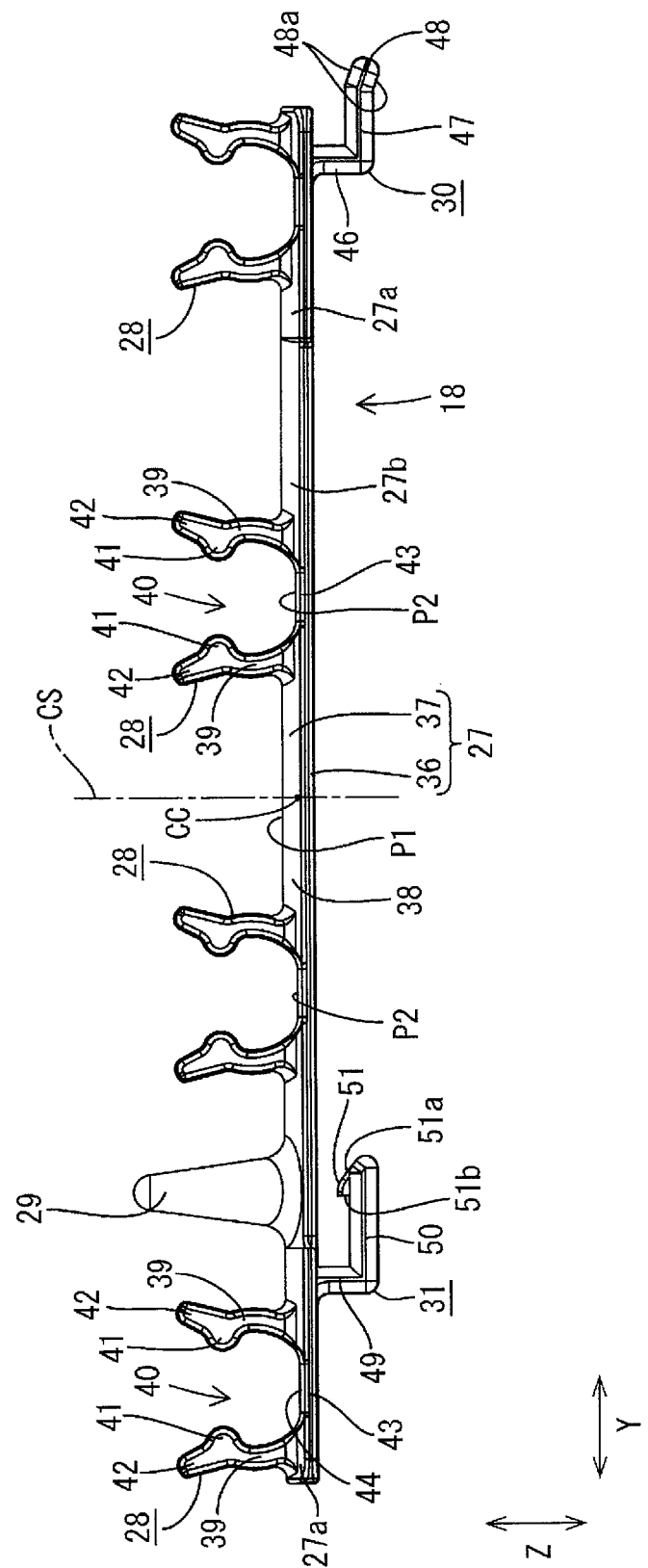
FIG. 5 is a front view of a lamp clip.
Figure 6:
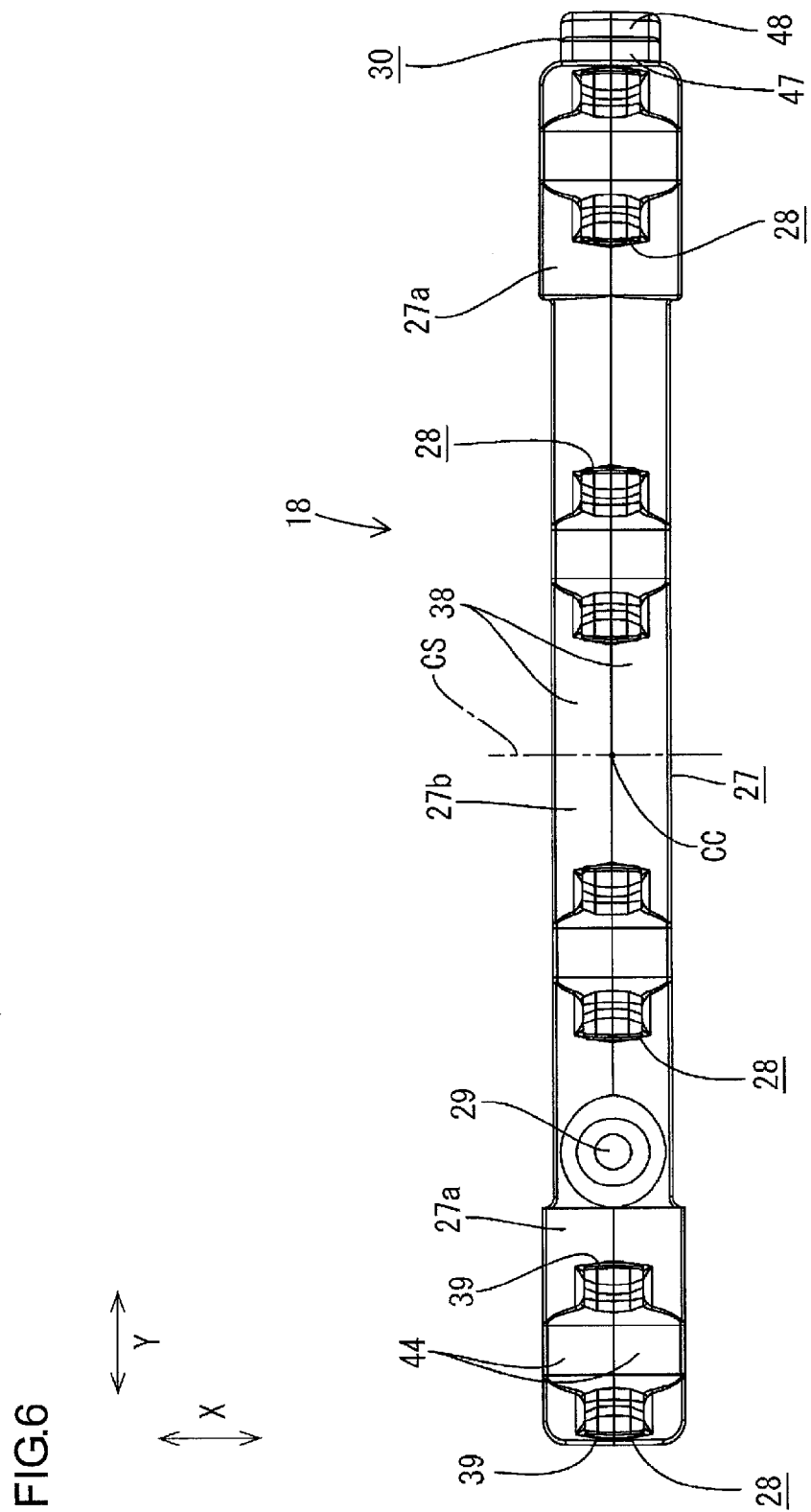
FIG. 6 is a plan view of the lamp clip.

On a surface on the front side (a surface opposing the diffuser plate 15a and the cold cathode tube 17, a surface on the side opposite the chassis 14) of the main body 27, lamp gripping portions 28 for supporting the cold cathode tubes 17 in a predetermined height position, and a support pin 29 for supporting the diffuser plate 15a in a position higher than the cold cathode tube 17 are provided. A plurality of (four in this embodiment) lamp gripping portions 28 are arranged. They are spaced from each other in the length direction of the main body 27 so as to grip different cold cathode tubes 17. Intervals between the lamp gripping portions 28 are substantially the same and match intervals between the cold cathode tubes 17 arranged in the chassis 14. The support pin 29 is provided in an off-center (or out-of-center) location, that is, eccentrically located off a center CC of the main body 27 (FIGS. 5 and 6). In other words, the support pin 29 is provided in a position off the center CC of the main body 27, and further in other words, in a position away from the center CC of the main body 27. Further in other words, the support pin 29 is provided a predetermined distance (space) away from the center CC of the main body 27, and further in other words, in between the center CC of the main body 27 and an outer edge. Specifically, with respect to the length direction of the main body 27, the support pin 29 is off a surface CS that is defined by the Z-axis and the X-axis including the center CC (the middle point of the length) of the main body 27, that is, perpendicular to the length direction of the main body 27. Namely, the support pin 29 is provided in the off-center (or out-of-center) location. More Specifically, the support pin 29 is provided around a middle point between the lamp gripping portion 28 closest to an edge of the main body 27 and the lamp gripping portion 28 adjacent to that lamp gripping portion 28. On the back side surface (a surface that faces the chassis 14 and the reflection sheet 23, a surface on the side opposite the diffuser plate 15a and the cold cathode tube 17) of the main body 27, mounting portions 30 and 31 are provided. With the mounting portions 30 and 31, the lamp clip 18 is held in a mounting position with respect to the chassis 14. A plurality of (two in this embodiment) mounting portions 30 and 31 are provided so as to be spaced from each other in the length direction of the main body 27.

Figure 9:
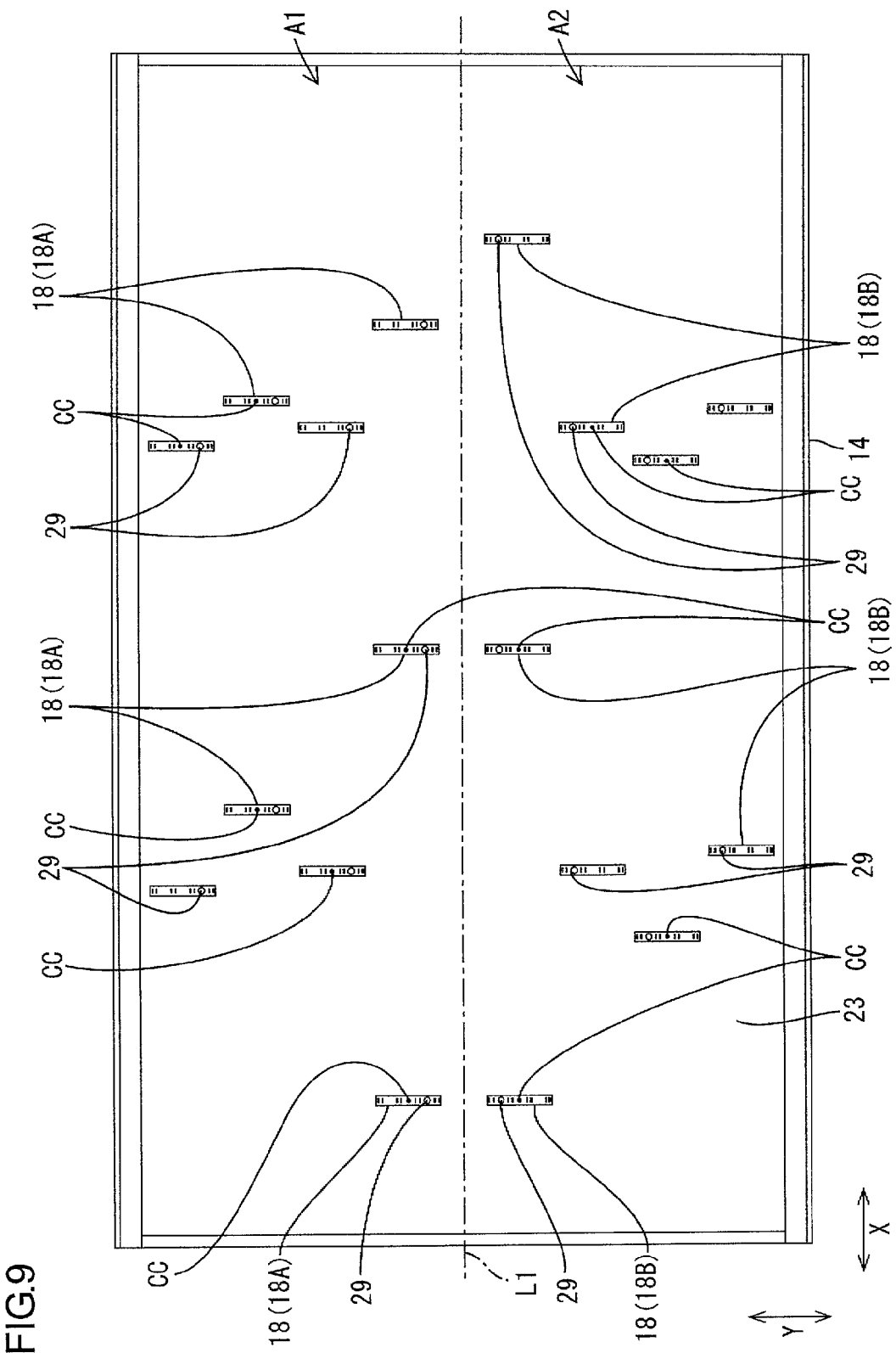
FIG. 9 is a plan view showing lamp clips mounted to a chassis.

The lamp clips 18 are provided in a plurality of dispersed positions on inner surfaces of the bottom plates of the chassis 14 and the reflection sheet 23 as shown in FIG. 9, and an arrangement thereof will be described below in detail. The lamp clips 18 are arranged in a plurality of positions spaced from each other in the long-side direction (X-axis direction) of the chassis 14 and the reflection sheet 23. Therefore, the lamp clips 18 can grip the cold cathode tubes 17 in a plurality of positions spaced apart in the axial direction. Further, a larger number of lamp clips 18 are arranged in central areas (on a reference line L1 side) than areas closer to ends of the short-side (Y-axis) of the bottom plates of the chassis 14 and the reflection sheet 23. Specifically, in the middle areas in the short-side direction of the chassis 14 and the reflection sheet 23, more specifically, areas on either side of a virtual reference line L1 that is defined so as to cross along the long-side direction (X-axis direction, length direction of the cold cathode tube 17, direction perpendicular to the length direction of the main body 27, and direction along the surface of the diffuser plate 15a) via the middle point, three lamp clips 18 that are spaced apart in the long-side direction are arranged. In areas closer to the ends of short-side direction from the six lamp clips 18 are arranged, pairs of lamp clips 18 that are spaced apart in the long-side direction. Thus, a larger number of lamp gripping portions 28, that is, a larger number of support parts for the cold cathode tubes 17 are provided. Moreover, a larger number of support pins 29, that is, a larger number of support parts for the diffuser plate 15a are provided in the middle areas (either side of the reference line L1) than the areas closer to the ends of the short-side direction of the chassis 14 and the reflection sheet 23.

The pairs of lamp clips 18 (lamp clips 18 provided in areas closer to the ends of the short-side direction than the middle) arranged in the long-side direction are displaced in the long-side direction with respect to the pairs of the lamp clips 18 adjacent in the short-side direction. Thus, as compared with lamp clips 18 arranged in line along the short-side direction, the lamp clips 18 are dispersed within the surface of the bottom plate of the reflection sheet 23, and shadows of the lamp clips 18 are not easily seen due to the property of human eyes. Specifically, with the same number of the lamp clips 18, the lamp clips 18 linearly or collectively arranged are easily seen because of the property of human eyes. By dispersing the lamp clips 18 as in this embodiment, luminance unevenness is less likely to occur in the backlight unit 12 even if the reflection sheet 23 and the lamp clips 18 have different light reflectivities.

A mounting direction (mounting position, mounting state) of each lamp clip 18 to the bottom plates of the chassis 14 and the reflection sheet 23 is defined so that each support pin 29 is positioned on the reference line L1 side (closer to the reference line L1, or near the reference line L1), that is, eccentrically on the reference line L1 side. Specifically, each lamp clip 18 is mounted with the length direction of the main body 27 matching the short-side direction (Y-axis direction, length direction of the cold cathode tube 17, direction perpendicular to the reference line L1) of the chassis 14 and the reflection sheet 23. In each lamp clip 18, the support pin 29 is provided eccentrically in the length direction of the main body 27, and thus there is a direction in the mounting direction to the chassis 14. Thus, two mounting directions of each lamp clip 18 are set including a first mounting direction (first mounting position, first mounting state) with the support pin 29 directed downward in FIG. 9, and a second mounting direction (second mounting position, second mounting state) with the support pin 29 directed upward in FIG. 9 in the direction opposite the first mounting direction. On the bottom plates of the chassis 14 and the reflection sheet 23, the lamp clips 18 mounted in a first area A1 on an upper side of the reference line L1 in FIG. 9 are in the first mounting direction, while the lamp clips 18 mounted in a second area A2 on a lower side in FIG. 9 are in the second mounting direction. Specifically, the lamp clips 18 are divided into a first lamp clip group 18A in the first mounting direction and a second lamp clip group 18B in the second mounting direction at the reference line L1 (as a border), and all the support pins 29 eccentrically placed on the main body 27 are placed closer to the reference line L1. In this state, a distance between the reference line L1 and the support pin 29 of each lamp clip 18 is smaller than a distance between the reference line L1 and the center CC of the main body 27 of each lamp clip 18. Thus, each support pin 29 supports the diffuser plate 15a in a position closer to the middle side in the short-side direction of the diffuser plate 15a, in other word, distribution density of the support pins 29 increases in positions closer to the middle side in the short-side direction of the diffuser plate 15a. If thermal expansion or thermal contraction occurs in the diffuser plate 15a, a screen middle side tends to be bent or warped toward the cold cathode tube 17 in structure, but the larger number of support pins 29 are distributed on the screen middle side, thereby allowing bending or warpage to be satisfactorily controlled. There are an optimum (smaller) number and arrangement of the lamp clips 18 to support the cold cathode tubes 17. With the optimum predetermined arrangement, the lamp clips 18 with the support pin 29 eccentrically placed are placed so that the support pins 29 are placed closer to the reference line L1, thereby allowing bending or warpage of the diffuser plate 15a to be satisfactorily controlled.

Figure 10:
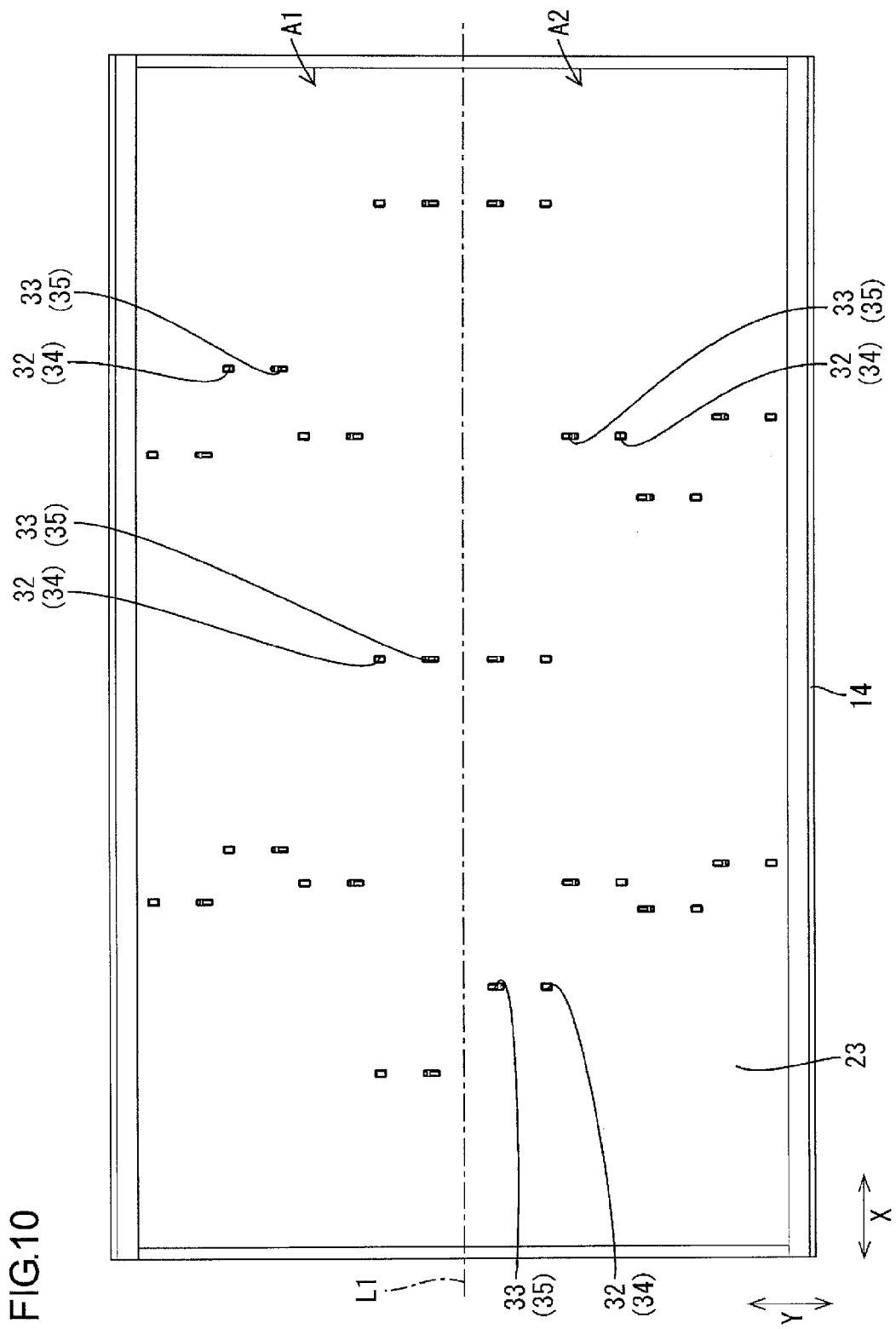
FIG. 10 is a plan view of the chassis and a reflection sheet.

In the inner surfaces of the bottom plates of the chassis 14 and the reflection sheet 23, as shown in FIG. 10, mounting holes 32 and 33 and passage holes 34 and 35 through which the mounting portions 30 and 31 are inserted are formed through the bottom plates in the thickness direction in positions to which the lamp clips 18 are to be mounted. The mounting portions 30 and 31, the mounting holes 32 and 33, and the passage holes 34 and 35 will be described later in detail.

Next, detailed structures of components of the lamp clip 18 will be described. First, the main body 27 has an elongated substantially rectangular shape along the short-side direction (Y-axis direction) of the chassis 14 as shown in FIGS. 5 to 8, and an intermediate portion is formed to be slightly narrower than opposite edge portions in the length direction. Thus, a surface area of the main body 27 is smaller than that in a case where a main body 27 has a fixed width matching a width of a wide portion 27a over the entire length, and a ratio of a surface area of all the lamp clips 18 to a surface area of the entire reflection sheet 23 is small. This reduces occurrence of luminance unevenness in the backlight unit 12 even if the reflection sheet 23 and the lamp clip 18 have different light reflectivities. In the wide portions 27a (wide first part) at the opposite ends in the main body 27, a pair of lamp gripping portions 28 at opposite ends and the mounting portions 30 and 31 are provided, while in an intermediate narrow portion 27b (narrow second part), a pair of lamp gripping portions 28 closer to the middle and the support pin 29 are provided. The opposite wide portions 27a in the main body 27 have higher rigidity than the narrow portion 27b, and the mounting portions 30 and 31 are provided in the wide portions 27a. This reduces damage to the mounting portions 30 and 31 or the main body 27 even if the mounting portions 30 and 31 interfere with peripheral surfaces of the mounting holes 32 and 33 in the chassis 14 in mounting the lamp clip 18.

Figure 13:
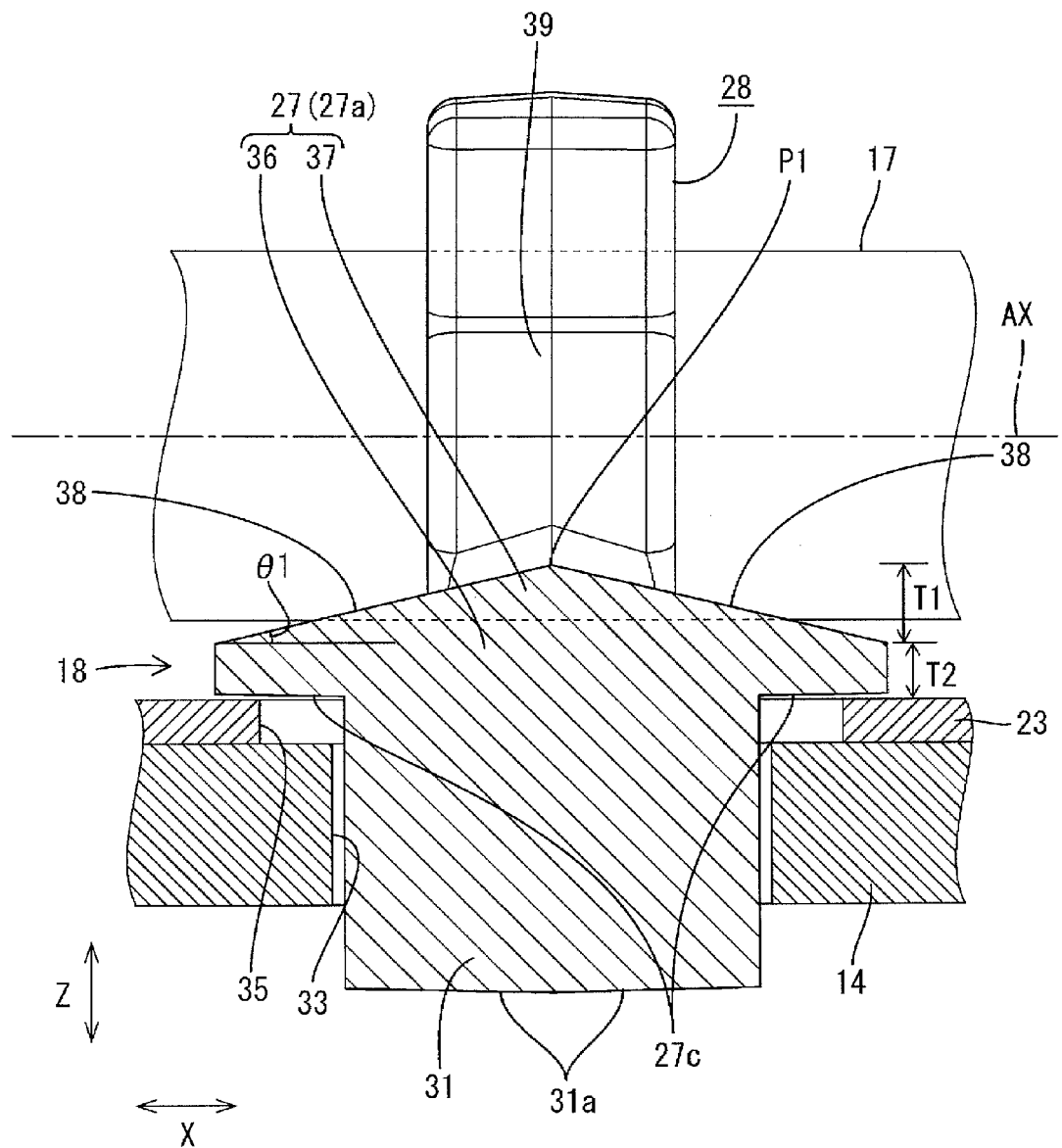
FIG. 13 is a sectional view taken along the line A-A in FIG. 12.

Next, a sectional shape of the main body 27 cut along a thickness direction will be described. As shown in FIG. 13, the main body 27 includes a pedestal portion 36 having a mounting surface (opposing surface) to the bottom plates of the chassis 14 and the reflection sheet 23, and a protruding portion 37 protruding from the pedestal portion 36 toward the front side (toward the cold cathode tube 17 and the diffuser plate 15a) and having an inclined surface 38 on a surface thereof.

The pedestal portion 36 has a substantially rectangular shape (block shape) with a substantially fixed thickness (height, size in the Z-axis direction) and a substantially fixed width (size in the X-axis direction) and an elongated sectional shape. The protruding portion 37 has, on a protruding base end side, substantially the same width as the pedestal portion 36, but is tapered with a progressively decreasing width (size on the short side (X-axis direction) of the body 27) toward a protruding tip. In other words, the protruding portion 37 has an angular shape with the largest thickness in a middle position (vertex P1) in the width direction (X-axis direction) and a progressively decreasing thickness from the middle portion toward opposite end positions (opposite skirt sides) in the width direction. Further in other words, the protruding portion 37 has an angular shape with a skirt extending in a direction away from a central axis AX of the cold cathode tube 17. Thus, opposite edge portions (outer edge on the long side) in the width direction along the length direction of the protruding portion 37 are thinner over the entire region than the middle side, thereby restricting a step from the pedestal portion 36 from being formed.

Figure 14:
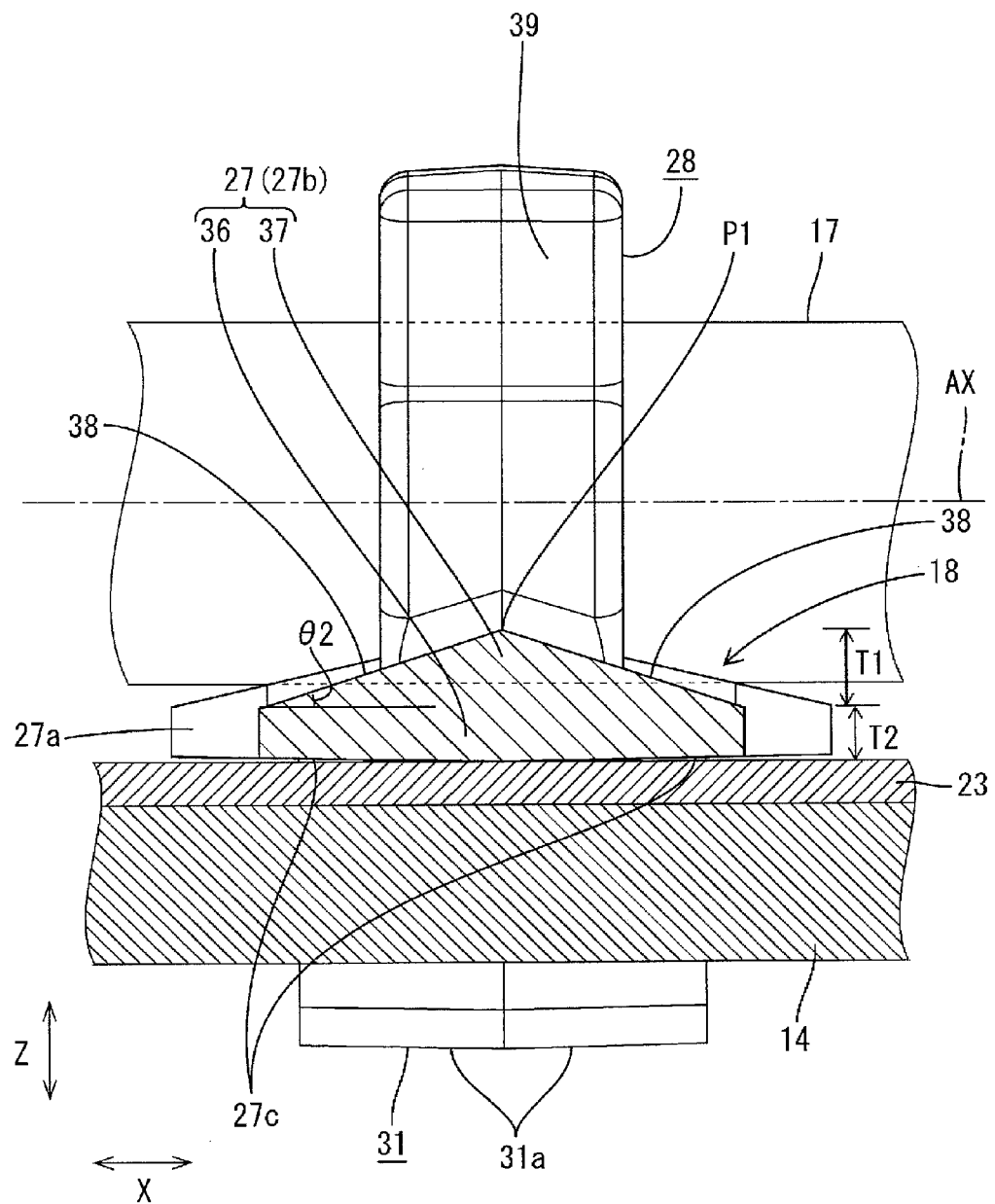
FIG. 14 is a sectional view taken along the line B-B in FIG. 12.

On the surface of the protruding portion 37, a pair of inclined surfaces 38 sloping downward from the middle position to the opposite end positions in the width direction are integrally formed. The inclined surface 38 slopes so that a distance from the reflection sheet 23 progressively decreases from the middle position toward the opposite end positions in the width direction of the protruding portion 37, in other words, a distance from the diffuser plate 15a (cold cathode tube 17) progressively increases. Specifically, the protruding portion 37 has a substantially isosceles triangular sectional shape, and has the pair of inclined surface 38 formed on the surface at the vertex P1 in the middle in the width direction as a border. Specifically, the protruding portion 37 has a symmetrical shape with respect to an axis of symmetry along the Z-axis direction passing through the middle position in the width direction. Thus, the inclined surfaces 38 have the same inclination angle. An angle formed by the inclined surfaces 38 connected at the vertex P1 of the protruding portion 37 is an obtuse angle. A thickness T1 at the vertex P1 of the protruding portion 37 is set to be larger than a thickness T2 of the pedestal portion 36. As shown in FIGS. 13 and 14, the wide portions 27a at the opposite ends in the length direction of the main body 27 and the narrow portion 27b as the intermediate portion therebetween have different inclination angles of the inclined surface 38 in the protruding portion 37, and an inclination angle θ1 in the wide portion 27a is smaller (more gentle) than an inclination angle θ2 in the narrow portion 27b. Also in a bottom surface (surface of the main body 27 opposing the chassis 14 and the reflection sheet 23) of the pedestal portion 36, a pair of inclined surfaces 27c having a more gentle inclination angle than the inclined surface 38 with a vertex in the middle position in the width direction are formed over the entire length.

As described above, the protruding portion 37 having the inclined surfaces 38 is formed on the main body 27, and thus the inclined surfaces 38 can satisfactorily reflect the light emitted from the cold cathode tube 17 toward the diffuser plate 15a. Also, the entire opposite edge portions in the width direction along the length direction of the protruding portion 37 are thinner than the middle portion and there is little step from the pedestal portion 36, and thus there is few shadow portions in the protruding portion 37. This can provide uniform light reflection efficiency of the surface of the main body 27 as much as possible, and thus reduce occurrence of a dark portion (shadow portion, shaded portion) in the main body 27 as much as possible. The pedestal portion 36 is provided on a back side of the protruding portion 37, but the thickness T2 thereof is set to be smaller than the largest thickness T1 (thickness T1 at the vertex P1) of the protruding portion 37, and also the inclined surfaces 38 of the protruding portion 37 provide uniform light reflection efficiency, and thus opposite side surfaces in the width direction of the pedestal portion 36 are not easily visually identified as dark portions. The inclined surfaces 38 without a curve are formed in the surface of the protruding portion 37, and thus dimensional accuracy of the protruding portion 37 can be easily obtained in producing the lamp clip 18 by resin molding.

The protruding portion 37 has a certain thickness in the middle portion in the width direction, but is extremely thin at the opposite edge portions in the width direction, and a light may pass through the thin portions. However, the pedestal portion 36 is provided on the back side of the protruding portion 37, and has a thickness sufficient for blocking the light, thereby avoiding the light from passing through the opposite edge portions in the width direction of the main body 27. Thus, even if the chassis 14 is provided on the back side of the opposite edge portions in the width direction of the main body 27 without the reflection sheet 23, the chassis 14 (and the mounting holes 32 and 33) is less likely to be seen as a dark portion from the front side. With the thin opposite edge portions in the width direction of the protruding portion 37, the main body 27 may have insufficient strength, but the pedestal portion 36 is provided on the back side of the protruding portion 37, thereby ensuring sufficient strength and rigidity of the main body 27.

Figure 8:
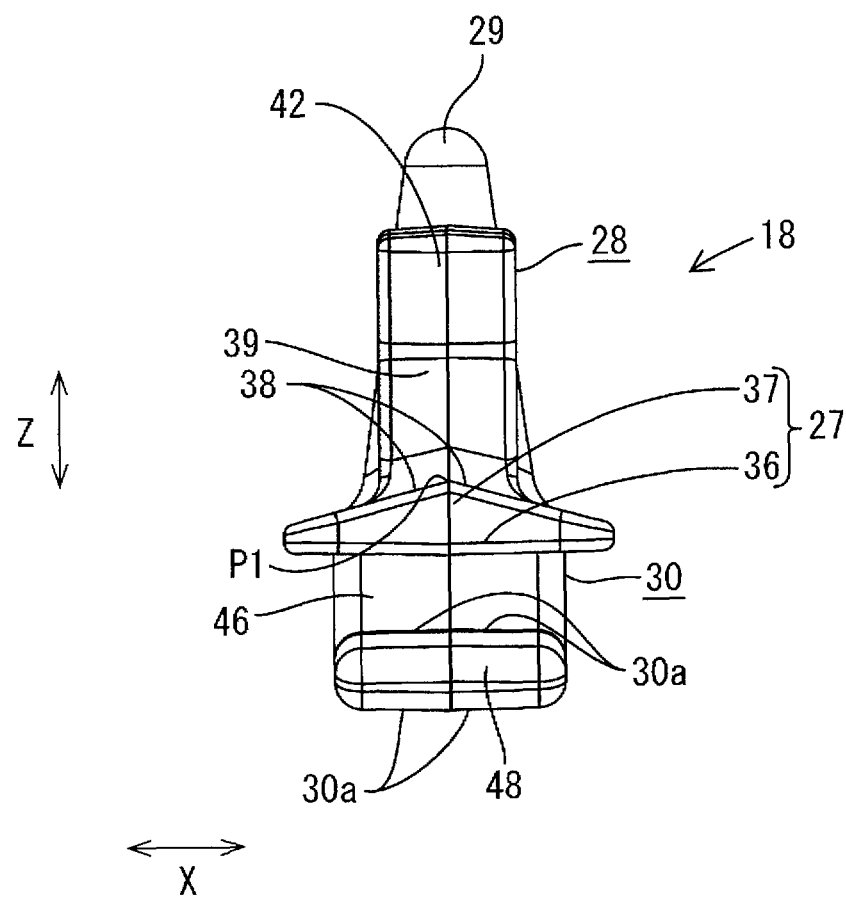
FIG. 8 is a side view of the lamp clip.
Figure 12:
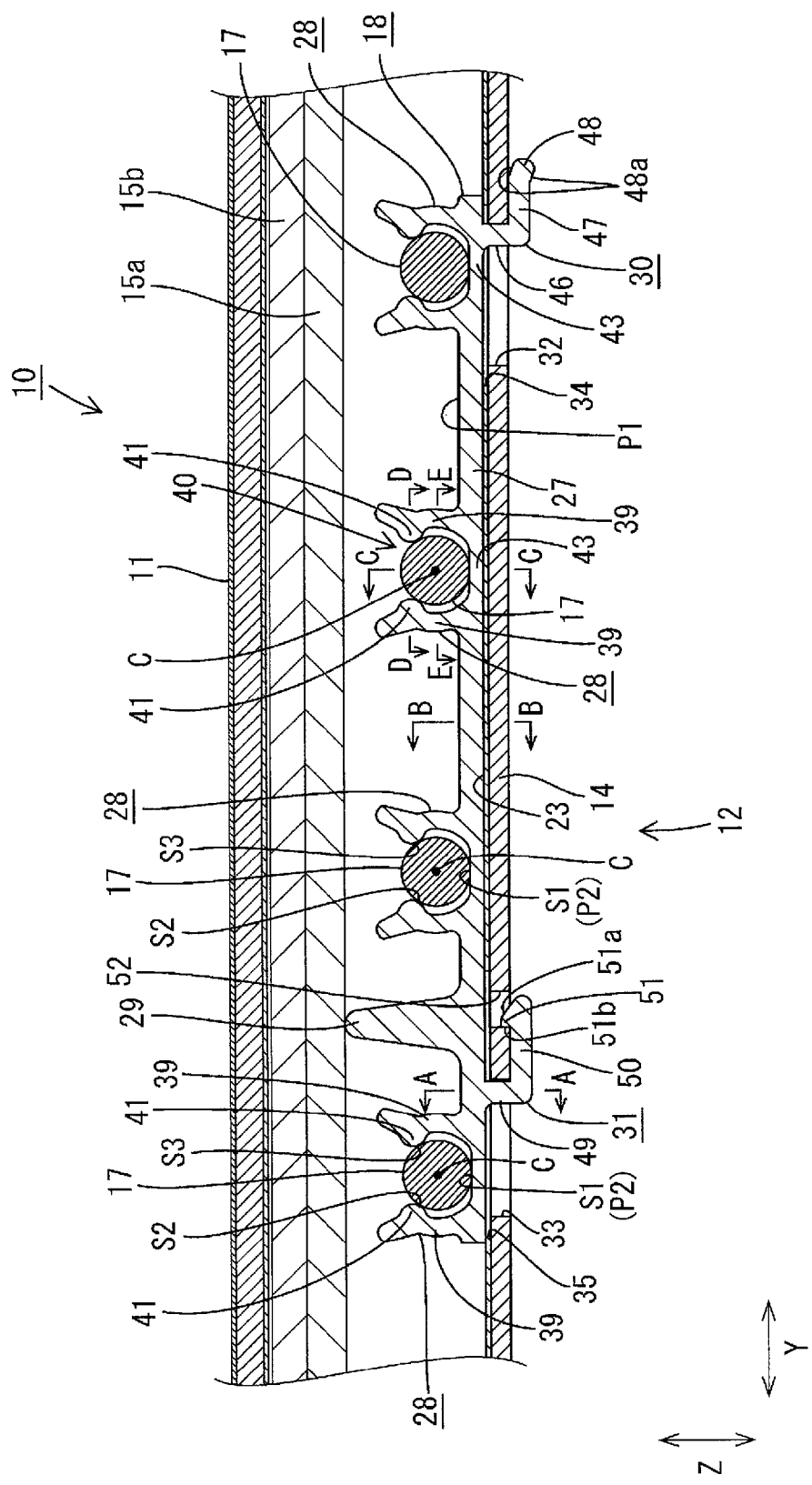
FIG. 12 is a sectional view showing the lamp clip in the liquid crystal display device.

Next, the support pin 29 that constitutes a support structure for the diffuser plate 15a will be described in detail. As shown in FIG. 12, the support pin 29 supports, from a back side, a screen middle portion rather than an outer edge supported by the holder 20 or the like in the diffuser plate 15a to restrict the diffuser plate 15a from being bent or warped toward the cold cathode tube 17. As shown in FIG. 6, the support pin 29 has a circular sectional shape when cut along a horizontal direction, and is tapered to have a progressively decreasing diameter from a root toward a tip as shown in FIGS. 5 and 8. Specifically, the support pin 29 has a substantially conical shape. A tip portion of the support pin 29 that can abut against the diffuser plate 15a has a rounded surface. In an outer peripheral surface of a root portion of the support pin 29, a curved surface extending toward the main body 27 is formed and gently connected to the inclined surfaces 38 of the main body 27 without a step. The diameter of the root portion of the support pin 29 is larger than a width (size in the X-axis direction) of an arm portion 39 of the lamp gripping portion 28 described next, while the diameter of the tip portion is smaller than the width of the arm portion 39 of the lamp gripping portion 28. A protruding height of the support pin 29 from the main body 27 is set to be higher than that of the lamp gripping portion 28. As described above, the support pin 29 is placed in the position eccentric from the middle position in the length direction of the main body 27, but placed in the middle position in the width direction.

The support pin 29 protrudes to the highest position in the lamp clip 18. Thus, when the lamp clip 18 is mounting to and removal from the chassis 14, an operator can grip the support pin 29 and perform the operation, and the support pin 29 also functions as a handling portion during mounting and removal of the lamp clip 18.

Next, the lamp gripping portion 28 that constitutes the support structure for the cold cathode tube 17 will be described in detail. As shown in FIG. 12, the lamp gripping portion 28 can support an intermediate portion between the opposite edge portions provided with electrodes in the cold cathode tube 17, that is, a light emitting portion from a back side in a height position slightly raised from the reflection sheet 23. The lamp gripping portion 28 generally has a closed-end annular shape opening on the front side, and has a pair of arm portions 39 opposing each other. Between tip portions of the arm portions 39, an opening 40 is ensured through which the cold cathode tube 17 attached and detached along the Z-axis direction (thickness direction of the bottom plates of the chassis 14 and the reflection sheet 23) can pass. The arm portions 39 are cantilevered to rise from positions spaced apart in the length direction (Y-axis direction) in the front side surface of the main body 27, and curved into a substantially arc shape. A curvature of the arm portion 39 substantially matches a curvature of the outer peripheral surface of the cold cathode tube 17 to be mounted, and a gap formed between the arm portions 39 and the cold cathode tube 17 has a substantially fixed width in a circumferential direction in the mounting state. The arm portions 39 have a symmetrical shape with respect to an axis of symmetry along the Z-axis direction passing through the middle position in the Y-axis direction of the lamp gripping portion 28. The arm portions 39 are elastically deformable in the width direction with a rising base end from the main body 27 as a pivot. Each arm portion 39 has a symmetrical shape with respect to an axis of symmetry along the Z-axis direction passing through the center position in the width direction (X-axis direction) as shown in FIG. 8. The arm portion 39 has a width smaller than the width of the main body 27. The arm portion 39 has a progressively increasing width at a protruding base end and is gently connected to the main body 27, thereby restricting a step from being formed.

On inner surfaces (surfaces opposing the cold cathode tube 17) of tip portions of the arm portions 39, as shown in FIG. 12, holding protrusions 41 for holding the cold cathode tube 17 are provided, and the above-described opening 40 is ensured between the holding protrusions 41. A space in the opening 40 is set to be slightly narrower than the outer diameter of the cold cathode tube 17. Thus, when the cold cathode tube 17 is attached and detached through the opening 40, the arm portions 39 are pressed by the cold cathode tube 17 and elastically expanded and deformed. The holding protrusion 41 protrudes inward from the inner surface of the tip portion of the arm portion 39 (toward the central axis AX of the cold cathode tube 17), and is located on the front side (light emission side) of the center C of the cold cathode tube 17 in the mounting state, that is, on a side in a removing direction of the cold cathode tube 17. In the mounting state, the cold cathode tube 17 is supported at three points by a middle first support point S1 located directly below the center C of the cold cathode tube 17 and a second support point S2 and a third support point S3 at inner ends of the holding protrusions 41 on the bottom surface of the lamp gripping portion 28. Between the support points S1 to S3, a slight gap (clearance) extending circumferentially is created between the outer peripheral surface of the cold cathode tube 17 and the inner peripheral surface of the lamp gripping portion 28. At this time, the support points S1 to S3 for the cold cathode tube 17 are connected, and then an isosceles triangle is drawn. Angles formed by a line connecting the first support point S1 and the center C of the cold cathode tube 17, a line connecting the second support point S2 and the center C, and a line connecting the third support point S3 and the center C (not shown) are each an obtuse angle.

On outer surfaces of the tip portions of the arm portions 39, guide portions 42 (FIG. 15) for guiding the mounting operation of the cold cathode tube 17 are provided. The guide portions 42 are tapered to rise obliquely outward from the arm portions 39. The guide portions 42 slope from protruding base ends toward protruding tips to be spaced apart from each other, and inner surfaces opposing the cold cathode tube 17 are inclined surfaces similarly sloping. Thus, the space between the inner surfaces that are opposing surfaces of the guide portions 42 progressively decreases toward the lower side in the drawing, that is, toward the mounting direction of the cold cathode tube 17, while progressively increases toward the removing direction of the cold cathode tube 17. Thus, the inner surfaces of the guide portions 42 can smoothly guide the mounting operation of the cold cathode tube 17. The inner surfaces of the guide portions 42 are gently connected to the inner surfaces of the holding protrusions 41.

Figure 15:
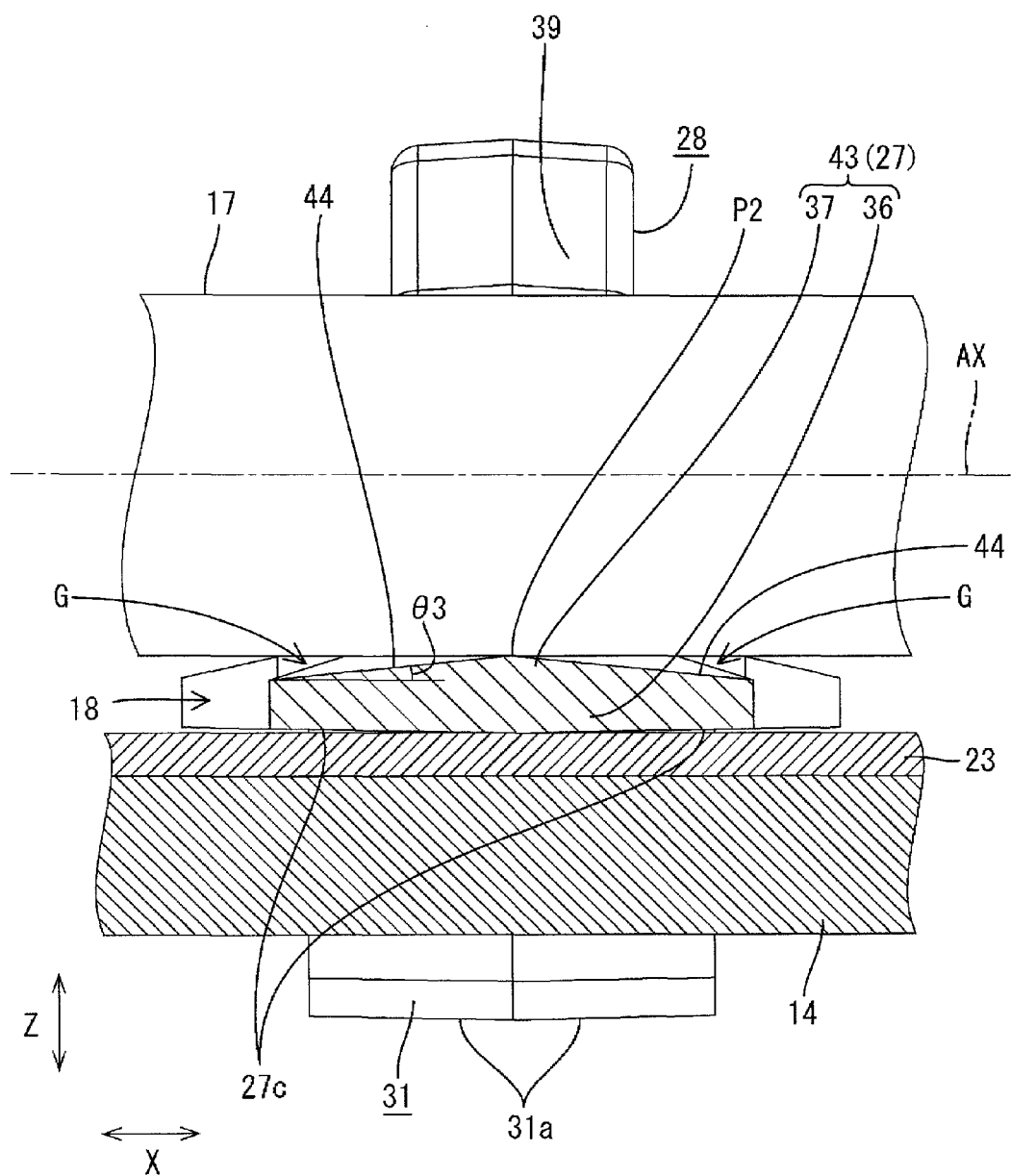
FIG. 15 is a sectional view taken along the line C-C in FIG. 12.

As shown in FIGS. 5 and 12, the bottom surface (including the first support point S1) of the lamp gripping portion 28 between the arm portions 39 is set to be lower than the vertex P1 of the inclined surfaces 38 (protruding tip of the protruding portion 37) of the main body 27. In other words, a recess having a predetermined width is formed in the front side surface of the main body 27, and the arm portions 39 rise from positions on opposite sides of the recess to form the lamp gripping portion 28. The recess is formed over the entire width direction (X-axis direction) of the main body 27, and a depth thereof is set to be slightly smaller than the largest thickness of the protruding portion 37. Thus, in the main body 27, the pedestal portion 36 has a fixed thickness over the entire length, while the protruding portion 37 is partially formed to be thin in a portion corresponding to each lamp gripping portion 28 in the length direction. It can be said that a bottom portion 43 having the bottom surface of the lamp gripping portion 28 is constituted by the pedestal portion 36 and thin portions in the protruding portion 37 (FIG. 15). The bottom portion 43 that is also a part of the main body 27 is formed to be wider than the arm portion 39 that constitutes the lamp gripping portion 28. The cold cathode tube 17 is supported so that the bottom surface is located in a position lower than the vertex P1 of the main body 27, that is, a position close to the reflection sheet 23 (position far from the diffuser plate 15a), and is suitable for reducing the thickness of the entire backlight unit 12. The center C of the cold cathode tube 17 is located in a position higher than the vertexes P1 and P2 of the main body 27 (position on the front side). The bottom surface of the lamp gripping portion 27 herein is a portion located in the lowest side in the Z-axis direction as a vertical direction in the peripheral surface of the lamp gripping portion 27 opposing the cold cathode tube 17, and also a portion closest to the chassis 14 in the peripheral surface of the lamp gripping portion 27 opposing the cold cathode tube 17. Further in other words, the bottom surface of the lamp gripping portion 27 is a root portion of the lamp gripping portion 27 in the peripheral surface opposing the cold cathode tube 17.

The bottom surface of the lamp gripping portion 28 has a substantially straight shape with a fixed height in the length direction (Y-axis direction) of the main body 27, while as shown in FIG. 15, has an angular shape with a skirt extending in a direction away from the central axis AX of the cold cathode tube 17 in the width direction (X-axis direction, length direction of the cold cathode tube 17 (direction of the central axis AX)) of the main body 27. Specifically, a gap G having different widths in the length direction of the cold cathode tube 17 is formed between the surface of the cold cathode tube 17 and the inner peripheral surface of the lamp gripping portion 28. More specifically, the bottom portion 43 of the lamp gripping portion 28 has an angular shape with the largest thickness in the middle position in the width direction of the main body 27 and a progressively decreasing thickness from the middle position toward opposite end positions. The bottom surface of the lamp gripping portion 28 is constituted by a pair of inclined surfaces 44 (relief surfaces) sloping downward from the middle side toward the opposite edge portions in the width direction of the main body 27. The inclined surface 44 is a sloping surface such that a distance from the reflection sheet 23 progressively decreases from the middle position toward the opposite end sides in the width direction of the main body 27, in other words, a distance (space, clearance, gap G) from the cold cathode tube 17 (diffuser plate 15a) progressively increases. In other words, the gap G between the surface of the cold cathode tube 17 and the inclined surface 44 of the lamp gripping portion 28 progressively extends from the middle of the lamp gripping portion 28 toward the opposite end sides along the length direction of the cold cathode tube 17, and has the largest opening space in the opposite end positions. Specifically, the protruding portion 37 on the bottom portion 43 of the lamp gripping portion 28 has a substantially isosceles triangular sectional shape, and the pair of inclined surfaces 44 are formed on the bottom surface that is the surface of the protruding portion 37 at the vertex P2 (including the first support point S1) in the middle in the width direction as a border. Specifically, the bottom portion 43 of the lamp gripping portion 28 has a symmetrical shape with respect to the Z-axis direction passing through the middle position in the width direction. Thus, the inclined surfaces 44 have the same inclination angle θ3. An angle formed by the inclined surfaces 44 connected at the vertex P2 of the bottom portion 43 of the lamp gripping portion 28 is an obtuse angle. The vertex P2 of the bottom portion 43 of the lamp gripping portion 28 is lower than the vertex P1 of the protruding portion 37 of the main body 27 as described above. Thus, the inclination angle θ3 of the inclined surface 44 formed on the bottom portion 43 of the lamp gripping portion 28 is smaller than inclination angles θ1 and θ2 (see FIGS. 13 and 14) of the inclined surface 38 formed on the protruding portion 37 of the main body 27 outside the lamp gripping portion 28.

Figure 16:
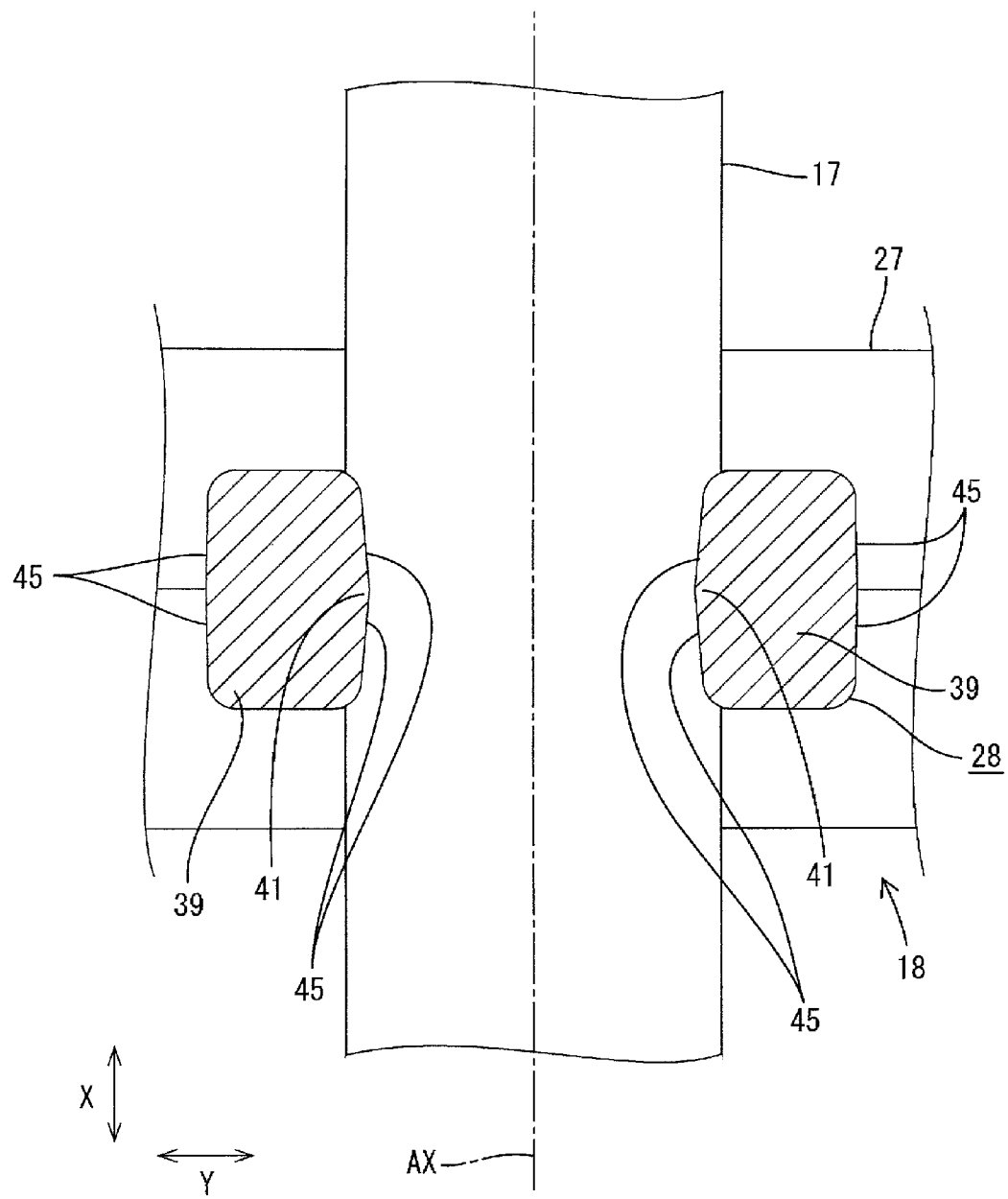
FIG. 16 is a sectional view taken along the line D-D in FIG. 12.
Figure 17:
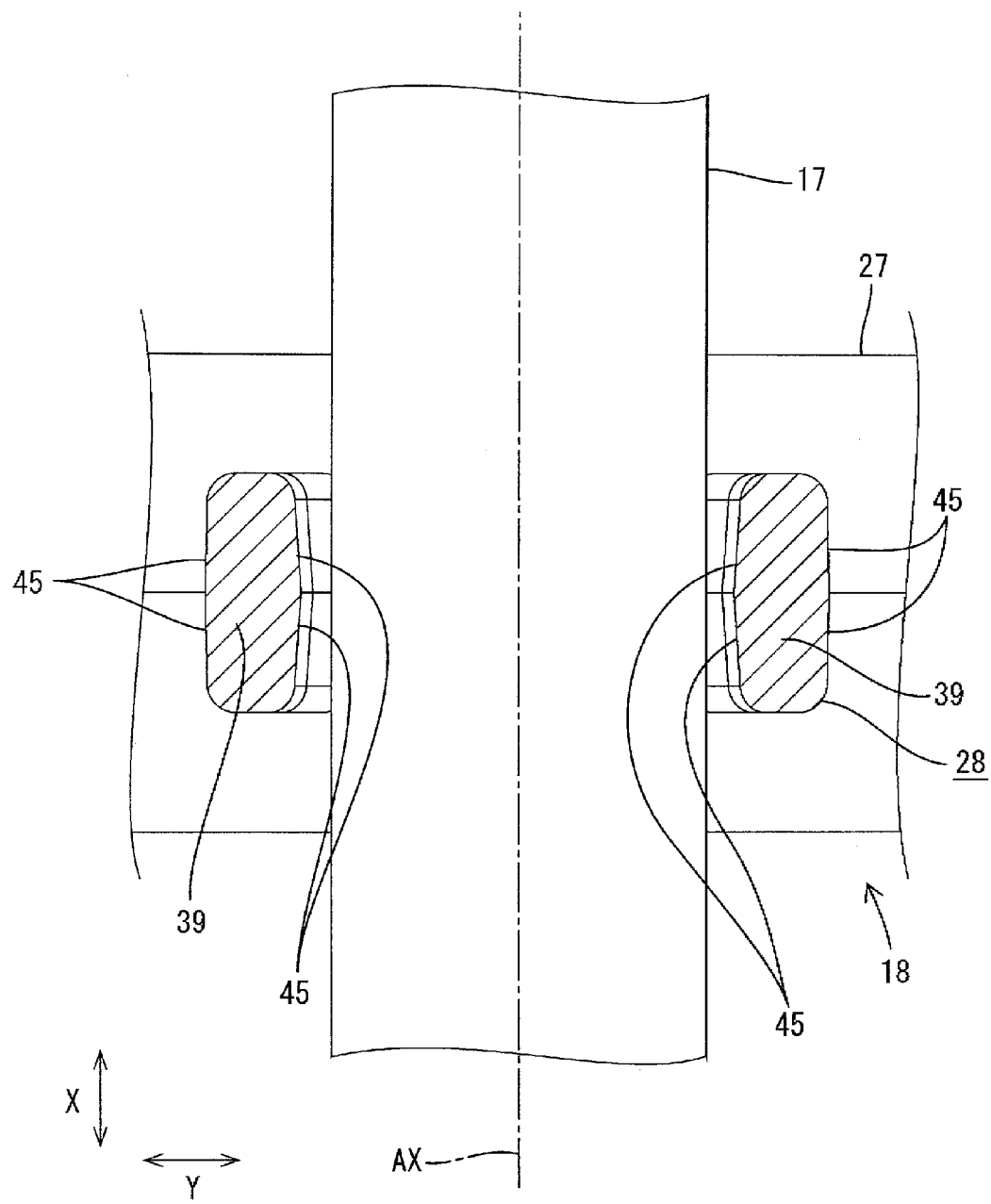
FIG. 17 is a sectional view taken along the line E-E in FIG. 12.
Figure 18:
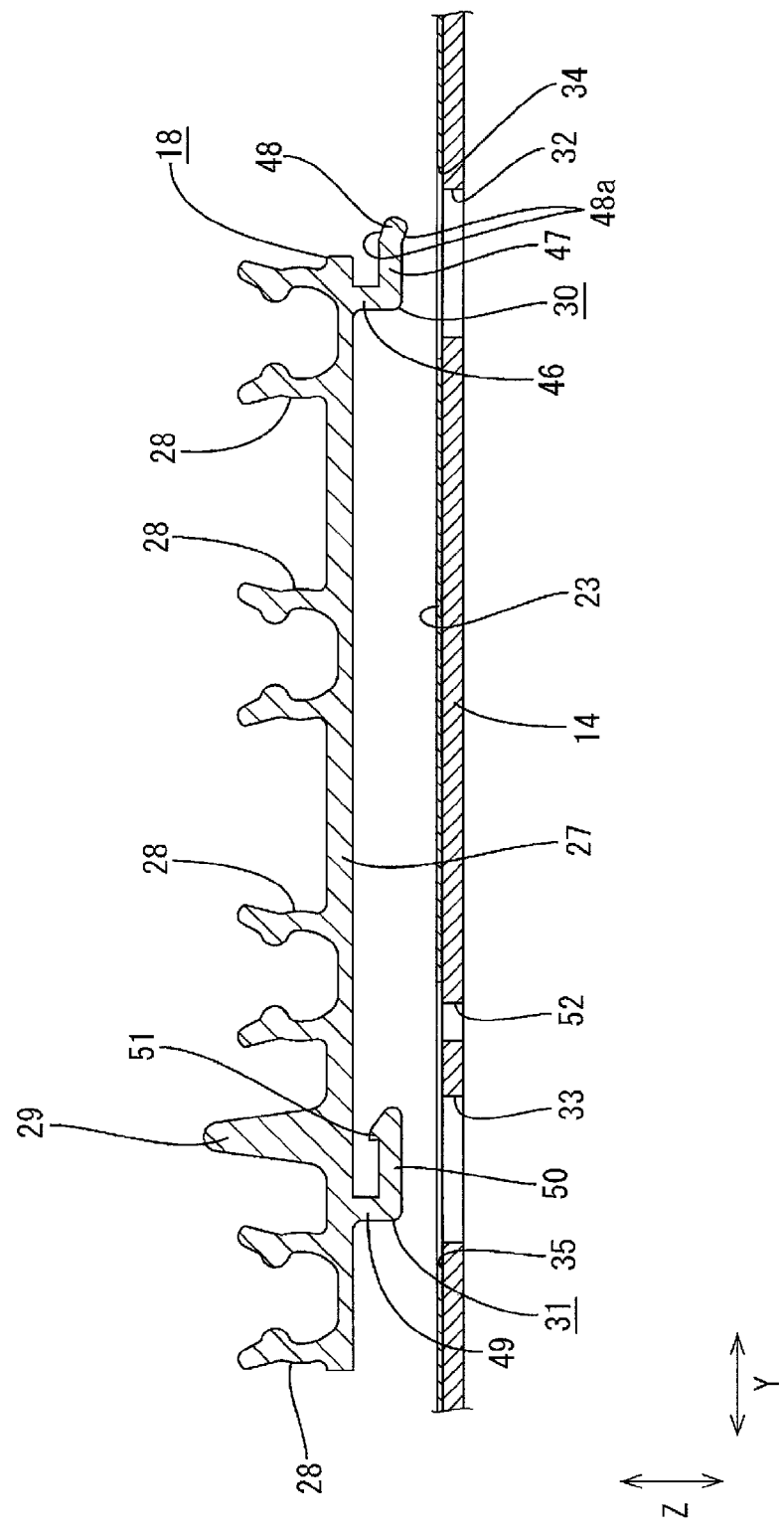
FIG. 18 is a sectional view showing the lamp clip before being mounted to the chassis.

As shown in FIG. 17, the inclined surface 44 formed on the bottom portion 43 of the lamp gripping portion 28 is formed to continuously extend to the inner peripheral surface of the arm portion 39 to form an extended inclined surface 45. Further, as shown in FIG. 16, the extended inclined surface 45 is extended from the inner peripheral surface of the holding protrusion 41 to the inner peripheral surface and the outer peripheral surface of the guide portion 42, and further extended to the outer peripheral surface of the arm portion 39. Thus, the extended inclined surface 45 is formed over the entire inner peripheral surfaces and outer peripheral surfaces of the arm portion 39, the holding protrusion 41, and the guide portion 42. Thus, the arm portion 39, the holding protrusion 41, and the guide portion 42 have progressively decreasing thicknesses from the middle position toward the opposite end positions in the width direction (X-axis direction).

In the state where the cold cathode tube 17 is mounted, as shown in FIGS. 15 to 17, the distance (space, gap) between the outer peripheral surface of the cold cathode tube 17 and the inner peripheral surface (surface opposing the cold cathode tube 17) of the lamp gripping portion 28 including the bottom surface progressively increases from the middle position toward the opposite end positions (outward in the axial direction of the cold cathode tube 17) in the X-axis direction of the lamp gripping portion 28. Thus, when the cold cathode tube 17 is lit, the light emitted from the cold cathode tube 17 passes through the gap (clearance) ensured between the cold cathode tube 17 and the lamp gripping portion 28, is incident on the inclined surface 44 and the extended inclined surface 45, and then is reflected and travels toward the diffuser plate 15*a*. The amount of light traveling toward the diffuser plate 15*a* can be increased to improve light taking efficiency from the cold cathode tube 17 as compared with a case where if the lamp gripping portion 28 has a straight inner peripheral surface, it is highly likely that the light emitted from the cold cathode tube 17 is incident on the inner peripheral surface of the lamp gripping portion 28 and is reflected, and then returned as it is to the cold cathode tube 17. The extended inclined surface 45 is also formed on the outer peripheral surface of the lamp gripping portion 28, and thus a light incident on the lamp gripping portion 28 from outside can be satisfactorily reflected toward the diffuser plate 15*a*. This can provide uniform light reflection efficiency of the lamp gripping portion 28. The inclined surface 44 and the extended inclined surface 45 are formed on the inner and outer peripheral surfaces of the lamp gripping portion 28, which is advantageous in mold opening in resin molding of the lamp clip 18.

Next, the mounting portions 30 and 31 that constitute a holding structure for the lamp clip 18 on the chassis 14 will be described in detail together with the mounting holes 32 and 33 and the passage holes 34 and 35 in the chassis 14 and the reflection sheet 23. First, the holding structure will be briefly described. As shown in FIG. 5, the mounting portions 30 and 31 each has a hook shape along a back surface (plate surface) of the main body 27, and the mounting portions 30 and 31 are inserted into the mounting holes 32 and 33 and the passage holes 34 and 35 in the chassis 14 and the reflection sheet 23 and protruded on the back side of the chassis 14 (see FIG. 20). In this state, the lamp clip 18 is slid along the length direction (Y-axis direction, plate surface direction of the bottom plates of the reflection sheet 23 and the chassis 14) of the main body 27, and thus as shown in FIG. 12, the chassis 14 and the reflection sheet 23 can be held between the mounting portions 30 and 31 and the main body 27.

As described above, the pair of mounting portions 30 and 31 are provided in the positions spaced apart from each other in the length direction of the main body 27 in the lamp clip 18, and are referred to as the first mounting portion 30 and the second mounting portion 31. The first mounting portion 30 is provided near the edge portion on the side opposite the support pin 29 in the length direction of the main body 27, while the second mounting portion 31 is provided near the edge portion on the side of the support pin 29 in the length direction of the main body 27. In the first mounting portion 30 and the second mounting portion 31, a pair of gentle inclined surfaces 30*a* and a pair of gentle inclined surfaces 31*a*, respectively, are formed with a vertex in a middle position in the width direction over the entire circumference and entire region. Inclination angles of the inclined surfaces 30*a* and 31*a* are substantially the same as that of the inclined surface 27*c* on the bottom surface of the main body 27 described above.

Specifically, the first mounting portion 30 includes a base portion 46 protruding from a back side surface of the main body 27 toward the back side (side of the chassis 14 along the Z-axis direction), and an extending portion 47 substantially squarely bent from the tip of the base portion 46 and protruding (extending) along the length direction (Y-axis direction) of the main body 27, and has a substantially L shape as viewed from the front. The base portion 46 is located on the back side of the lamp gripping portion 28 provided at the edge portion on the side opposite the support pin 29 in the length direction of the main body 27, and more specifically, located in substantially the same position as the base end position of the arm portion 39 on the end side that constitutes the lamp gripping portion 28. The base portion 46 is connected to the wide portion 27*a* of the main body 27, and thus even if a force is applied to the main body 27 via the first mounting portion, the main body 27 is less likely to be deformed or damaged. The base portion 46 is provided in the substantially middle position in the width direction of the main body 27.

The extending portion 47 is cantilevered to extend from the base portion 46 to the side opposite the support pin 29, and has a length such that a tip portion protrudes further laterally from the edge portion (front edge portion in a sliding direction) on the side opposite the support pin 29 of the main body 27. In other words, the distal end portion (including a distal end guiding portion 48 described next) of the extending portion 47 protrudes outward from an outer edge of the main body 27 on the plan view. The extending portion 47 has a rectangular shape as viewed from the back side, and has a size along the X-axis direction (width) set to be smaller than a size (length) along the Y-axis direction (sliding direction). In the extending portion 47, a portion connected to the base portion 46 extends substantially parallel to the main body 27, while the distal end portion is bent to form an obtuse angle, and the bent distal end portion is the distal end guiding portion 48 that can guide the mounting operation to the chassis 14. The distal end guiding portion 48 is inclined so that a distance to the main body 27 increases toward the distal end. In other words, the distal end guiding portion 48 is formed to be away from the main body 27 toward the distal end, and has a substantially fixed thickness over the entire length, and thus both front and back surfaces thereof form guide surfaces 48*a*. A root position of the distal end guiding portion 48 is located outside the end surface in the length direction of the main body 27. The base portion 46 and the extending portion 47 have substantially the same width, which is smaller than the width of the main body 27.

Figure 11:
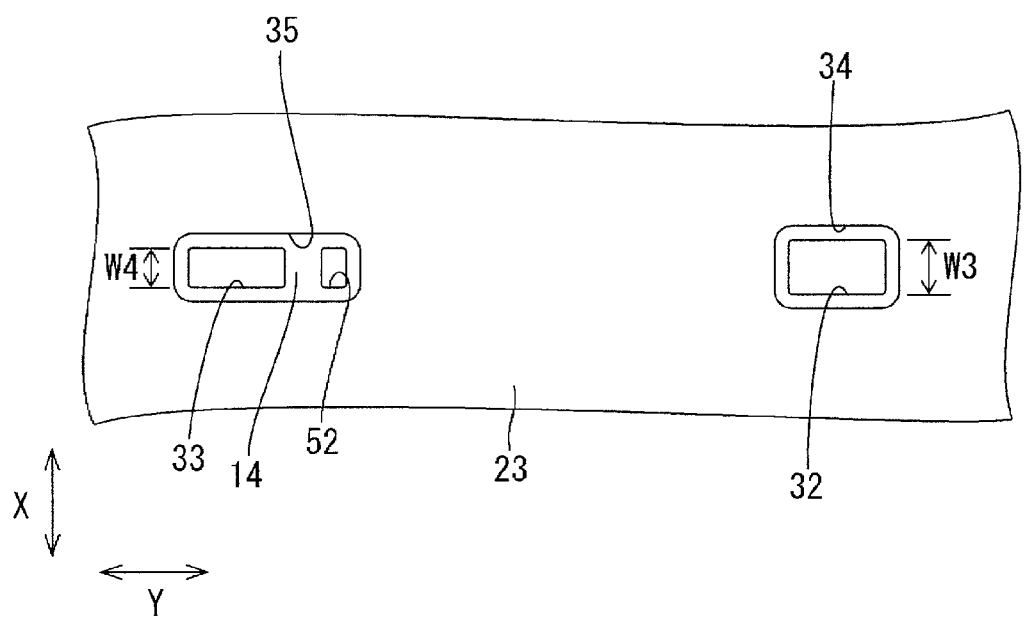
FIG. 11 is a magnified plan view of the chassis and the reflection sheet.

As shown in FIG. 11, the first mounting hole 32 and the first passage hole 34 through which the first mounting portion 30 having the above-described configuration can be inserted are formed through the chassis 14 and the reflection sheet 23 in the thickness direction. The first mounting hole 32 formed in the chassis 14 has a rectangular shape on the plan view, and has a width and a length (size in a direction perpendicular to the Z-axis direction (inserting direction of the first mounting portion 30 into the first mounting hole 32) set to be substantially the same as or larger than those of the first mounting portion 30. Meanwhile, the first passage hole 34 formed in the reflection sheet 23 has a rectangular shape on the plan view like the first mounting hole 32, and has a width and a length set to be much larger than those of the first mounting hole 32. A difference in size between the first mounting hole 32 and the first passage hole 34 is set to be the same as or larger than an assumed maximum value of a displacement amount that may occur between the reflection sheet 23 and the chassis 14 when the reflection sheet 23 is assembled to the chassis 14. Thus, the first mounting hole 32 is reliably placed inside the first passage hole 34 to avoid the reflection sheet 23 from covering the first mounting hole 32. Conversely, the rim of the first mounting hole 32 in the chassis 14 is not covered by the reflection sheet 23, and directly faces the back surface of the main body 27 without via the reflection sheet 23.

Figure 20:
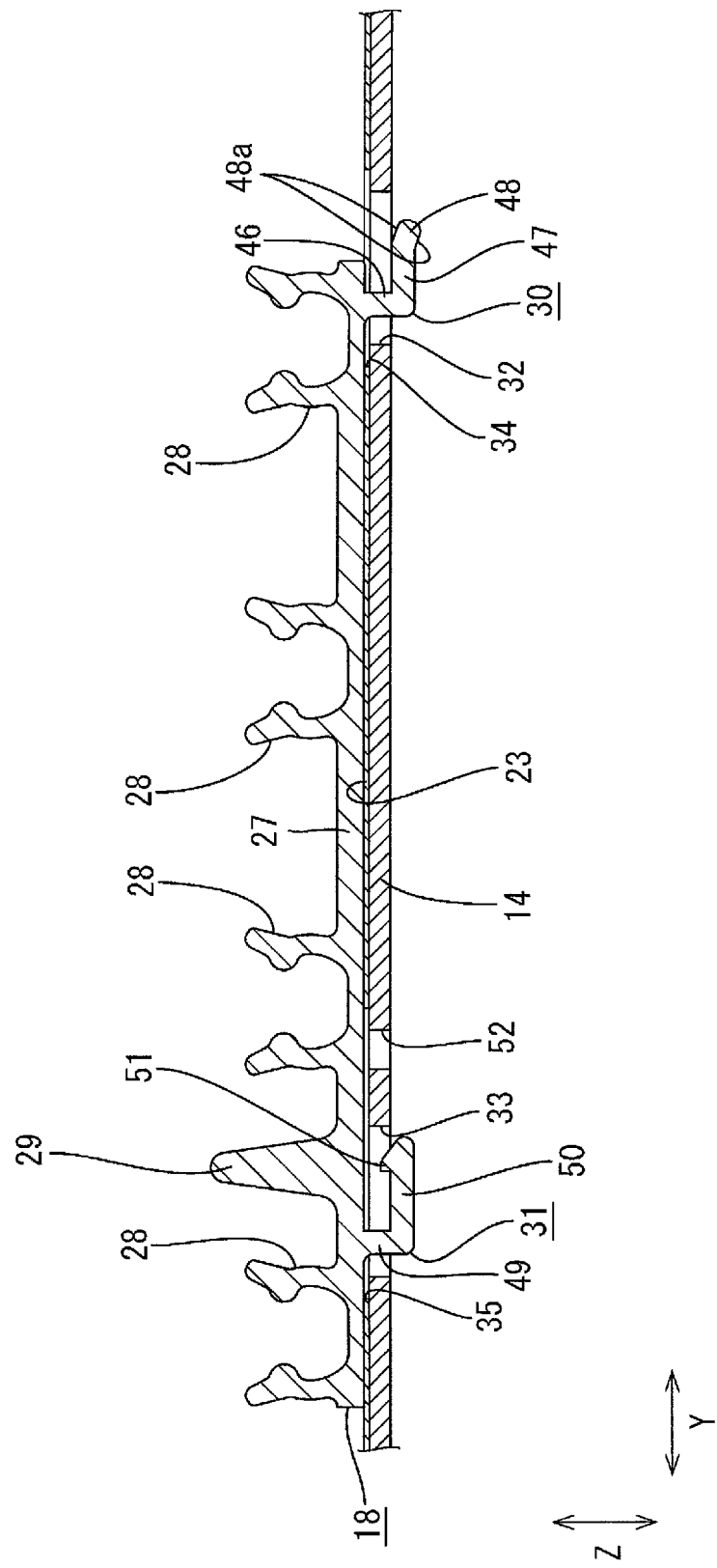
FIG. 20 is a sectional view showing the lamp clip before the main body is slid for mounting.

As shown in FIG. 20, the first mounting portion 30 is inserted into the first passage hole 34 and the first mounting hole 32 and protruded on the back side of the chassis 14, and the main body 27 is slid in a protruding direction (to the right in FIG. 20 along the Y-axis direction) of the extending portion 47. Then, as shown in FIG. 12, the extending portion 47 is placed on the back side of the front portion in the sliding direction (mounting direction) of the rim of the first mounting hole 32. Thus, the reflection sheet 23 and the chassis 14 are held between the edge portion in the length direction of the main body 27 and the extending portion 47 of the first mounting portion 30. Held portions of the reflection sheet 23 and the chassis 14 sandwiched between the main body 27 and the first mounting portion 30 are rims of the first mounting hole 32 and the first passage hole 34 on the side opposite a locking hole 52 described next. The first passage hole 34 has a width set to be smaller than the width of the main body 27, and also a distance from a lateral end surface of the support pin 29 in the rear end position in the sliding direction of the main body 27 to the base portion 46 is larger than a sliding amount in mounting. Thus, in the mounting state, the first mounting hole 32 and the first passage hole 34 are covered (blocked) by the main body 27 to restrict the holes 32 and 34 from being exposed to the outside of the main body 27.

Figure 19:
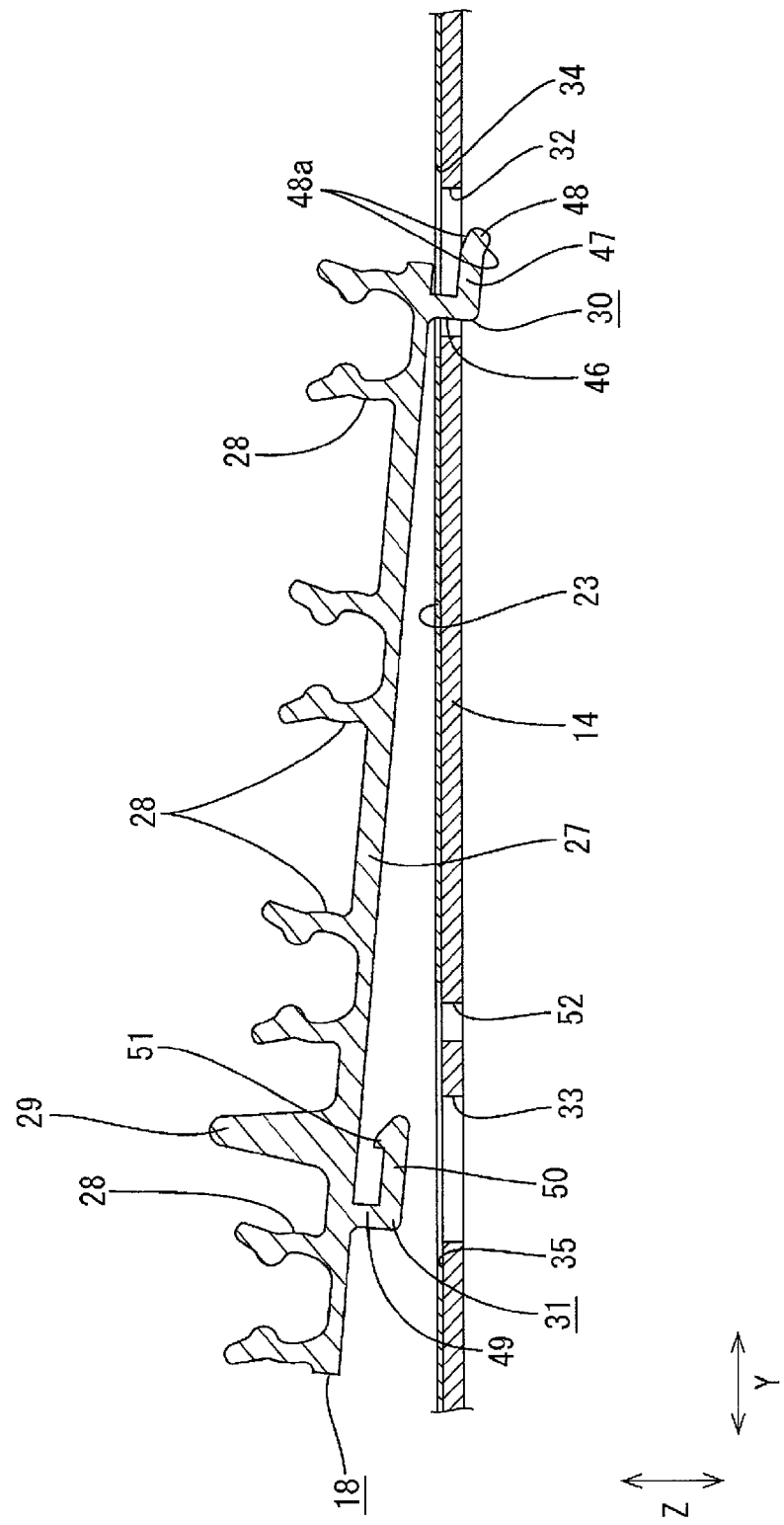
FIG. 19 is a sectional view showing the lamp clip, a main body of which is tilted for mounting.

The first mounting portion 30 protrudes laterally from the edge portion of the main body 27, and thus when the lamp clip 18 is mounted to the chassis 14, the protruding tip portion of the first mounting portion 30 can be previously inserted into the first mounting hole 32 and the operation can be performed. In the mounting operation, as shown in FIG. 19, the body 27 is inclined so that the edge portion provided with the first mounting portion 30 is lowered. At this time, the support pin 29 gripped by the operator is provided eccentrically toward the edge portion on the side opposite the first mounting portion 30 previously inserted of the main body 27, thereby further improving workability in mounting the main body 27 to the chassis 14 while tilting the main body 27.

As shown in FIG. 5, the second mounting portion 31 has a substantially L shape on the front view like the first mounting portion 30, and includes a base portion 49 protruding from the back side surface of the main body 27 toward the back side (side of the chassis 14 along the Z-axis direction), and an extending portion 50 substantially squarely bent from the tip of the base portion 49 and protruding (extending) along the length direction of the main body 27. The base portion 49 is located in a substantially intermediate position between the lamp gripping portion 28 located at the edge portion on the side of the support pin 29 in the length direction of the main body 27 and the support pin 29. Specifically, the second mounting portion 31 is placed on the side opposite the first mounting portion 30 via the support pin 29 in the length direction of the main body 27. The base portion 49 is connected to the wide portion 27a of the main body 27 like the base portion 46 of the first mounting portion 30. A protruding size of the base portion 49 is substantially the same as that of the base portion 46 of the first mounting portion 30. The base portion 49 is provided in a substantially middle position in the width direction of the main body 27, that is, the same position as the base portion 46 of the first mounting portion 30.

The extending portion 50 is cantilevered to extend from the base portion 49 toward the support pin 29, and has a length such that a tip portion thereof is placed on the substantially directly back side of the support pin 29. The extending portion 50 is formed to be substantially parallel to the main body 27 over the entire length, and a locking protrusion 51 is provided on a surface of a protruding tip portion of the extending portion 50 opposing the main body 27. The locking protrusion 51 protrudes from the extending portion 50 so as to be close to the main body 27, and a tapered surface 51a is formed on a surface opposing the main body 27. The tapered surface 51a is formed continuously to the tip of the extending portion 50, and thus the extending portion 50 is tapered. A surface of the locking protrusion 51 opposing the base portion 49 is a vertical surface substantially in parallel with an outer surface of the base portion 49, and substantially straight along the direction (Z-axis direction) perpendicular to the sliding direction (Y-axis direction) of the lamp clip 18 with respect to the chassis 14, and this surface is a locking surface 51b to the chassis 14. The extending portion 50 has a rectangular shape as viewed from the back side, and a size (width) along the X-axis direction is set to be smaller than a size (length) along the Y-axis direction (sliding direction). The extending portion 50 has a length larger than that of the extending portion 47 or the first mounting hole 32 in the first mounting portion 30. The base portion 49 and the extending portion 50 have substantially the same width, which is set to be smaller than the width of the main body 27.

As shown in FIG. 11, the second mounting hole 33 and the second passage hole 35 through which the second mounting portion 31 having the above-described configuration can be inserted are formed through the chassis 14 and the reflection sheet 23 in the thickness direction. Further, the locking hole 52 in which the locking protrusion 51 can be locked is formed through the chassis 14 in the thickness direction. The second mounting hole 33 formed in the chassis 14 has a rectangular shape on the plan view, and has a width and a length (size in a direction perpendicular to the Z-axis direction (inserting direction of the second mounting portion 31 into the second mounting hole 33)) set to be substantially the same as or slightly larger than the second mounting portion 31. The second mounting hole 33 has a length set to be larger than that of the first mounting hole 32 or the first mounting portion 30. The locking hole 52 is formed in a position between the first mounting hole 32 and the second mounting hole 33 and adjacent to the second mounting hole 33 with a predetermined space in the length direction. The locking hole 52 has a rectangular shape on the plan view, and has a width and a length set to be substantially the same as or slightly larger than those of the locking protrusion 51 of the second mounting portion 31. Meanwhile, the second passage hole 35 formed in the reflection sheet 23 has a rectangular shape on the plan view, and has a width and a length set to be much larger than the sum of the widths and lengths of the second mounting hole 33 and the locking hole 52 so that the second passage hole 35 can collectively surround the second mounting hole 33 and locking hole 52. A difference in size between the second mounting hole 33 and the locking hole 52 and the second passage hole 35 is set to be the same as or larger than an assumed maximum value of a displacement amount that may occur between the reflection sheet 23 and the chassis 14 when the reflection sheet 23 is assembled to the chassis 14. Thus, the second mounting hole 33 and the locking hole 52 are reliably placed inside the second passage hole 35 to avoid the reflection sheet 23 from covering the second mounting hole 33 or the locking hole 52. Conversely, the rims of the second mounting hole 33 and the locking hole 52 in the chassis 14 are not covered by the reflection sheet 23, and directly face the back surface of the main body 27 without via the reflection sheet 23.

As shown in FIG. 20, the second mounting portion 31 is inserted into the second passage hole 35 and the second mounting hole 33 and protruded on the back side of the chassis 14, and the main body 27 is slid in a protruding direction (to the right in FIG. 20 along the Y-axis direction) of the extending portion 50. Then, as shown in FIG. 12, the extending portion 50 is placed on the back side of the front portion in the sliding direction (mounting direction) of the rim of the second mounting hole 33, and the locking protrusion 51 at the tip portion enters the locking hole 52 and is locked to the hole edge. Thus, the chassis 14 is held between the connecting portion of the main body 27 to the support pin 29 and the extending portion 50 of the second mounting portion 31, and the locking surface 51b of the locking protrusion 51 is locked to the hole edge of the locking hole 52 to control movement to the back side in the mounting direction (removing direction). A held portion of the chassis 14 held between the main body 27 and the second mounting portion 31 is a portion between the second mounting hole 33 and the locking hole 52. The second passage hole 35 has a width smaller than the width of the main body 27, and also a distance from a lateral end surface on the side of the support pin 29 in the rear end position in the sliding direction of the main body 27 to the base portion 49 is larger than a sliding amount in mounting. Thus, in the mounting state, the second mounting hole 33 and the second passage hole 35 are covered (blocked) by the main body 27 to restrict the holes 33 and 35 from being exposed to the outside of the main body 27.

The lamp clip 18 has the above-described design in which the mounting direction to the chassis 14 is specified so that the support pin 29 eccentrically placed is directed toward the reference line L1 (eccentric toward the reference line L1). Thus, the lamp clip 18 has a control structure for controlling mounting in a direction opposite the specified mounting direction. The control structure will be described below in detail.

Figure 7:
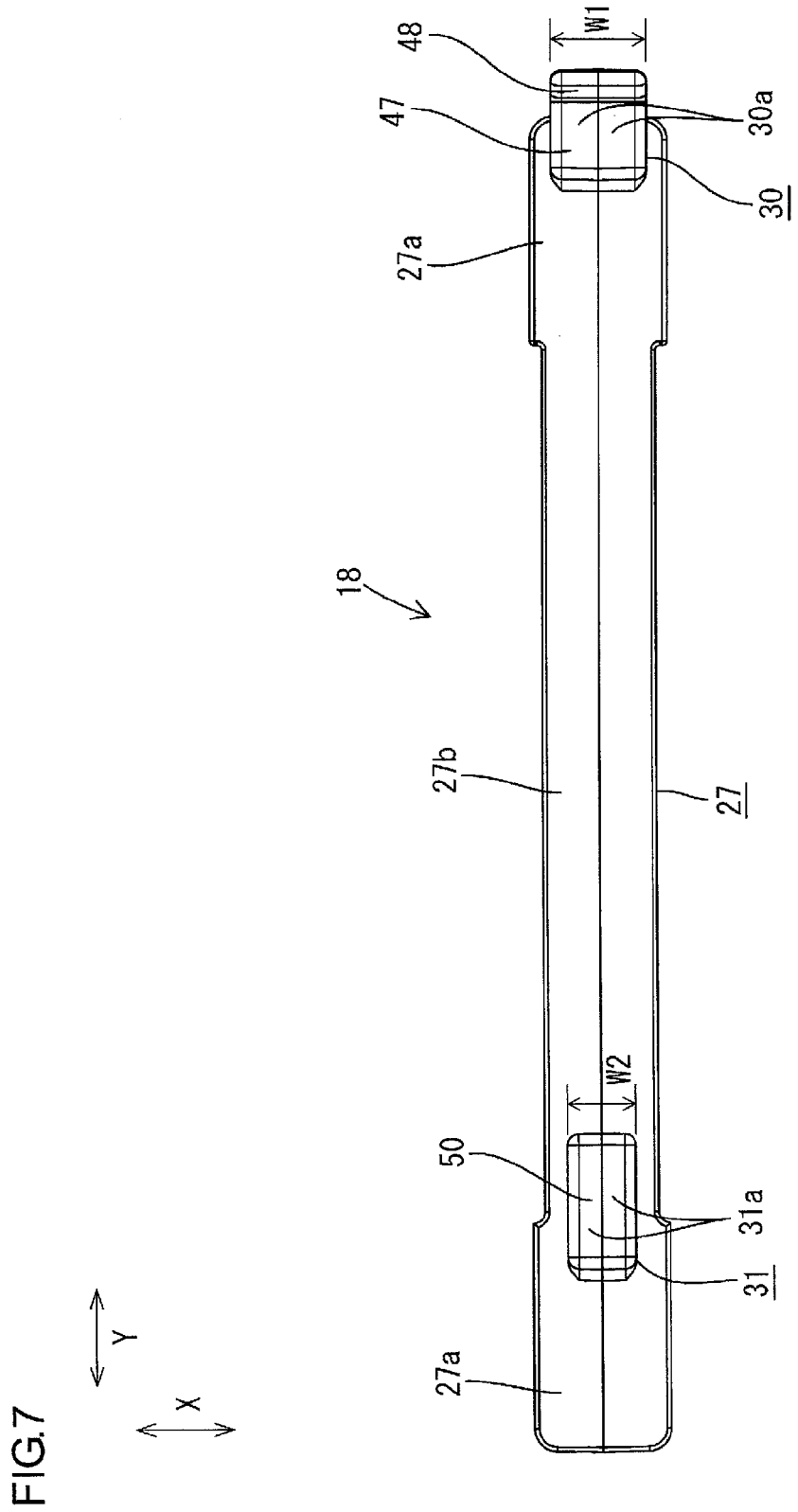
FIG. 7 is a bottom view of the lamp clip.

As shown in FIG. 7, the first mounting portion 30 and the second mounting portion 31 have different widths W1 and W2 (sizes in parallel with and perpendicular to the sliding direction), and correspondingly thereto, as shown in FIG. 11, the first mounting hole 32 and the second mounting hole 33 in the chassis 14 have different widths W3 and W4 (sizes in parallel with and perpendicular to the sliding direction). Specifically, the width W1 of the first mounting portion 30 is larger than the width W2 of the second mounting portion 31, and correspondingly thereto, the width W3 of the first mounting hole 32 is larger than the width W4 of the second mounting hole 33. The width W1 of the first mounting portion 30 is larger than the width W4 of the second mounting hole 33, and the width W3 of the first mounting hole 32 is larger than the width WW2 of the second mounting portion 31. The widths of the first passage hole 34 and the second passage hole 35 in the reflection sheet 23 have the same relationship as the first mounting hole 32 and the second mounting hole 33 in the chassis 14.

Figure 21:
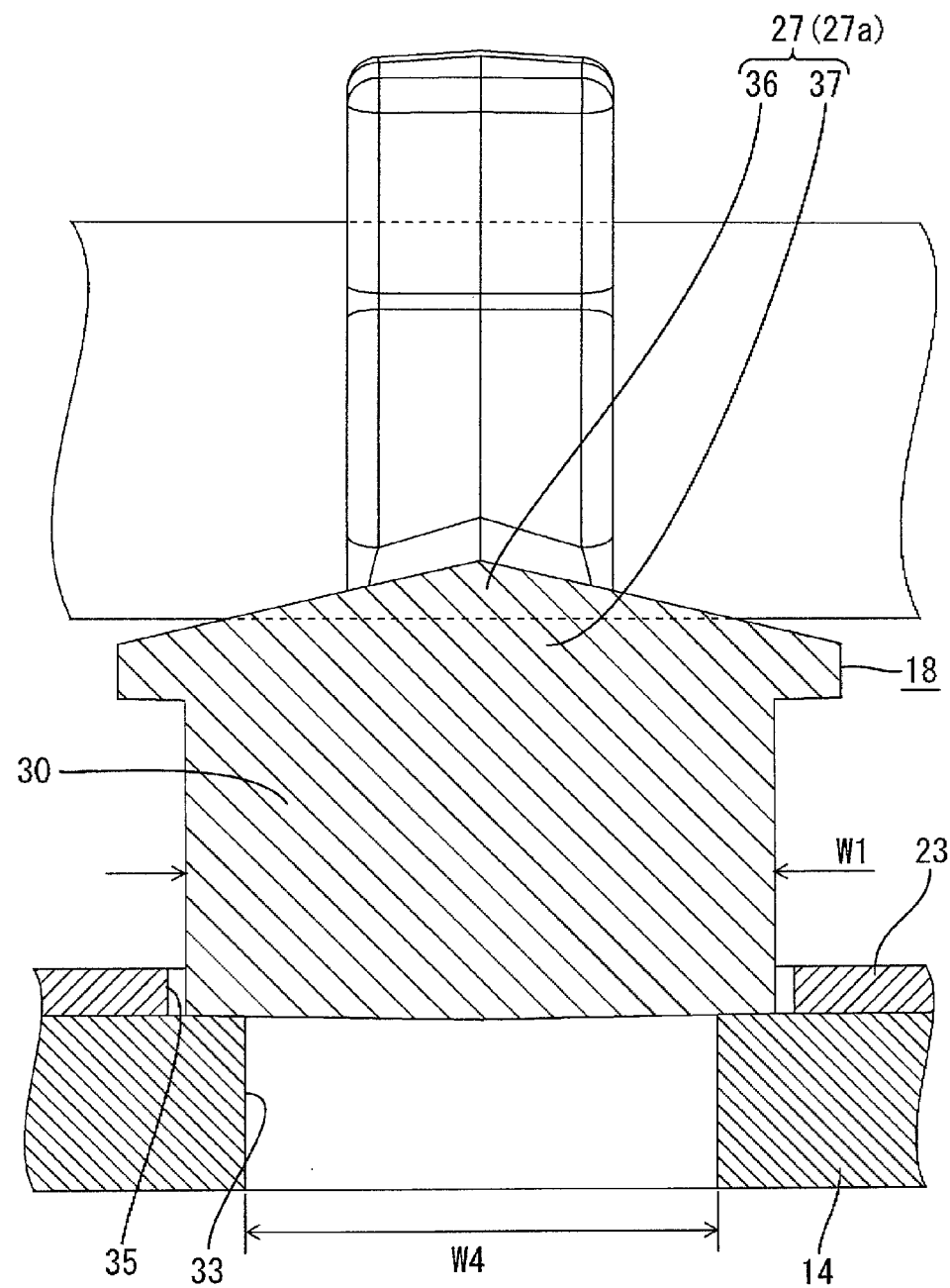
FIG. 21 is a sectional view showing the lamp clip, a first mounting portion of which interferes with a rim of a second mounting hole when the lamp clip is held the other way around to the normal mounting direction.

Thus, in the case where the lamp clip 18 is mounted to the chassis 14 in the mounting direction opposite the normal direction, the first mounting portion 30 is about to enter the second mounting hole 33 and the second mounting portion 31 is about to enter the first mounting hole 32 with the mounting portions 30 and 31 being in misalignment with the originally corresponding mounting holes 32 and 33. However, as shown in FIG. 21, the width W1 of the first mounting portion 30 is larger than the width W4 of the second mounting hole 33, and thus the edge portion in the width direction of the first mounting portion 30 interferes with the edge portion in the width direction in the rim of the second mounting hole 33 to control the mounting operation with the main body 27 being raised from the chassis 14. This can restrict the lamp clip 18 from being mounted in the wrong mounting direction. It can be said that the edge portion in the width direction of the rim of the second mounting hole 33 functions as a mounting control portion that controls mounting of the lamp clip 18.

This embodiment has the above-described structure, and an operation thereof will be described next. The liquid crystal panel 11 and the backlight unit 12 are separately produced and assembled to each other using the bezel 13 or the like to produce the liquid crystal display device 10 shown in FIGS. 3 and 4. Then, an assembling operation of the backlight unit 12, particularly, the mounting operation of the lamp clip 18 will be described in detail.

When the reflection sheet 23 is provided on the inside of the chassis 14, as shown in FIG. 10, the corresponding mounting holes 32 and 33 and the locking hole 52 are aligned to face the passage holes 34 and 35, and then each lamp clip 18 is mounted to the chassis 14. The mounting direction of the lamp clip 18 to the chassis 14 is different depending on which of the regions A1 and A2 of the chassis 14 the lamp clip 18 is mounted to. Specifically, the mounting directions of the lamp clip 18 are set in opposite directions in the first area A1 and the second area A2 at the reference line L1 on the chassis 14 as a border, a first mounting direction (mounting direction with the support pin 29 being eccentric downward in FIG. 9) is set in the first area A1, and a second mounting direction opposite the first mounting direction (mounting direction with the support pin 29 being eccentric upward in FIG. 9) is set in the second area A2. Thus, in mounting the lamp clip 18, the mounting direction corresponding to the mounting position to the chassis 14 needs to be selected.

The case where the lamp clip 18 is mounted in the normal mounting direction will be described. When the support pin 29 eccentrically placed on the main body 27 is gripped, the lamp clip 18 is moved from the state shown in FIG. 18 in the Z-axis direction so as to be close to the chassis 14, the main body 27 is positioned so that the edge portion on the side opposite the support pin 29 is lowered, and the first mounting portion 30 protruding from the edge portion forward in the mounting direction is previously inserted into the first passage hole 34 and the first mounting hole 32. At this time, as shown in FIG. 19, the guide surface 48a of the distal end guiding portion 48 formed at the front edge portion of the first mounting portion 30 is brought into slide contact with the hole edge part of the first mounting hole 32 to achieve smooth insertion. Then, the main body 27 is displaced to be parallel to the bottom plates of the chassis 14 and the reflection sheet 23, and the second mounting portion 31 is inserted into the second passage hole 35 and the second mounting hole 33. If the extending portion 47 of the first mounting portion 30 protrudes on the back side of the chassis 14, the main body 27 may be slightly slid in the extending direction of the extending portions 47 and 50 before the second mounting portion 31 is inserted.

As shown in FIG. 20, when the main body 27 is slid in the extending direction of the extending portions 47 and 50 (to the right in FIG. 20 along the Y-axis direction) from the state where the extending portions 47 and 50 of the first mounting portion 30 and the second mounting portion 31 protrude on the back side of the chassis 14, the extending portions 47 and 50 oppose the back surface of the chassis 14, and abut or are brought close to the front portion in the mounting direction of the hole edge parts of the mounting holes 32 and 33. In this process, the locking protrusion 51 of the second mounting portion 31 rides up onto the back surface of the chassis 14, and the extending portion 50 is once elastically deformed. When the lamp clip 18 is slid a predetermined distance, as shown in FIG. 12, the locking protrusion 51 enters the locking hole 52 and the extending portion 50 elastically returns, and the locking surface 51b of the locking protrusion 51 is locked to the inner peripheral surface of the locking hole 52. This can restrict the lamp clip 18 from being accidentally moved in the direction opposite the mounting direction (removing direction, to the left in FIG. 12). At this time, the extending portion 50 returns and abuts against the back surface of the chassis 14 and produces sound, and thus the operator can obtain strong click feeling, and can reliably slide the lamp clip 18 to the normal mounting position (retaining position).

In this state, the reflection sheet 23 and the chassis 14 are held between the extending portions 47 and 50 of the mounting portions 30 and 31 and the main body 27, and thus the lamp clip 18 is held in the mounting state to the chassis 14. In this state, even if vibration or the like is applied and a force to displace the lamp clip 18 along the Z-axis direction to the front side is applied, the extending portions 47 and 50 of the mounting portions 30 and 31 engage the back surface of the chassis 14 to control the displacement of the lamp clip 18 in the Z-axis direction. The pair of mounting portions 30 and 31 are inserted into the mounting holes 32 and 33 to restrict rotation of the lamp clip 18.

Meanwhile, a case where the lamp clip 18 is mounted in the direction opposite the normal mounting direction (a mounting state different from a normal state) will be described. Even if a user mistakenly tries to mount the lamp clip 18 in the wrong mounting direction, the mounting portions 30 and 31 having the different widths W1 and W2 are in misalignment with the corresponding mounting holes 32 and 33. Thus, as shown in FIG. 21, the edge portion in the width direction of the first mounting portion 30 having the comparatively (relatively) large width W1 (relatively larger first mounting portion 30) reliably interferes with the edge portion in the width direction of the rim of the second mounting hole 33 having the comparatively (relatively) small width W4 (relatively smaller second mounting hole 33). Further, the second mounting portion 31 and the second mounting hole 33 have the lengths longer than the lengths of the first mounting portion 30 and the first mounting hole 32, and thus the edge portion in the length direction of the second mounting portion 31 interferes with the edge portion in the length direction of the rim of the first mounting hole 32. Thus, the first mounting portion 30 cannot be inserted into the second mounting hole 33, and the main body 27 is raised from the chassis 14 and the reflection sheet 23. Thus, the operator can reliably find the wrong mounting direction.

When the lamp clip 18 is mounted in the mounting direction opposite the normal direction, and the lamp clip 18 is displaced from a position to which the lamp clip 18 is to be mounted in the chassis 14 in the length direction of the main body 27 (in the short-side direction of the chassis 14), the first mounting portion 30 may enter the first mounting hole 32 or the second mounting portion 31 may enter the second mounting hole 33. However, in that case, the other mounting portion different from one mounting portion that may enter the hole is in misalignment with the corresponding mounting hole, and the other mounting portion is placed on the reflection sheet 23 and the main body 27 is raised, and thus the operator can find the wrong mounting direction. In other words, the mounting holes 32 and 33 arranged in the short-side direction of the chassis 14 are placed in misalignment with the mounting portions 30 and 31 of the lamp clip 18 when the lamp clips 18 to be mounted to positions adjacent to each other in the short-side direction are mounted in the mounting direction opposite the normal direction, and the lamp clip 18 is displaced from the position to which the lamp clip 18 is to be mounted in the length direction of the main body 27.

As described above, mounting of each lamp clip 18 is controlled if the mounting direction (mounting position, mounting state) does not correspond to the region A1 or A2 of the chassis 14. Thus, with all the lamp clips 18 being mounted to the chassis 14, as shown in FIG. 9, the support pins 29 of the lamp clips 18 are reliably aligned eccentrically toward the reference line L1. Thus, when the diffuser plate 15a is mounted later, the screen middle side of the diffuser plate 15a can be satisfactorily supported by the support pins 29 to restrict the diffuser plate 15a from being bent or warped toward the cold cathode tube 17 when thermal expansion or thermal contraction occurs. In particular, in this embodiment, the liquid crystal panel 11 is directly received by the diffuser plate 15a and the optical sheet 15b to reduce a thickness of the liquid crystal display device 10, and thus a slight distance or little distance is ensured between the liquid crystal panel 11 and the diffuser plate 15a and the optical sheet 15b. In such a case, outer edges of the diffuser plate 15a and the optical sheet 15b tend to be easily held and constrained between the holder 20 and the liquid crystal panel 11. This easily causes thermal expansion and contraction eccentrically (concentrically) on the screen middle side, but the support pins 29 are collectively provided on the screen middle side as described above to satisfactorily control warpage or bending of the diffuser plate 15a, which is extremely suitable for reducing the thickness of the liquid crystal display device 10. Conversely, if mounting in the mounting direction opposite the normal direction is allowed, the support pins 29 are eccentrically provided on the side away from the reference line L1, which may reduce a supporting function of the diffuser plate 15a, but such a situation can be reliably avoided.

After the lamp clip 18 is mounted as described above, each cold cathode tube 17 is mounted to each lamp gripping portion 28, and then the holder 20 is mounted. Then, the diffuser plate 15a and the optical sheet 15b are stacked, and the liquid crystal panel 11 is further placed from the front side, and the bezel 13 is assembled, and thus the liquid crystal display device 10 is assembled.

Next, an operation when each cold cathode tube 17 in the backlight unit 12 is lit will be described. As shown in FIG. 12, a linear light emitted from each cold cathode tube 17 is applied directly to the diffuser plate 15a or reflected by the reflection sheet 23 or the lamp clip 18 and then applied to the diffuser plate 15a, converted into a planar light in the process of passing through the diffuser plate 15a and the optical sheet 15b, and then applied to the liquid crystal panel 11. Next, a relationship between the light emitted from the cold cathode tube 17 and the lamp clip 18 will be described in detail.

The cold cathode tube 17 is gripped by the lamp gripping portion 28, and supported at the three points by the first support point S1 located directly below the center C of the cold cathode tube 17 and the second support point S2 and the third support point S3 on the holding protrusions 41 on the bottom surface of the lamp gripping portion 28. Between the support points S1 to S3, a circumferential gap is ensured between the outer peripheral surface of the cold cathode tube 17 and the inner peripheral surface of the arm portion 39. Thus, with decreasing thickness of the backlight unit 12, the cold cathode tube 17 is held in a position lower than the vertex P1 of the main body 27, and even if a slight distance is ensured between the cold cathode tube 17 and the reflection sheet 23, the light emitted from the cold cathode tube 17 can be efficiently emitted to the outside of the lamp gripping portion 28 through the gap.

In the bottom surface between the arm portions 39 in the inner peripheral surface of the lamp gripping portion 28, as shown in FIG. 15, the pair of inclined surfaces 44 are formed having the highest middle position (vertex P2) in the length direction (X-axis direction) of the cold cathode tube 17 and the lowest opposite end positions, and a gap between the inclined surface 44 and the cold cathode tube 17 extends from the middle position toward the opposite end positions, that is, has a skirt shape. Thus, the light emitted form the cold cathode tube 17 toward the bottom surface (side of the chassis 14, directly below, directly back) of the lamp gripping portion 28 passes through the gap extending outward of the lamp gripping portion 28 in the length direction of the cold cathode tube 17 and is efficiently emitted to the outside of the lamp gripping portion 28. At this time, the light emitted from the cold cathode tube 17 toward the bottom surface of the lamp gripping portion 28 passes through the gap and is incident on the inclined surface 44, and is thus angled to be reflected outward of the lamp gripping portion 28 in the length direction of the cold cathode tube 17, and thus few light is returned into the cold cathode tube 17 to further improve light taking efficiency.

The bottom portion 43 of the lamp gripping portion 28 has a symmetrical shape, and the inclined surfaces 44 have the same inclination angle, and thus the light can be emitted from the vertex P2 of the inclined surfaces 44 substantially uniformly to the left and right in FIG. 15 between the cold cathode tube 17 and the bottom portion 43, and is further effective for restricting luminance unevenness. Further, the protruding portion 37 on the bottom portion 43 of the lamp gripping portion 28 has a triangular sectional shape, and thus the inclined surface 44 formed over the entire surface of the protruding portion 37 of the bottom portion 43 can reflect the light toward the diffuser plate 15a, and the inclination angle of the inclined surface 44 can be more gentle than a case where the protruding portion 37 has a trapezoidal sectional shape or the like, which is further suitable for providing uniform light reflection efficiency.

Further, the extended inclined surface 45 having the same slope as the inclined surface 44 is formed over the entire inner peripheral surfaces of the arm portion 39, the holding protrusion 41, and the guide portion 42 besides the bottom surface of the lamp gripping portion 28, and thus a gap progressively extending from the middle position toward the opposite end positions in the length direction of the cold cathode tube 17 is formed between the extended inclined surface 45 and the cold cathode tube 17. Thus, the light emitted from the cold cathode tube 17 toward the bottom surface and also lights emitted to both the lateral sides or the front side can be efficiently emitted through the gap between the cold cathode tube 17 and the extended inclined surface 45 to the outside of the lamp gripping portion 28, and the light having passed through the gap is incident on the extended inclined surface 45 and angled to be reflected outward of the lamp gripping portion 28 in the length direction of the cold cathode tube 17, thereby further improving light taking efficiency.

In addition, between the lamp gripping portions 28 in the lamp clip 18 (between the cold cathode tubes 17), as shown in FIGS. 13 and 14, the protruding portion 37 having the inclined surfaces 38 having downward slopes from the middle position to the opposite end positions in the width direction are formed in the main body 27, and thus the light emitted from the cold cathode tube 17 is incident on the inclined surfaces 38 and satisfactorily reflected toward the diffuser plate 15a. At this time, the light reflected by the inclined surface 38 is angled outward of the main body 27 in the length direction of the cold cathode tube 17, which is suitable for reducing luminance unevenness. Also, the opposite edge portions in the width direction along the length direction of the protruding portion 37 are thinner over the entire region than the middle portion and there is little step from the pedestal portion 36, and thus there is few shadow portions (opposite end surfaces in the width direction of the protruding portion 37) in the protruding portion 37, and the protruding portion 37 is hardly visually identified as a shadow. Further, the protruding portion 37 has a triangular sectional shape, and thus the inclined surfaces 38 formed over the entire surface of the protruding portion 37 can reflect the light toward the diffuser plate 15a. Also, the inclination angle of the inclined surface 38 can be more gentle than a case where the protruding portion 37 has a trapezoidal sectional shape or the like, which is further suitable for providing uniform light reflection efficiency. The thickness T1 at the vertex P1 that is the protruding tip of the protruding portion 37 is larger than the thickness T2 of the pedestal portion 38, and thus a large amount of light is reflected by the protruding portion 37 to restrict the pedestal portion 38 from being visually identified as a dark portion. This can provide uniform light reflection efficiency of the surface of the main body 27 as much as possible, and thus reduce occurrence of a dark portion in the main body 27 as much as possible.

Further, the pedestal portion 36 having a predetermined thickness is formed on the back side of the protruding portion 37, and thus even if the light is incident on the thin opposite edge portions in the width direction in the protruding portion 37, the light is restricted from passing through the main body 27. On the back side of portions in the main body 27 corresponding to the passage holes 34 and 35 in the reflection sheet 23, as shown in FIG. 13, the chassis 14 is directly placed without via the reflection sheet 23 because the passage holes 34 and 35 in the reflection sheet 23 are slightly larger than the mounting holes 32 and 33 in the chassis 14. Thus, if the light can pass through the main body 27, the chassis 14 having lower light reflectivity than the reflection sheet 23 may be visually identified as a dark portion. However, as described above, the pedestal portion 36 having the sufficient thickness is formed on the back side of the thin portion of the protruding portion 37, and block the mounting holes 32 and 33 and the passage holes 34 and 35, thereby avoiding the light from passing through the main body 27 and restricting the inner portions of the passage holes 34 and 35 in the chassis 14 from being visually identified as a dark portion from the front side.

As described above, according to this embodiment, taking efficiency of the light emitted from the cold cathode tube 17 is extremely improved, and parts of the lamp clip 18 and the chassis 14 are less likely to be seen as a dark portion. Thus, when a distance between the liquid crystal panel 11 and the diffuser plate 15a and the optical sheet 15b, a distance between the diffuser plate 15a and the cold cathode tube 17 and the lamp clip 18, and a distance between the cold cathode tube 17 and the reflection sheet 23 are reduced with decreasing thickness of the backlight unit 12, luminance unevenness is less likely to occur, and thus even an ultrathin liquid crystal display device 10 can provide satisfactory display performance.

A diameter of the cold cathode tube 17 used in this embodiment is 4.0 mm, a distance between the cold cathode tube 17 and the reflection sheet 23 is 0.8 mm, a distance between the adjacent cold cathode tubes 17 is 16.4 mm, and a distance between the cold cathode tube 17 and the diffuser plate 15a is 2.7 mm. As such, the thicknesses of the components are reduced in the backlight unit 12, and the distance between the cold cathode tube 17 and the diffuser plate 15a and the distance between the cold cathode tube 17 and the reflection sheet 23 are particularly reduced. By the reduction in thickness of the backlight unit 12, the thickness of the liquid crystal display device 10 (that is, the thickness from the surface of the liquid crystal panel 11 to the back surface of the backlight unit 12) is 16 mm, and the thickness of the television receiver apparatus TV (that is, the thickness from the surface of the front side cabinet Ca to the back surface of the back side cabinet Cb) is 34 mm, and a thin television receiver apparatus is achieved.

Second Embodiment

A second embodiment of the present invention will be described with reference to FIG. 22. In the second embodiment, a position of a reference line L1-A set in a chassis 14-A is changed. In the second embodiment, the same components as in the first embodiment are denoted by the same reference numerals with a suffix -A added to the ends, and overlapping descriptions on structures, operations, and advantages will be omitted.

As described in the first embodiment, a diffuser plate (not shown) integrated into a backlight unit 12-A may be thermally expanded or contracted, and which portion in a plane thereof is easily expanded or contracted tends to depend on thermal distribution when the backlight unit 12-A is lit or extinguished. With uniform thermal distribution, the diffuser plate is easily expanded or contracted on a screen middle side, but with uneven thermal distribution, a portion that is easily expanded or contracted in the diffuser plate may be shifted from the screen middle. Thus, thermal distribution of the backlight unit 12-A is analyzed to identify the portion that is easily expanded or contracted in the diffuser plate, and according thereto, the position of the reference line L1-A as a reference for eccentrically placing a support pin 29-A on each lamp clip 18-A can be set.

Figure 22:
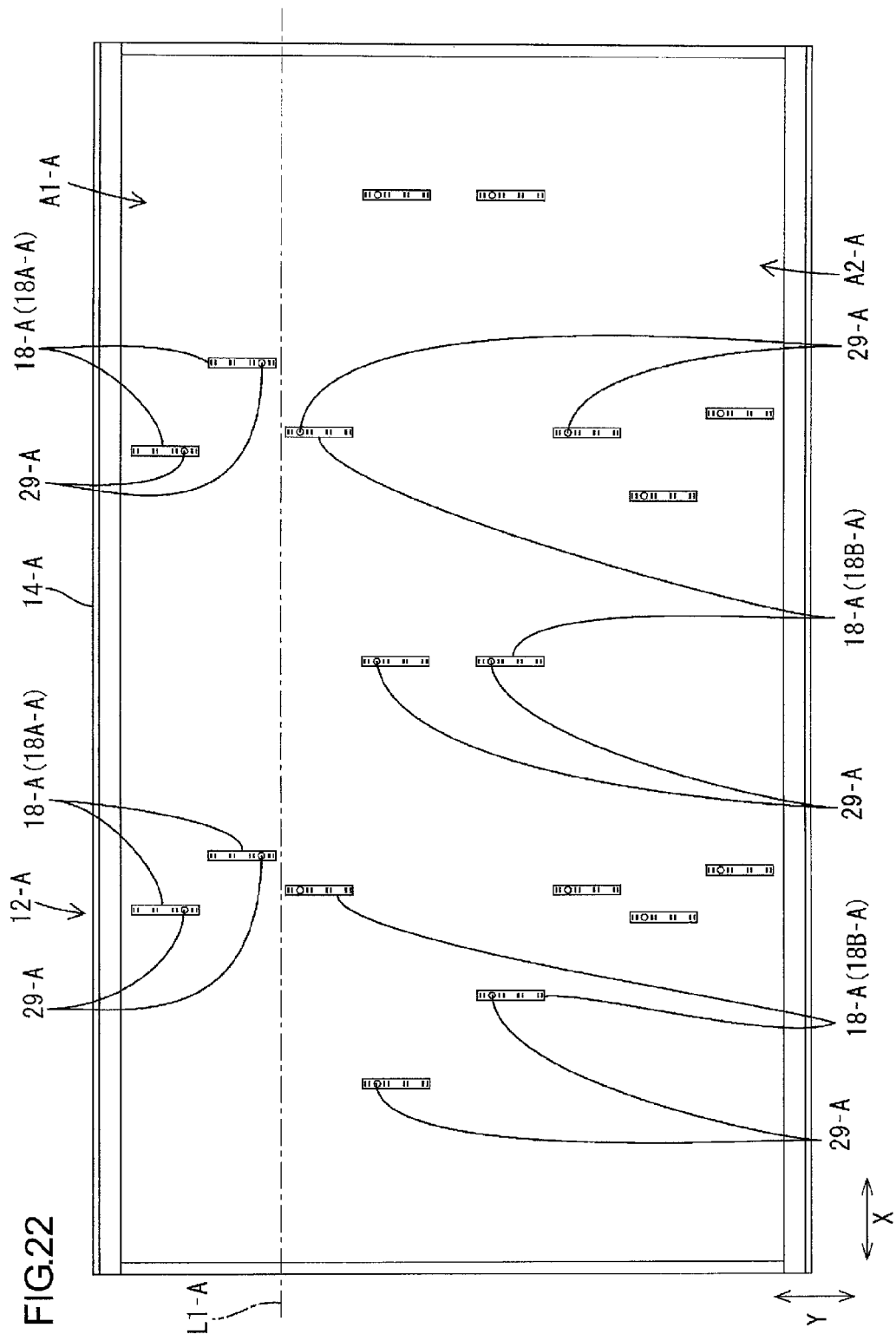
FIG. 22 is a plan view showing a lamp clip mounted to a chassis according to a second embodiment of the present invention.

Specifically, as shown in FIG. 22, when the diffuser plate is easily expanded or contracted in an upper position in the drawing than a middle position in a short-side direction of the chassis 14-A, the reference line L1-A is shifted upward in the drawing from the middle position in the short-side direction. It is sufficient that in the chassis 14-A, an upper side in FIG. 22 of the reference line L1-A eccentrically placed is referred to as a first area A1-A where a first lamp clip group 18A-A is provided, and a lower side in the drawing is referred to as a second area A2-A where a second lamp clip group 18B-A is provided. Thus, each support pin 29-A is placed closer to the portion that is easily expanded or contracted in the diffuser plate, thereby reliably restricting bending or warpage of the diffuser plate. At this time, the number of lamp clips 18-A may be different between the first lamp clip group 18A-A and the second lamp clip group 18B-A. As described above, a supporting state for the diffuser plate can be optimized correspondingly to design of the backlight unit 12-A.

In the backlight unit 12-A, convection that is rising of heated air may occur with lighting, and in that case, an upper portion of the backlight unit 12-A in a vertical direction in using a liquid crystal display device tends to be higher in temperature than a lower portion. The diffuser plate tends to be more significantly expanded or contracted in a high temperature region, and thus in such a case, the reference line L1-A is effectively shifted vertically upward in using the liquid crystal display device.

Third Embodiment

A third embodiment of the present invention will be described with reference to FIG. 23 or 24. In the third embodiment, positions of a cold cathode tube 17-B or the like and a reference line L-B in a chassis 14-B are changed. In the third embodiment, the same components as in the first embodiment are denoted by the same reference numerals with a suffix -B added to the ends, and overlapping descriptions on structures, operations, and advantages will be omitted.

Figure 23:
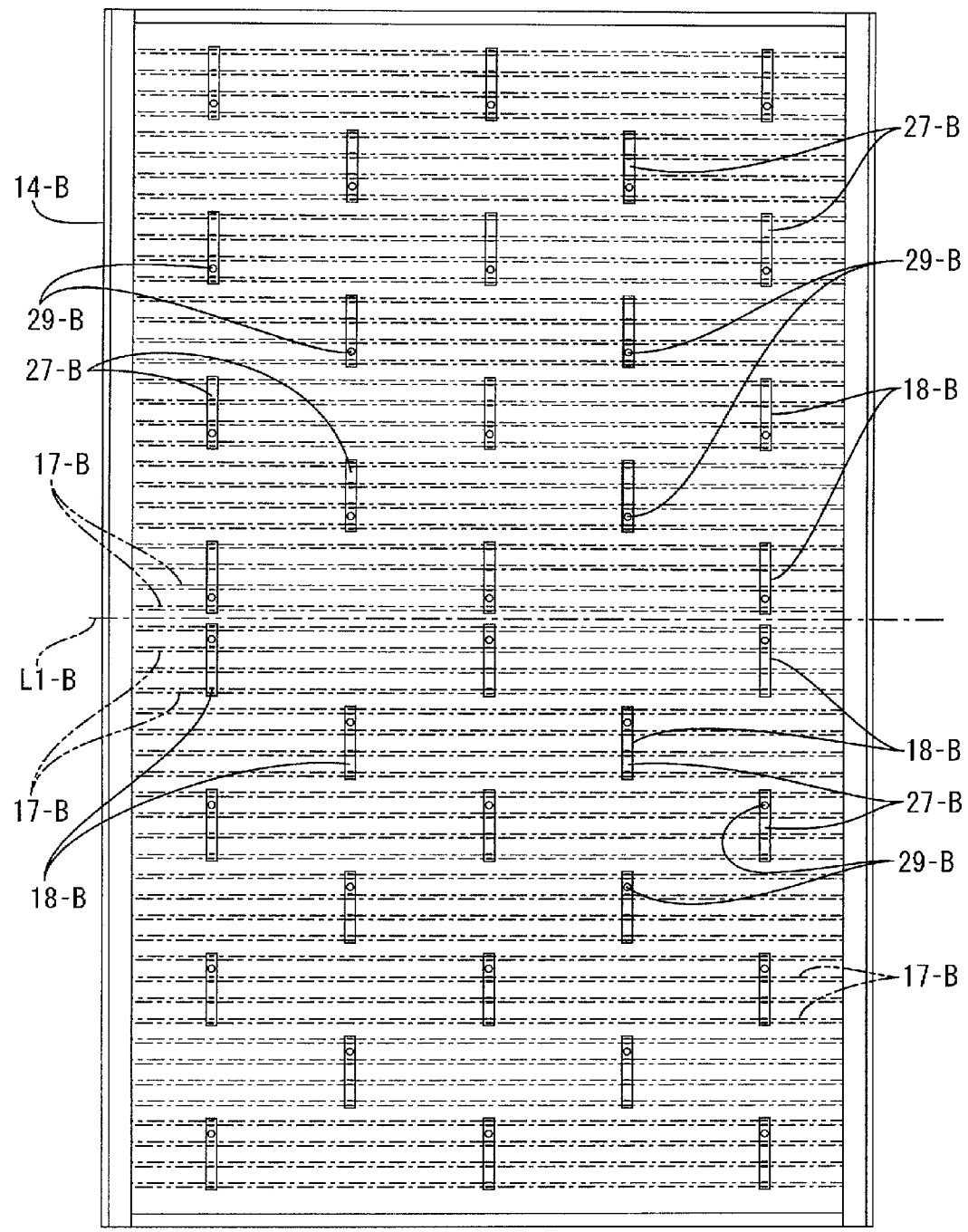
FIG. 23 is a plan view showing a lamp clip mounted to a chassis according to a third embodiment of the present invention.

As shown in FIG. 23, the cold cathode tube 17-B is mounted to the chassis 14-B with a length direction matching a short-side direction of the chassis 14-B (diffuser plate), and a plurality of cold cathode tubes 17-B are arranged in parallel. A lamp clip 18-B for holding each cold cathode tube 17-B is mounted to the chassis 14-B with a length direction of a main body 27-B matching a long-side direction of the chassis 14-B (diffuser plate). The reference line L1-B as a reference of a mounting direction of each lamp clip 18-B on which a support pin 29-B is eccentrically placed is set to cross along the short-side direction through a middle position in the long-side direction of the chassis 14-B (diffuser plate). Thus, also for a liquid crystal display device used with the long-side direction of the chassis 14-B matching a vertical direction of the liquid crystal display device, bending or warpage of the diffuser plate can be satisfactorily controlled.

Figure 24:
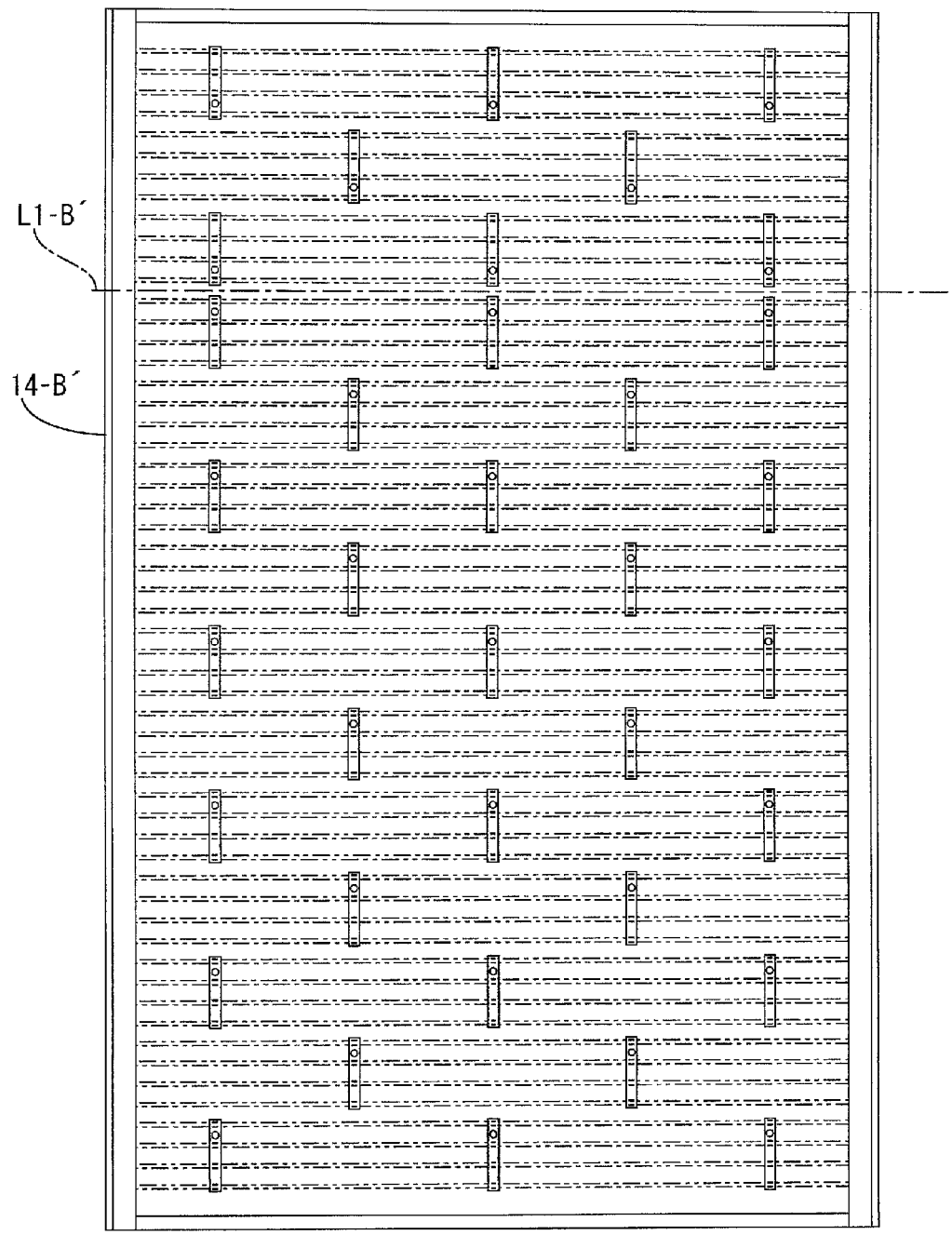
FIG. 24 is a plan view showing a lamp clip mounted to a chassis according to a variation aspect of the third embodiment.

As shown in FIG. 24, a position of a reference line L1-B' may be, of course, shifted from a middle position in a long-side direction of a chassis 14-B' by applying a design idea described in the second embodiment.

Fourth Embodiment

A fourth embodiment of the present invention will be described with reference to FIGS. 25 to 28. In the fourth embodiment, a structure for controlling mounting of a lamp clip 18-C in a wrong direction is changed. In the fourth embodiment, the same components as in the first embodiment are denoted by the same reference numerals with a suffix -C added to the ends, and overlapping descriptions on structures, operations, and advantages will be omitted.

Figure 25:
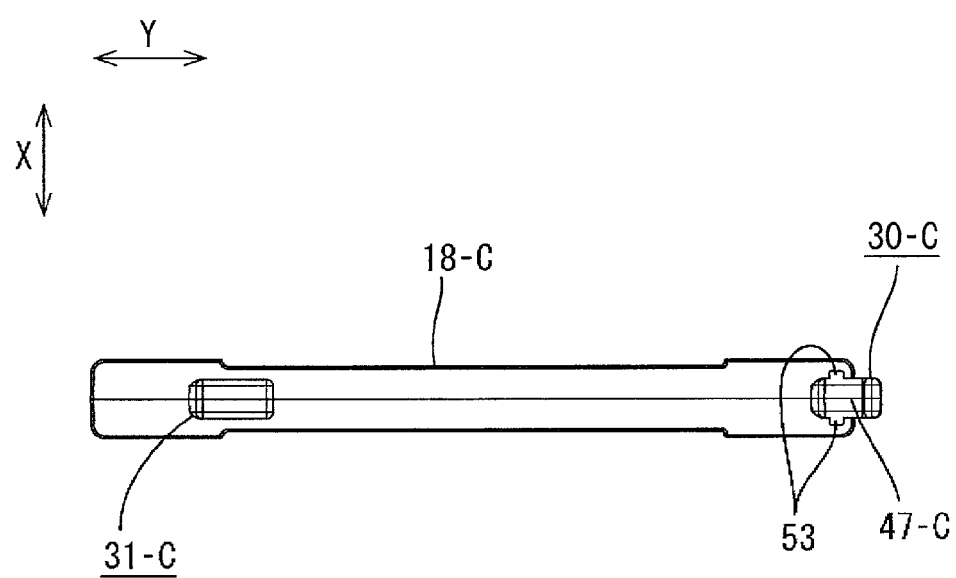
FIG. 25 is a bottom view of a lamp clip according to a fourth embodiment of the present invention.
Figure 26:
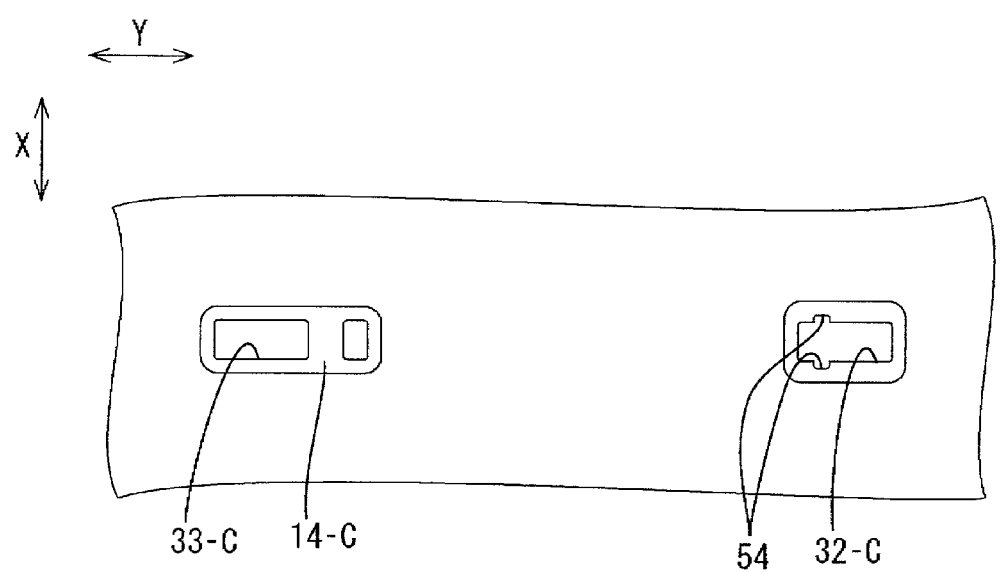
FIG. 26 is a magnified plan view of the chassis.

A first mounting portion 30-C and a second mounting portion 31-C in the lamp clip 18-C have substantially the same width as shown in FIG. 25. From opposite side surfaces of an extending portion 47-C of the first mounting portion 30-C, a pair of control portions 53 are formed to laterally protrude. Thus, the first mounting portion 30-C is formed so that portions corresponding to the control portions 53 are partially wide. Meanwhile, a first mounting hole 32-C and a second mounting hole 33-C in a chassis 14-C have the same width matching the mounting portions 30-C and 31-C as shown in FIG. 26, but the first mounting hole 32-C is formed with notches 54 corresponding to the control portions 53 and formed to be partially wide.

Thus, when the lamp clip 18-C is to be mounted in a mounting direction different from a normal direction, the control portions 53 of the first mounting portion 30-C interfere with a rim of the second mounting hole 33-C. This can reliably control mounting of the lamp clip 18-C in a wrong direction.

Figure 27:
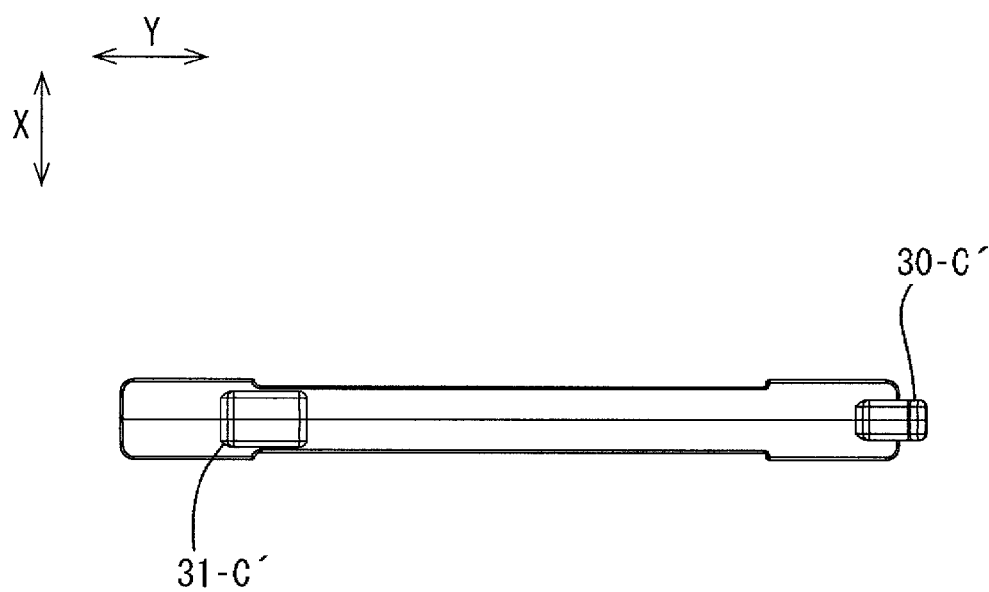
FIG. 27 is a bottom view of a lamp clip according to a modification of the fourth embodiment.
Figure 28:
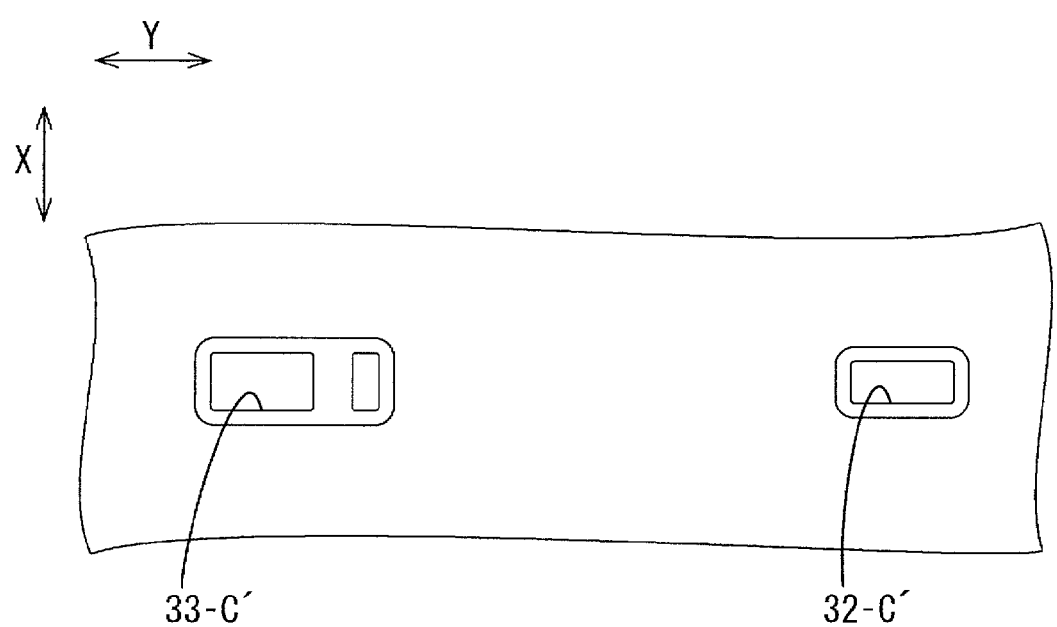
FIG. 28 is a magnified plan view of the chassis.

As a variation aspect of a structure for controlling mounting of the lamp clip 18-C in a wrong direction, for example, as shown in FIGS. 27 and 28, a second mounting portion 31-C' and a second mounting hole 33-C' may have larger widths than a first mounting portion 30-C' and a first mounting hole 32-C'.

Fifth Embodiment

A fifth embodiment of the present invention will be described with reference to FIG. 29. In the fifth embodiment, a sectional shape of a main body 27-D is changed. In the fifth embodiment, the same components as in the first embodiment are denoted by the same reference numerals with a suffix -D added to the ends, and overlapping descriptions on structures, operations, and advantages will be omitted.

Figure 29:
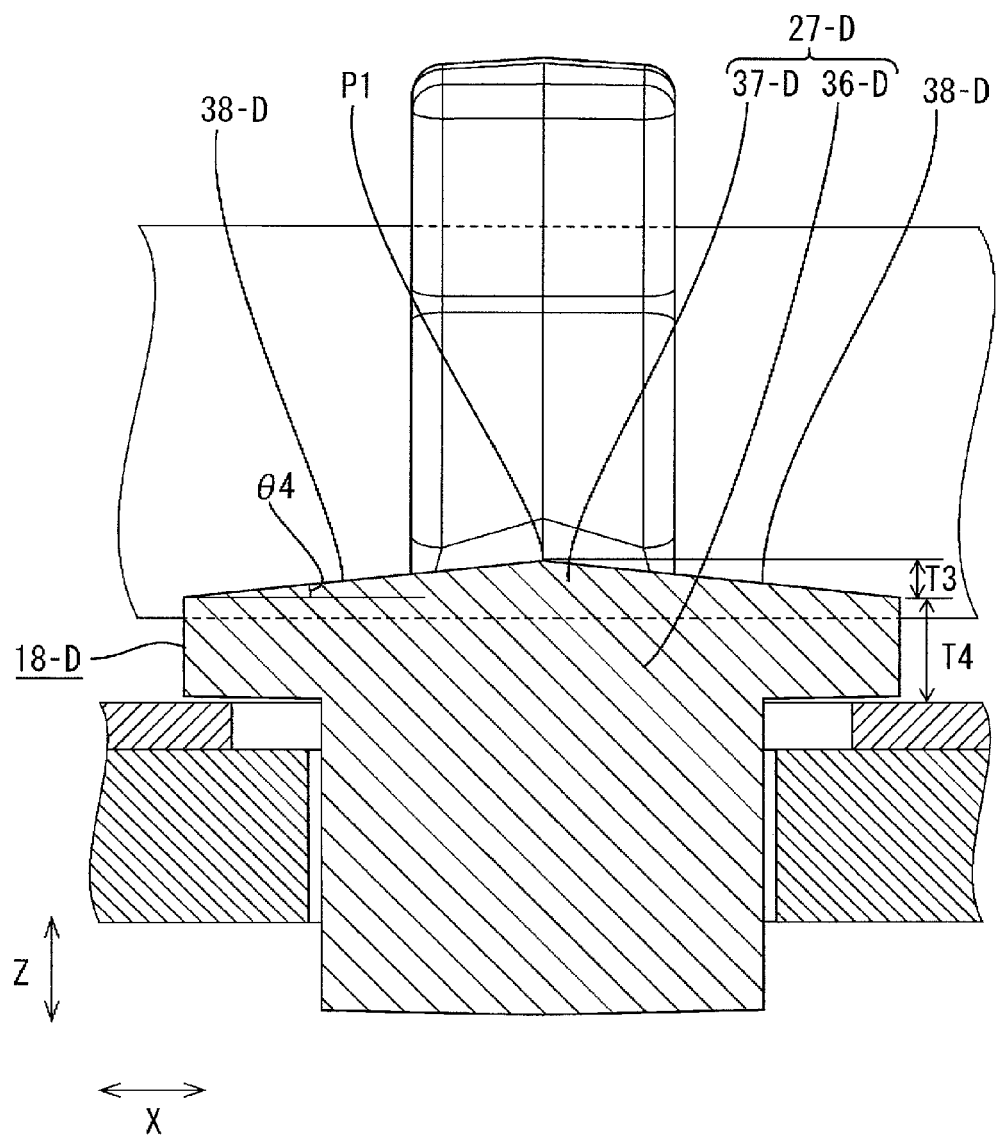
FIG. 29 is a side sectional view of a main body of a lamp clip according to a fifth embodiment of the present invention.

A main body 27-D includes, as shown in FIG. 29, a pedestal portion 36-D having a block-shaped sectional shape, and a protruding portion 37-D having a triangular sectional shape placed on the pedestal portion 36-D, and a thickness T3 at a vertex P1 of the protruding portion 37-D is set to be smaller than a thickness T4 of the pedestal portion 36-D. The sum of the thickness T3 of the protruding portion 37-D and the thickness T4 of the pedestal portion 36-D (thickness of the main body 27-D) is set to be the same as the sum of the thickness T1 of the protruding portion 37 and the thickness T2 of the pedestal portion 36 in the first embodiment (see FIG. 13). Thus, an inclination angle θ4 of each inclined surface 38-D of the protruding portion 37-D is smaller than the inclination angles θ1 and θ2 of the inclined surface 38 in the first embodiment. At this time, the inclination angle θ4 of the inclined surface 38-D may be the same as the inclination angle θ3 (see FIG. 15) of the inclined surface 44 of the bottom surface of the lamp gripping portion 28 in the first embodiment, which can provide more uniform reflection efficiency of the surface of the lamp clip 18-D.

Sixth Embodiment

A sixth embodiment of the present invention will be described with reference to FIG. 30. In the sixth embodiment, a sectional shape of a main body 27-E is changed. In the sixth embodiment, the same components as in the first embodiment are denoted by the same reference numerals with a suffix -E added to the ends, and overlapping descriptions on structures, operations, and advantages will be omitted.

Figure 30:
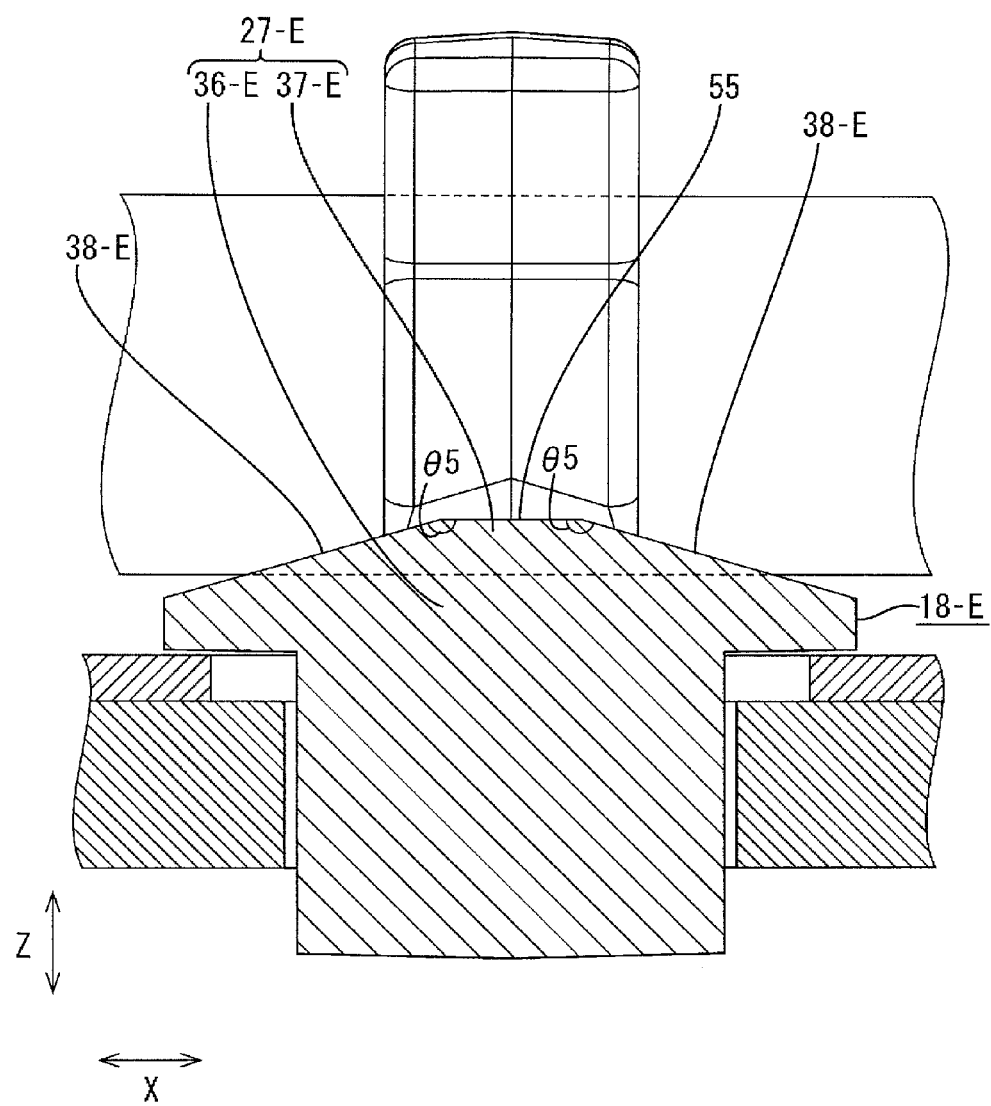
FIG. 30 is a side sectional view of a main body of a lamp clip according to a sixth embodiment of the present invention.

A protruding portion 37-E that constitutes a main body 27-E has a substantially trapezoidal sectional shape as shown in FIG. 30. A pair of inclined surfaces 38-E are formed on opposite side surfaces in a width direction of the protruding portion 37-E, and vertexes of the inclined surfaces 38-E are connected by a flat surface 55 parallel to an X-axis direction. In the protruding portion 37-E, an angle θ5 formed by the flat surface 55 and each of the inclined surfaces 38-E is larger than the angle (see FIG. 13) formed by the inclined surfaces 38 of the protruding portion 37 in the first embodiment. Thus, when the lamp clip 18-E is molded of resin, a molten resin material easily uniformly flows into a mold, thereby reducing poor molding.

Seventh Embodiment

A seventh embodiment of the present invention will be described with reference to FIG. 31. In the seventh embodiment, a sectional shape of a main body 27-F is changed. In the seventh embodiment, the same components as in the first embodiment are denoted by the same reference numerals with a suffix -F added to the ends, and overlapping descriptions on structures, operations, and advantages will be omitted.

Figure 31:
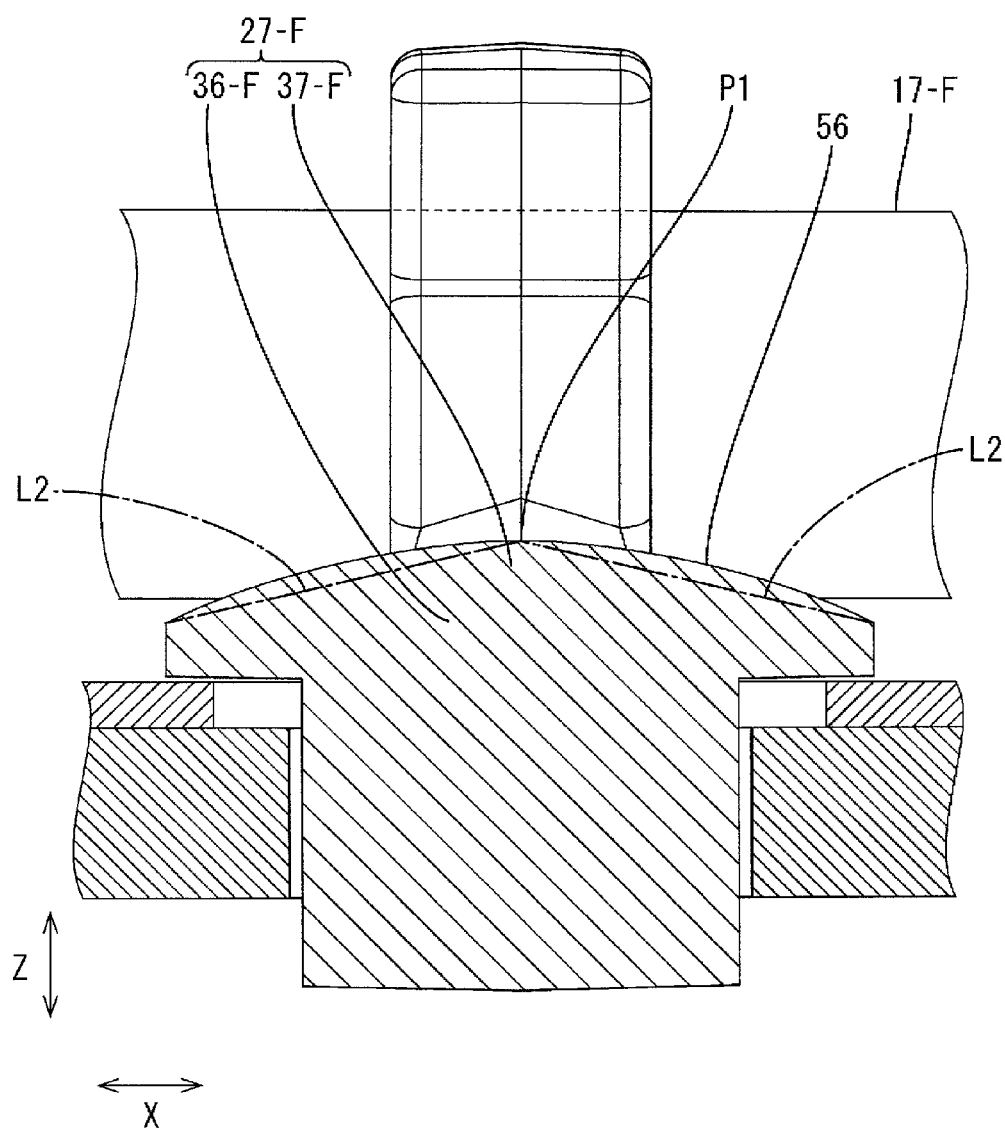
FIG. 31 is a side sectional view of a main body of a lamp clip according to a seventh embodiment of the present invention.

A protruding portion 37-F that constitutes the main body 27-F has a substantially arcuate sectional shape as shown in FIG. 31. An arcuate curved surface 56 is formed over the entire circumferential surface of the protruding portion 37-F. The curved surface 56 is expanded outward of an outside of a line L2 connecting opposite end positions (opposite edge portions in a length direction of a cold cathode tube 17-F) in a width direction of the protruding portion 37-F and a vertex P1. When a light is reflected by the curved surface 56, the reflected light is appropriately scattered without traveling in a particular direction. This is suitable for providing uniform reflection efficiency. Also, higher strength can be obtained than a case where a protruding portion is formed to be recessed inward of the line L2.

Eighth Embodiment

An eighth embodiment of the present invention will be described with reference to FIG. 32. In the eighth embodiment, a sectional shape of a bottom portion 43-G of a lamp gripping portion 28-G is changed. In the eighth embodiment, the same components as in the first embodiment are denoted by the same reference numerals with a suffix -G added to the ends, and overlapping descriptions on structures, operations, and advantages will be omitted.

Figure 32:
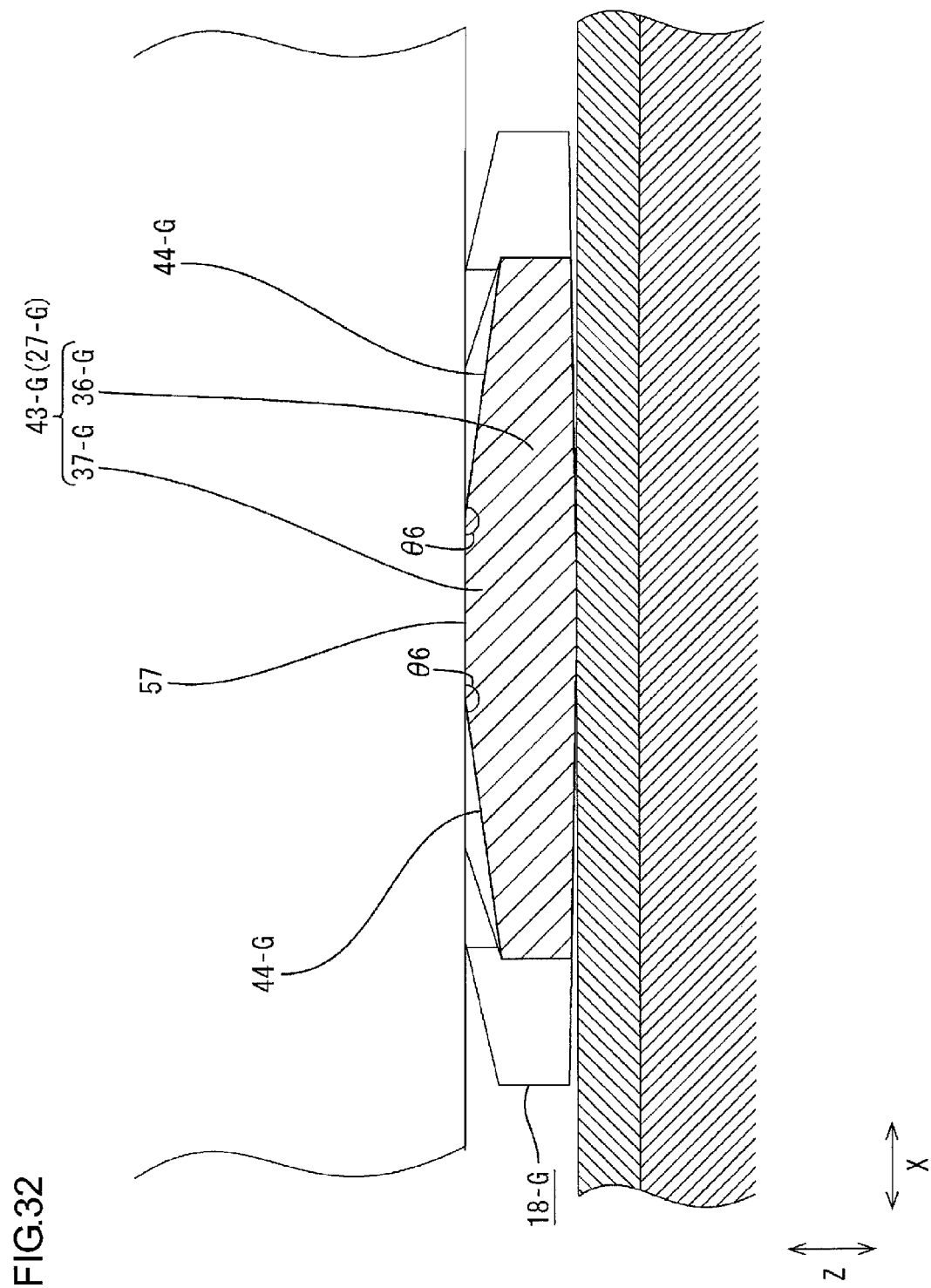
FIG. 32 is a side sectional view of a lamp gripping portion of a lamp clip according to an eighth embodiment of the present invention.

A protruding portion 37-G that constitutes the bottom portion 43-G of the lamp gripping portion 28-G has a substantially trapezoidal sectional shape as shown in FIG. 32. A pair of inclined surfaces 44-G are formed on opposite side surfaces of the protruding portion 37-G of the bottom portion 43-G, and vertexes of the inclined surfaces 44-G are connected by a flat surface 57 parallel to an X-axis direction. An angle θ6 formed by the flat surface 57 and each of the inclined surfaces 44-G in the bottom portion 43-G is larger than the angle (see FIG. 15) formed by the inclined surfaces 44 of the bottom portion 43 in the first embodiment. Thus, when the lamp clip 18-G is molded of resin, a molten resin material easily uniformly flows into a mold, thereby reducing poor molding.

Ninth Embodiment

A ninth embodiment of the present invention will be described with reference to FIG. 33. In the ninth embodiment, a sectional shape of a bottom portion 43-H of a lamp gripping portion 28-H is changed. In the ninth embodiment, the same components as in the first embodiment are denoted by the same reference numerals with a suffix -H added to the ends, and overlapping descriptions on structures, operations, and advantages will be omitted.

Figure 33:
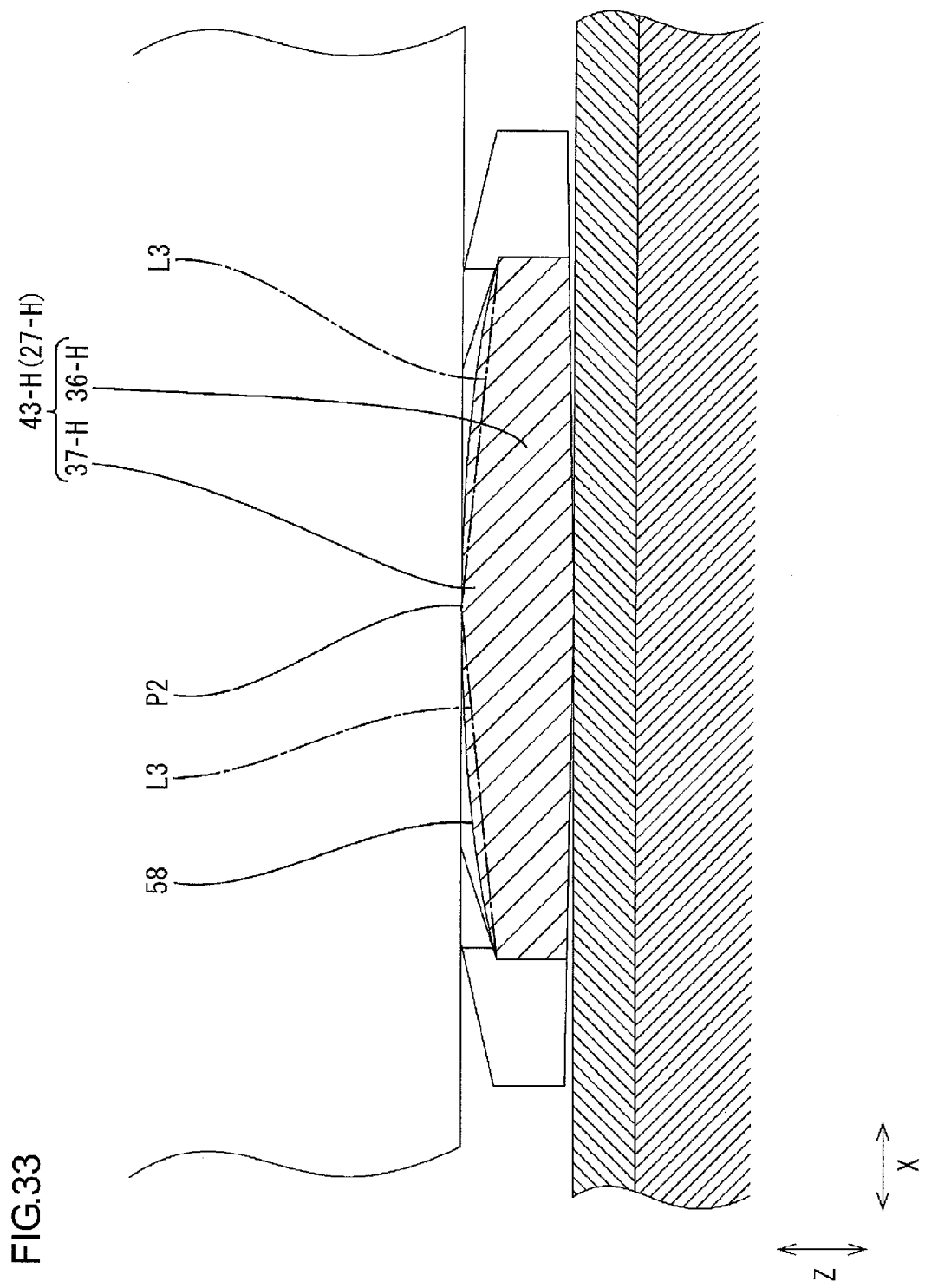
FIG. 33 is a side sectional view of a lamp gripping portion of a lamp clip according to a ninth embodiment of the present invention.

A protruding portion 37-H that constitutes a bottom portion 43-H has a substantially arcuate sectional shape as shown in FIG. 33. An arcuate curved surface 58 is formed over the entire circumferential surface of the protruding portion 37-H of the bottom portion 43-H. The curved surface 58 is expanded outward of an outside of a line L3 connecting opposite end positions in a width direction of the protruding portion 37-H and a vertex P2. When a light is reflected by the curved surface 58, the reflected light is appropriately scattered without traveling in a particular direction. This is suitable for providing uniform reflection efficiency. Also, higher strength can be obtained than a case where a protruding portion is formed to be recessed inward of the line L3.

Tenth Embodiment

A tenth embodiment of the present invention will be described with reference to FIG. 34. In the tenth embodiment, a sectional shape of a bottom portion 43-I of a lamp gripping portion 28-I is changed. In the tenth embodiment, the same components as in the first embodiment are denoted by the same reference numerals with a suffix -I added to the ends, and overlapping descriptions on structures, operations, and advantages will be omitted.

Figure 34:
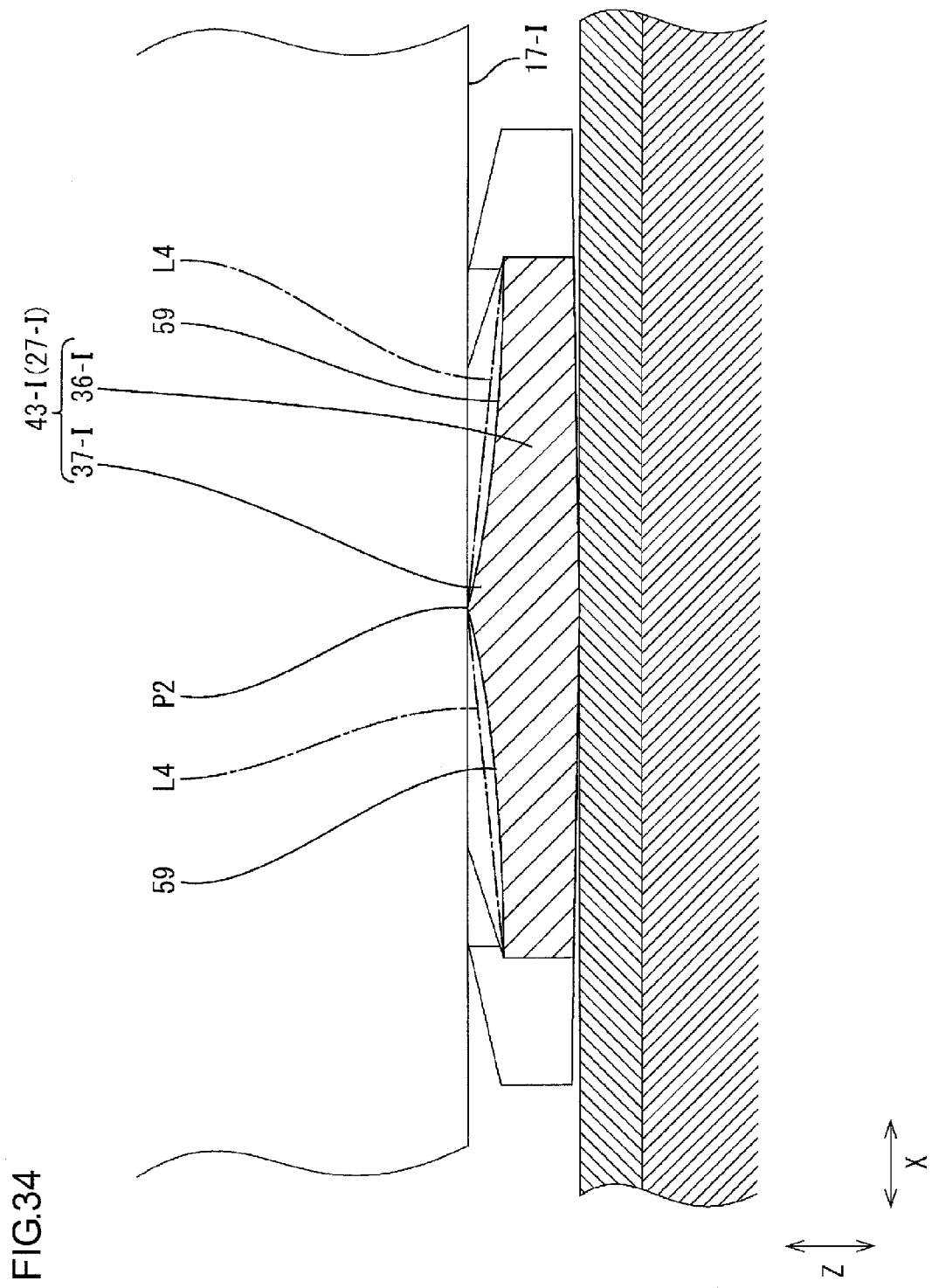
FIG. 34 is a side sectional view of a lamp gripping portion of a lamp clip according to a tenth embodiment of the present invention.

A protruding portion 37-I that constitutes the bottom portion 43-I is formed to have a substantially angular sectional shape with opposite side surfaces being recessed in an arcuate shape as shown in FIG. 34. On opposite side surfaces of the protruding portion 37-I of the bottom portion 43-I, a pair of arcuate curved surfaces 59 recessed inward of an inside of a line L4 connecting opposite end positions in a width direction of the protruding portion 37-I and a vertex P2 are formed. The bottom portion 43-I is tapered toward the vertex P2 by the curved surfaces 59. This can ensure a large gap between a cold cathode tube 17-I and the bottom portion 43-I, thereby further improving light taking efficiency. Also, material costs can be reduced as compared with a case where the curved surfaces 59 are expanded outward of the line L4.

Eleventh Embodiment

An eleventh embodiment of the present invention will be described with reference to FIG. 35. In the eleventh embodiment, a sectional shape of a bottom portion 43-J of a lamp gripping portion 28-J is changed. In the eleventh embodiment, the same components as in the first embodiment are denoted by the same reference numerals with a suffix -J added to the ends, and overlapping descriptions on structures, operations, and advantages will be omitted.

Figure 35:
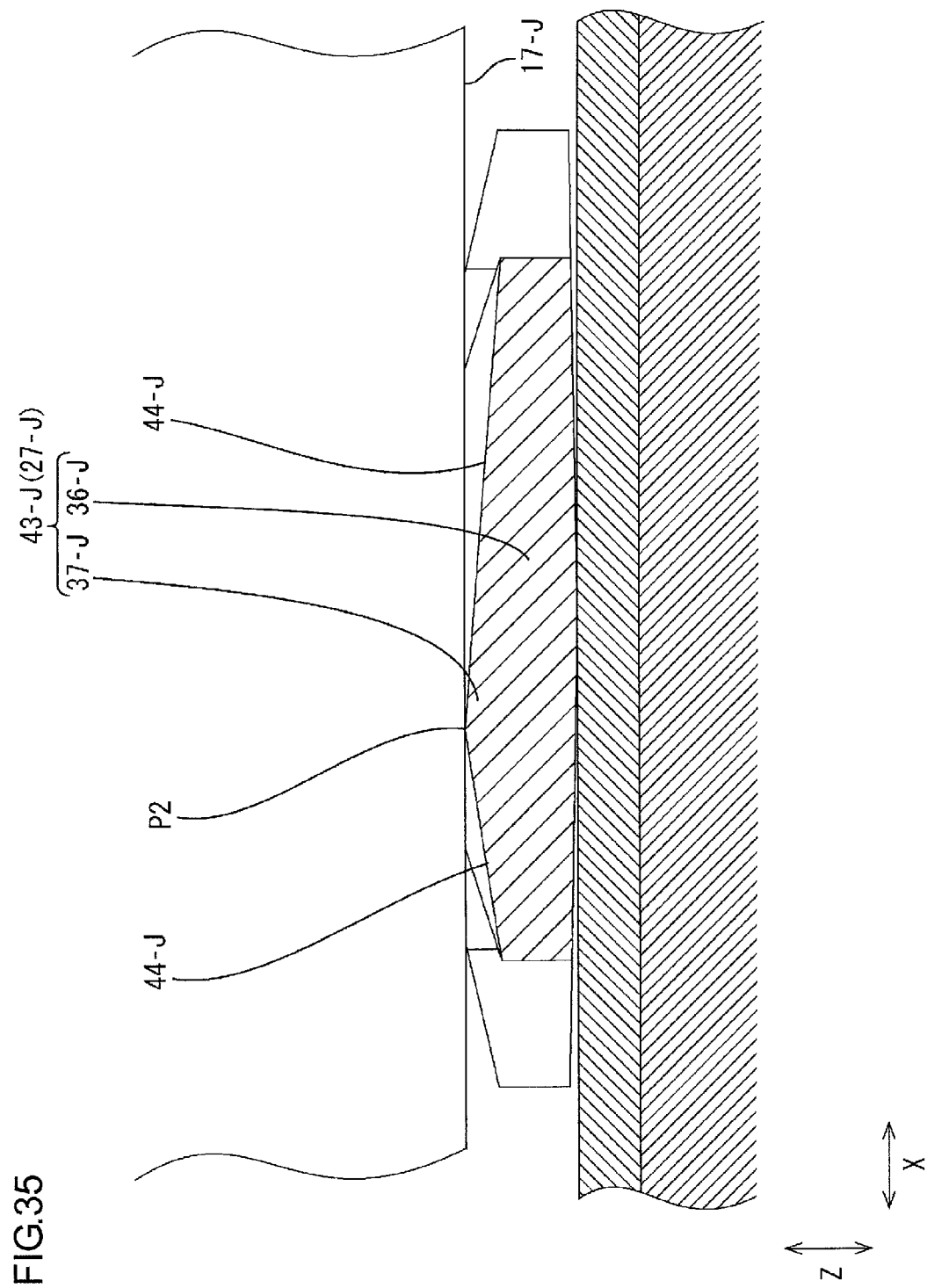
FIG. 35 is a side sectional view of a lamp gripping portion of a lamp clip according to an eleventh embodiment of the present invention.

A protruding portion 37-J that constitutes a bottom portion 43-J has a triangular sectional shape asymmetrical in a width direction as shown in FIG. 35. Thus, a pair of inclined surfaces 44-J formed on opposite side surfaces of the protruding portion 37-J of the bottom portion 43-J have different inclination angles. Thus, between a cold cathode tube 17-J and the bottom portion 43-J, different amounts of light can be emitted from a vertex P2 of the bottom portion 43-J to the left and right in FIG. 35, which is suitable for a backlight unit that desires such design. Alternatively, this design can be used for adding an intensity distribution correction function to the backlight unit. In this case, the vertex P2 is in an eccentric position from a middle in a width direction of the bottom portion 43-J.

Twelfth Embodiment

A twelfth embodiment of the present invention will be described with reference to FIG. 36 or 37. In the twelfth embodiment, an arrangement of each lamp gripping portion 28-K on a lamp clip 18-K is changed. In the twelfth embodiment, the same components as in the first embodiment are denoted by the same reference numerals with a suffix -K added to the ends, and overlapping descriptions on structures, operations, and advantages will be omitted.

Figure 36:
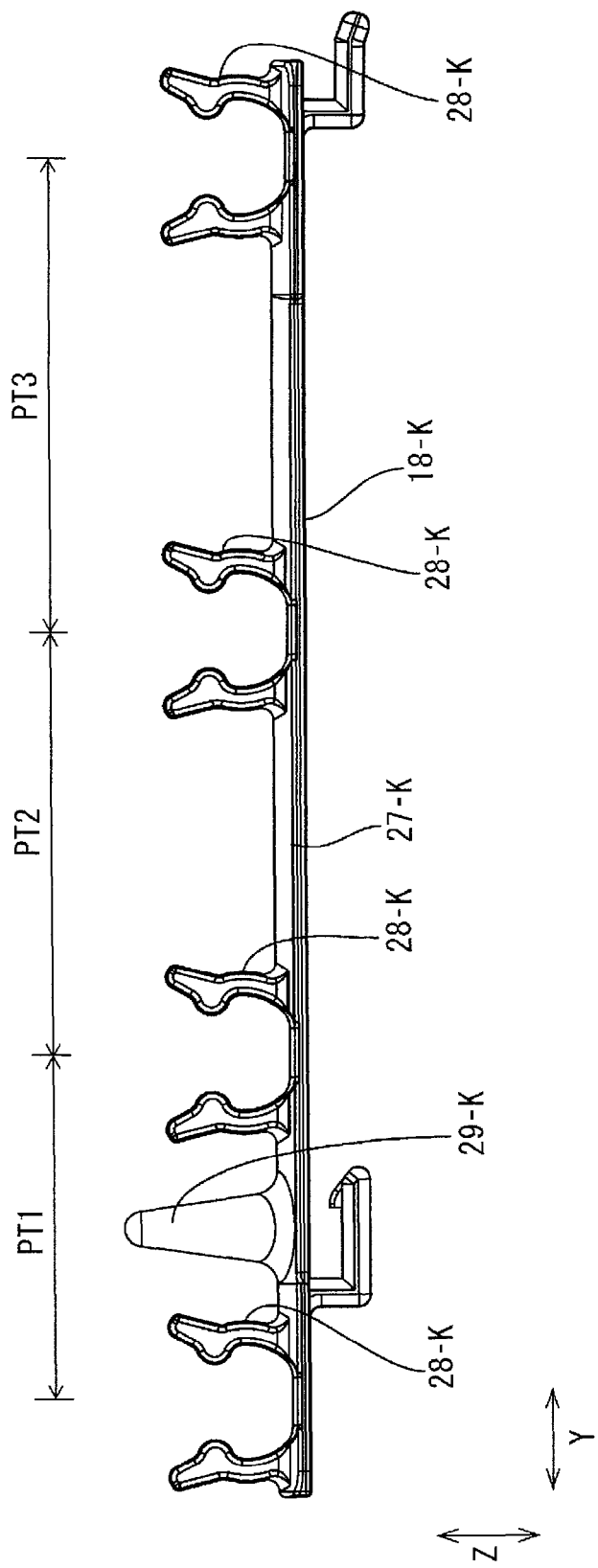
FIG. 36 is a front view of a lamp clip according to a twelfth embodiment of the present invention.

As shown in FIG. 36, a plurality of (four) lamp gripping portions 28-K are spaced apart in a length direction of a main body 27-K at different intervals (spaces) PT1 to PT3 between the lamp gripping portions 28-K. Specifically, the intervals PT1 to PT3 between the adjacent lamp gripping portions 28-K are smaller in positions closer to an edge portion of the main body 27-K on a side of a support pin 29-K, and larger in positions closer to an edge portion on a side opposite the support pin 29-K. Specifically, distribution density of the lamp gripping portions 28-K on the lamp clip 18-K is set to be higher on the side closer the eccentrically placed support pin 29-K.

Figure 37:
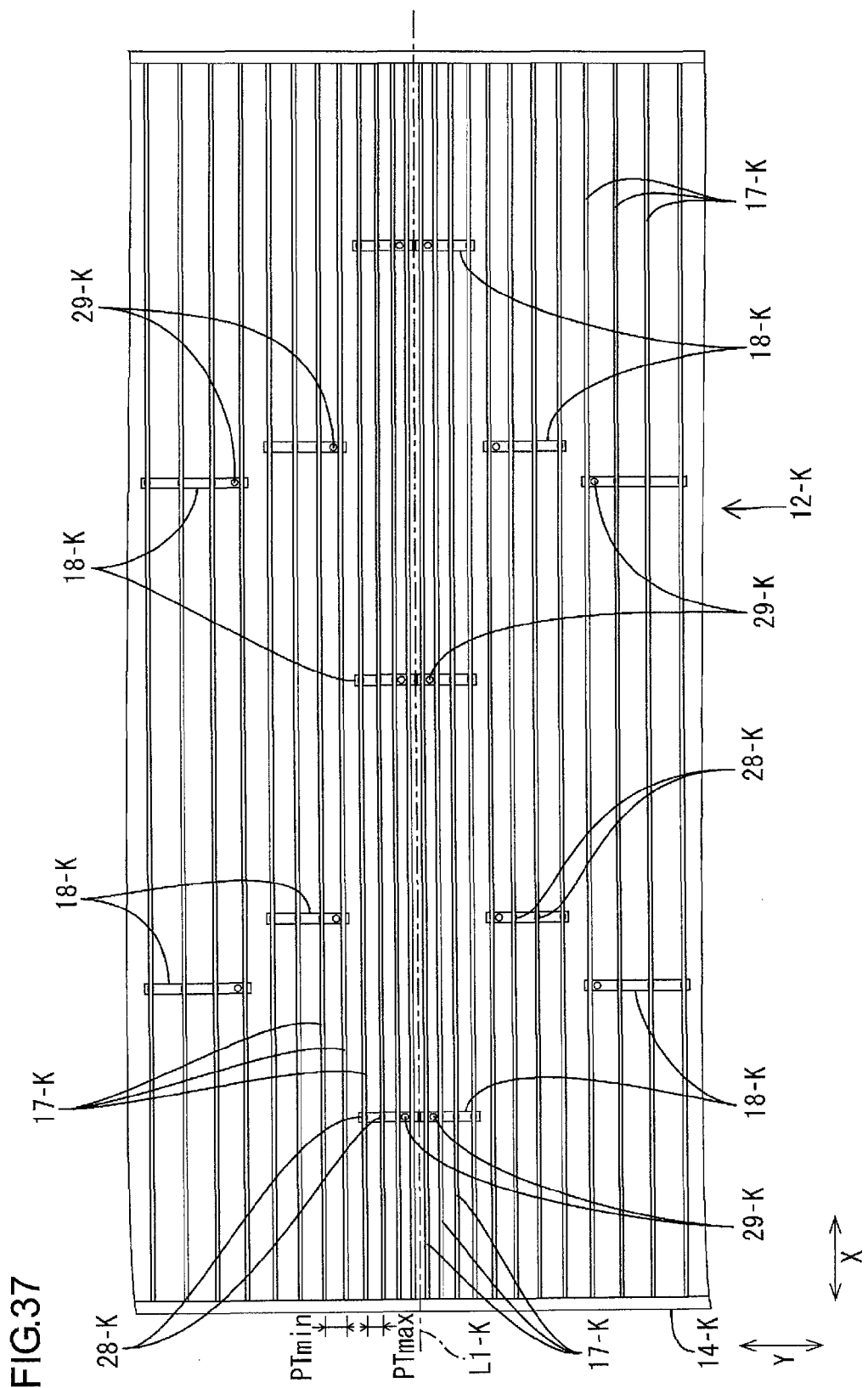
FIG. 37 is a plan view showing a state where the lamp clip is mounted to a chassis.

As shown in FIG. 37, a plurality of lamp clips 18-K having the above-described structure are mounted to a chassis 14-K, and the lamp clips 18-K are designed with different intervals PT1 to PT3 between the lamp gripping portions 28-K depending on mounting positions to the chassis 14-K. Specifically, a largest interval PTmax between the lamp gripping portions 28-K on the lamp clip 18-K provided close to a reference line L1-K of the chassis 14-K is set to be smaller than a smallest interval PTmin between the lamp gripping portions 28-K on the lamp clip 18-K mounted to a position farther from the reference line L1-K than the above-described lamp clip 18-K. Specifically, distribution density of the lamp gripping portions 28-K on the chassis 14-K is set to be higher on the side closer to the reference line L1-K.

With such design, when each cold cathode tube 17-K is mounted to each lamp gripping portion 28-K, the intervals between adjacent cold cathode tubes 17-K are unequal. A larger number of the cold cathode tubes 17-K is arranged in the central area of the chassis 14-K on the reference line L1-K side, and a smaller number of the cold cathode tubes 17-K is arranged in the edge area of the chassis 14-K. This can improve intensity on a central area of the display illuminated by the backlight unit 12-K, and each support pin 29-K arranged in an area corresponding to the central area of the display preferably supports a diffuser plate.

Thirteenth Embodiment

A thirteenth embodiment of the present invention will be described with reference to FIG. 38. In the thirteenth embodiment, a shape of a main body 27-L is changed. In the thirteenth embodiment, the same components as in the first embodiment are denoted by the same reference numerals with a suffix -L added to the ends, and overlapping descriptions on structures, operations, and advantages will be omitted.

Figure 38:
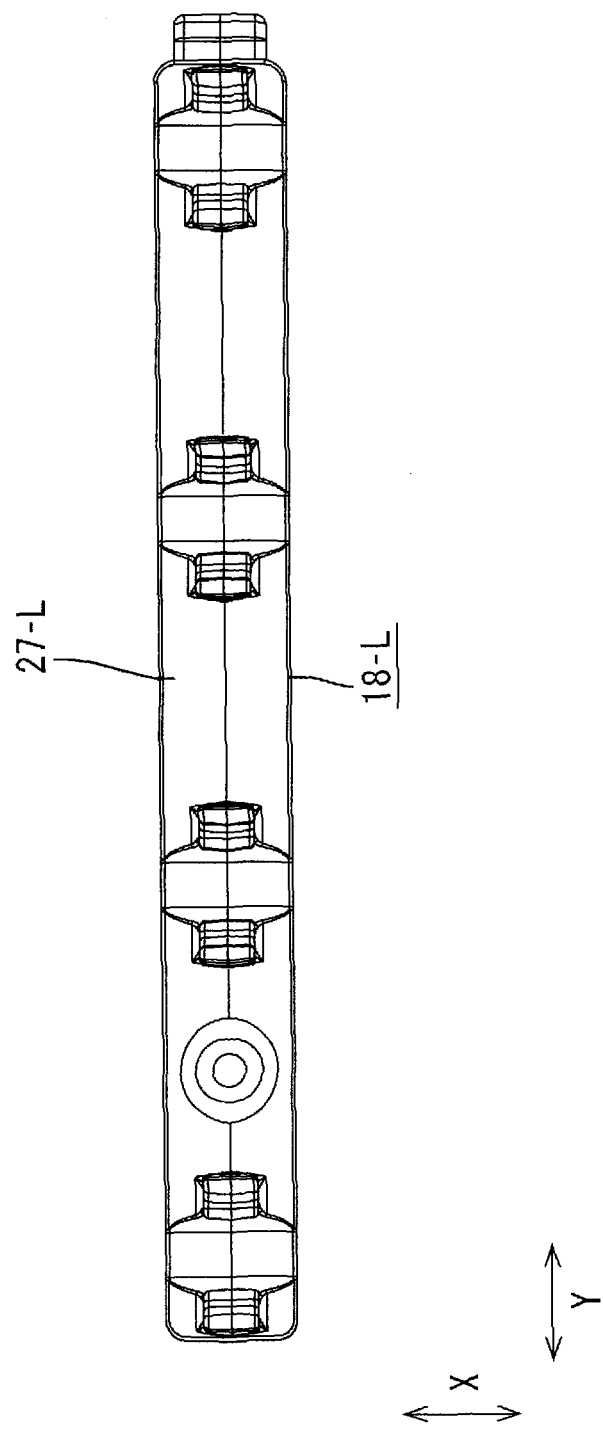
FIG. 38 is a plan view of a lamp clip according to a thirteenth embodiment of the present invention.

As shown in FIG. 38, the main body 27-L has a fixed width over the entire length. This can simplify a shape of a lamp clip 18-L and reduce mold production costs or the like.

Fourteenth Embodiment

A fourteenth embodiment of the present invention will be described with reference to FIG. 39. In the fourteenth embodiment, a mounting portion 60 is changed. In the fourteenth embodiment, the same components as in the first embodiment are denoted by the same reference numerals with a suffix -M added to the ends, and overlapping descriptions on structures, operations, and advantages will be omitted.

Figure 39:
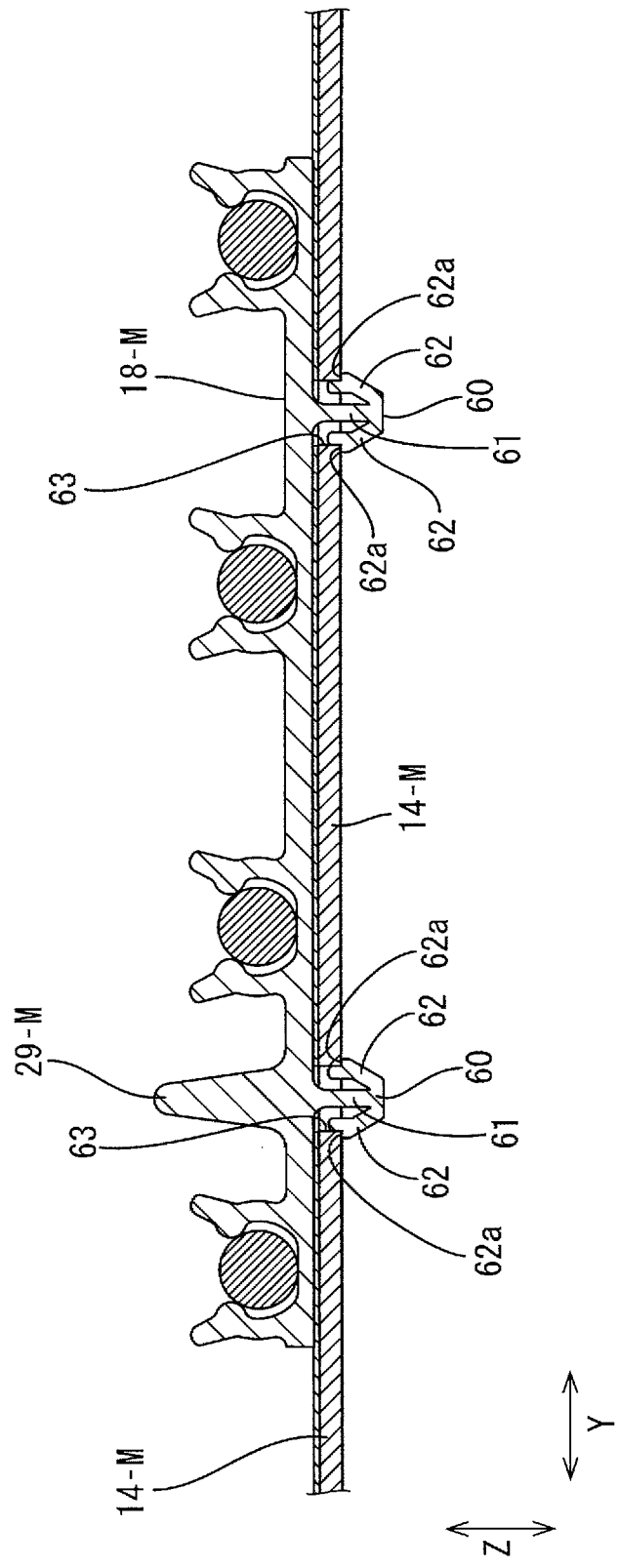
FIG. 39 is a front sectional view showing a lamp clip mounted to a chassis according to a fourteenth embodiment of the present invention.

As shown in FIG. 39, the mounting portion 60 includes a base portion 61 protruding from a back surface of a main body 27-M, and a pair of locking pieces 62 bent from a protruding end of the base portion 61 toward the main body 27-M to oppose the base portion 61. The locking piece 62 is elastically deformable so as to be close to the base portion 61, and a stepped locking surface 62a is formed in a tip portion thereof. A mounting hole 63 in a chassis 14-M has substantially the same diameter as a space between the locking surfaces 62a of the locking pieces 62.

When a lamp clip 18-M is pressed in the chassis 14-M from a front side along a Z-axis direction, each mounting portion 60 is inserted into each mounting hole 63, and the locking piece 62 is once elastically deformed. Then, when the lamp clip 18-M is pressed to a normal depth, the mounting portion 60 protrudes on a back side of the chassis 14-M, the locking piece 62 is restored, and the locking surface 62a is locked to a rim of the mounting hole 63 in the chassis 14-M from the back side. Thus, the lamp clip 18-M is held in a mounting state to the chassis 14-M. As such, besides the sliding mounting type lamp clip 18 described in the first embodiment, the insertion mounting type lamp clip 18-M in this embodiment can properly reduce luminance unevenness. The mounting portion 60 is provided directly below the support pin 29-M, thereby improving workability in mounting the lamp clip 18-M to the chassis 14-M.

Fifteenth Embodiment

A fifteenth embodiment of the present invention will be described with reference to FIG. 40 or 41. In the fifteenth embodiment, a shape of a lamp gripping portion 28-N is changed. In the fifteenth embodiment, the same components as in the first embodiment are denoted by the same reference numerals with a suffix -N added to the ends, and overlapping descriptions on structures, operations, and advantages will be omitted.

Figure 40:
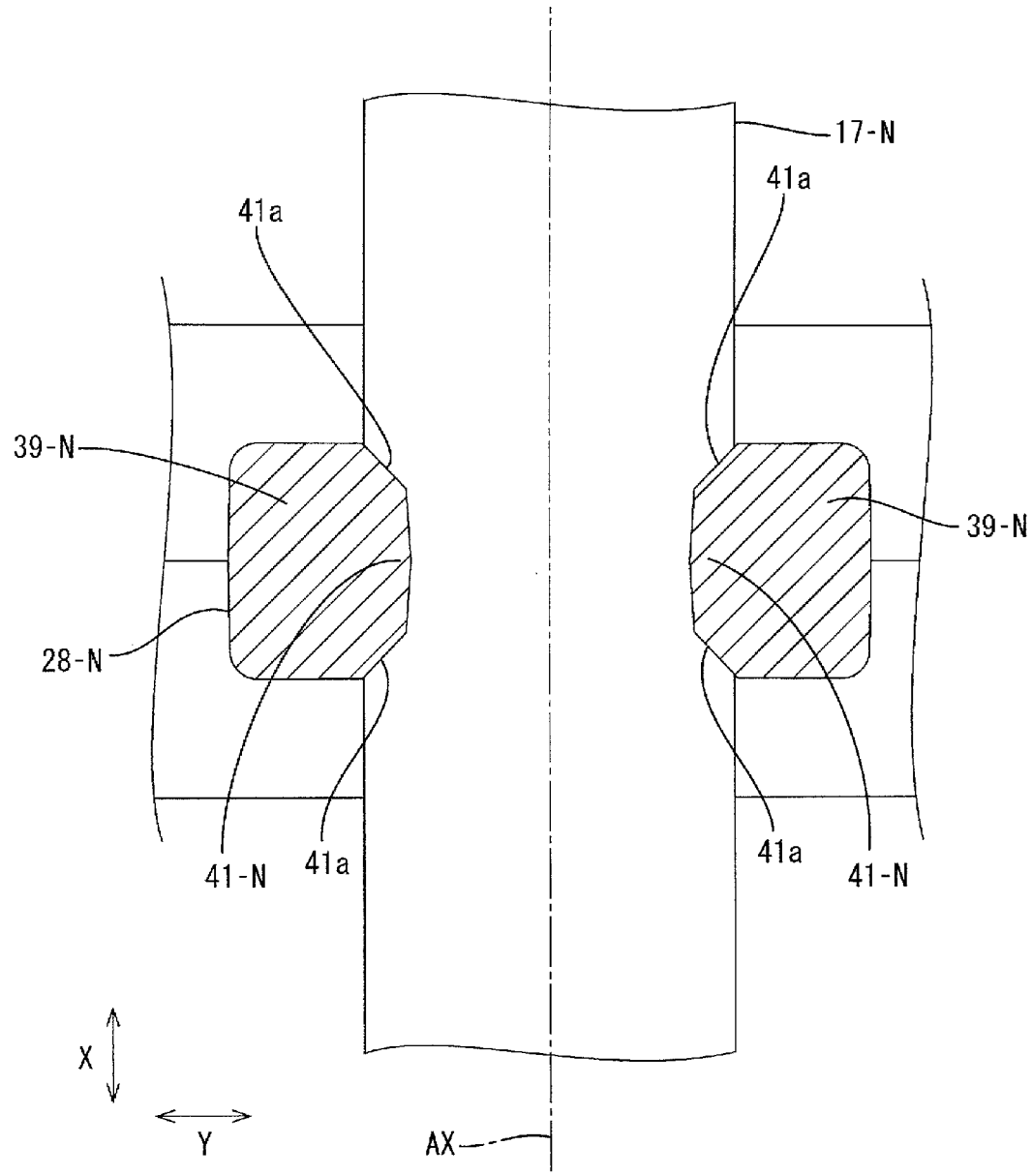
FIG. 40 is a plan sectional view of a holding protrusion on a lamp gripping portion of a lamp clip according to a fifteenth embodiment of the present invention.

As shown in FIG. 40, a holding protrusion 41-N that constitutes the lamp gripping portion 28-N is so-called tapered with a progressively decreasing width (size in an X-axis direction) from outside to inside, that is, toward a cold cathode tube 17. Specifically, the width of the holding protrusion 41-N, that is, a size in a length direction of the cold cathode tube 17-N is largest in an outer end position with a longest distance to a central axis AX of the cold cathode tube 17-N and smallest in an inner end position with a shortest distance to the central axis AX of the cold cathode tube 17-N, and progressively decreases toward the central axis AX of the cold cathode tube 17-N. Specifically, the width of the holding protrusion 41-N tends to be proportional to the distance to the central axis AX of the cold cathode tube 17-N in a mounting state. Thus, a pair of tapered surfaces (inclined surfaces) 41a having the same inclination angle are formed on opposite side surfaces in a width direction of the holding protrusion 41-N. The holding protrusion 41 covers the cold cathode tube 17 from a front side (light emission side) in the lamp gripping portion 28, and is tapered as viewed from the front side.

Figure 41:
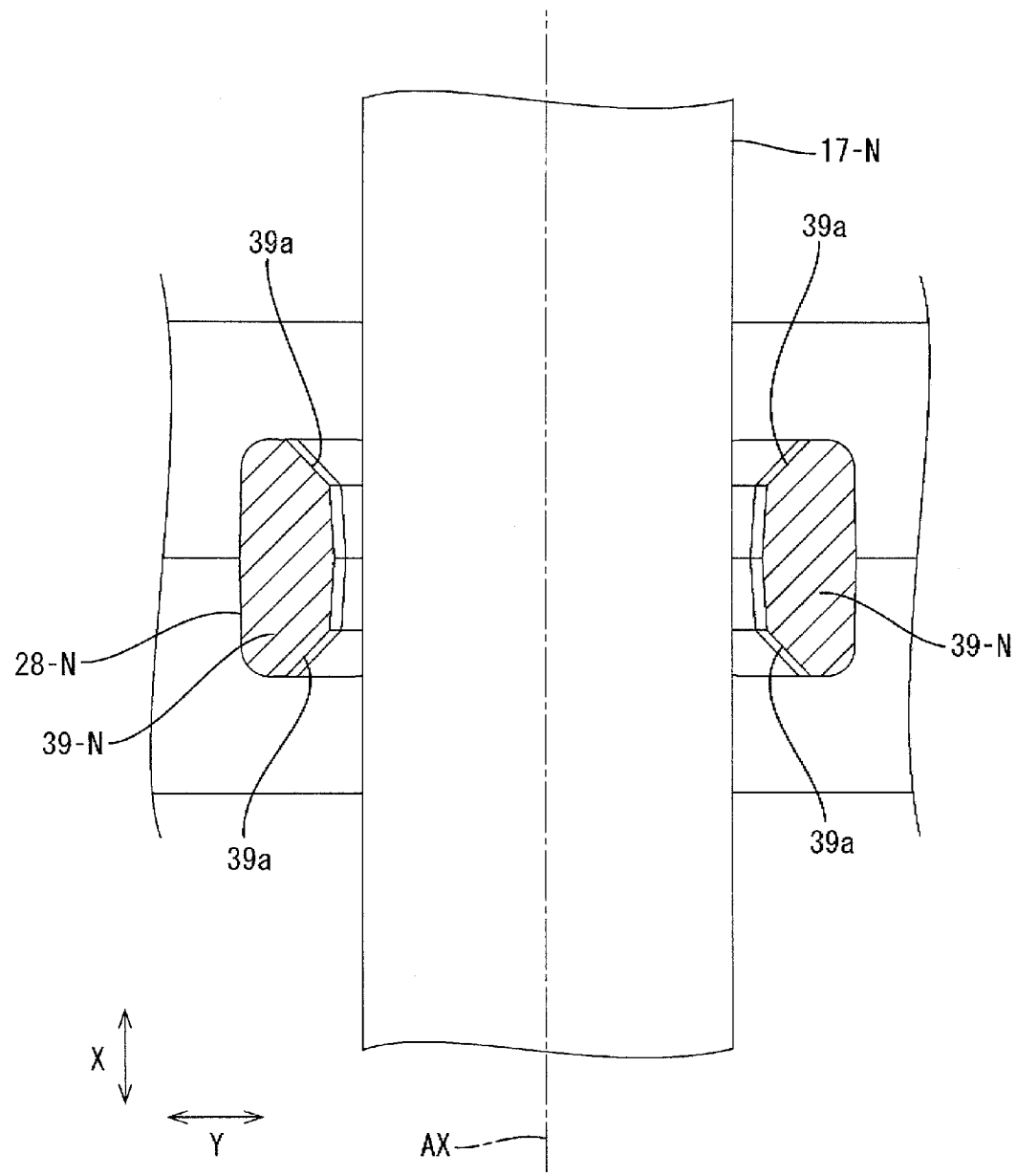
FIG. 41 is a plan sectional view of an arm portion of the lamp gripping portion.

As shown in FIG. 41, an arm portion 39-N is also tapered matching the shape of the holding protrusion 41-N, and an extended tapered surface 39a continuous with the holding protrusion 41-N is formed on each of opposite side surfaces in the width direction of the arm portion 39-N, thereby restricting a step being formed from the holding protrusion 41-N. The extended tapered surface 39a is formed over the entire length of the arm portion 39-N from a tip portion adjacent to the holding protrusion 41-N to a root portion. The arm portion 39-N has a progressively decreasing width from the outer end position to the inner end position over the entire length. Thus, the extended tapered surface 39a is formed in a portion on the front side of the center of the cold cathode tube 17-N in the arm portion 39-N. A guide portion is tapered similarly to the holding protrusion 41-N and the arm portion 39-N. When the lamp gripping portion 28-N is generally viewed, an inner edge portion of the holding protrusion 41-N closest to the central axis AX of the cold cathode tube 17-N is formed to be narrowest.

With the cold cathode tube 17-N being mounted, as shown in FIG. 40, the holding protrusion 41-N of the lamp gripping portion 28-N covers the front side (light emission side) of the cold cathode tube 17-N and forms a shadow, in other words, the holding protrusion 41-N is interposed between the cold cathode tube 17-N and the diffuser plate. The holding protrusion 41-N is tapered as described above, and a covering area of the cold cathode tube 17-N from the front side is smaller than a case where the holding protrusion has a fixed width. This means that an effective light emitting area in the cold cathode tube 17-N increases, which increases an amount of light taken from the cold cathode tube 17-N. Also, besides the holding protrusion 41-N, the arm portion 39-N and the guide portion are tapered over the entire length, and thus a covering area of the cold cathode tube 17 by the arm portion 39-N, the holding protrusion 41-N, and the guide portion surrounding the outer peripheral surface of the cold cathode tube 17-N is circumferentially minimized, which is further effective for increasing the amount of light. A lamp gripping portion simply formed to be narrow may provide insufficient strength, but in this embodiment, the outer edge portion of the lamp gripping portion 28-N ensures an original width, thereby ensuring sufficient strength.

Next, an operation when each cold cathode tube 17-N is lit will be described. As shown in FIG. 40, the holding protrusions 41-N of the lamp gripping portion 28-N that covers the cold cathode tube 17-N from the front side (light emission side) are tapered toward the inner ends, and thus a covering area of the cold cathode tube 17-N by the holding protrusion 41-N as viewed from the front side is smaller than a case where the holding protrusion has a fixed width. This can increase an effective light emitting area of the cold cathode tube 17-N and ensure a sufficient amount of light taken from the cold cathode tube 17-N, and restricts the holding protrusion 41-N that covers the cold cathode tube 17-N from the front side from being visually identified as a dark portion. The holding protrusion 41-N (lamp gripping portion 28-N) has a symmetrical shape, and the tapered surfaces 41a have the same inclination angle, which is further effective for reducing luminance unevenness. Further, as shown in FIG. 41, the extended tapered surface 39a is formed so that the holding protrusion 41-N and also the arm portion 39-N and the guide portion are tapered over the entire lengths, and thus a covering area of the cold cathode tube 17-N by the arm portion 39-N, the holding protrusion 41-N, and the guide portion surrounding the outer peripheral surface of the cold cathode tube 17-N is circumferentially minimized, which is further effective for increasing the amount of light.

Sixteenth Embodiment

A sixteenth embodiment of the present invention will be described with reference to FIG. 42 or 43. In the fifteenth embodiment, a shape of a lamp gripping portion 28-O is changed. In the fifteenth embodiment, the same components as in the first embodiment are denoted by the same reference numerals with a suffix -O added to the ends, and overlapping descriptions on structures, operations, and advantages will be omitted.

Figure 42:
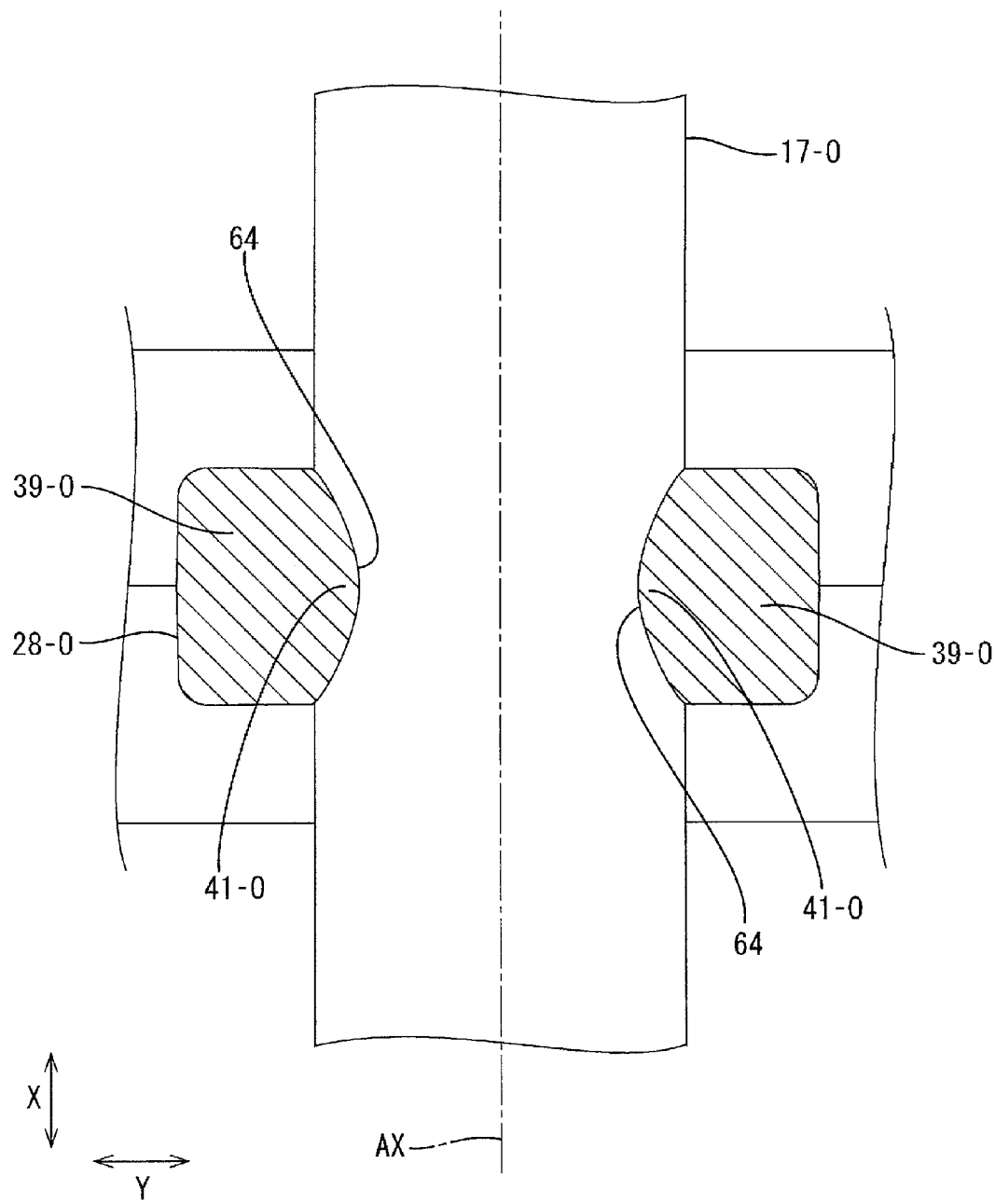
FIG. 42 is a plan sectional view of a holding protrusion on a lamp gripping portion of a lamp clip according to a sixteenth embodiment of the present invention.

As shown in FIG. 42, a holding protrusion 41-O of the lamp gripping portion 28-O has an inner peripheral surface formed with a curved surface 64, and is thus tapered toward a cold cathode tube 17-O. Specifically, the holding protrusion 41-O has a width progressively decreasing from an outer end side toward an inner end side, that is, toward a central axis AX of the cold cathode tube 17-O. An arm portion 39-O is also tapered continuously with the holding protrusion 41-O. This can reduce a covering area of the cold cathode tube 17-O by the lamp gripping portion 28-O, and ensure a sufficient amount of light taken from the cold cathode tube 17-O.

Figure 43:
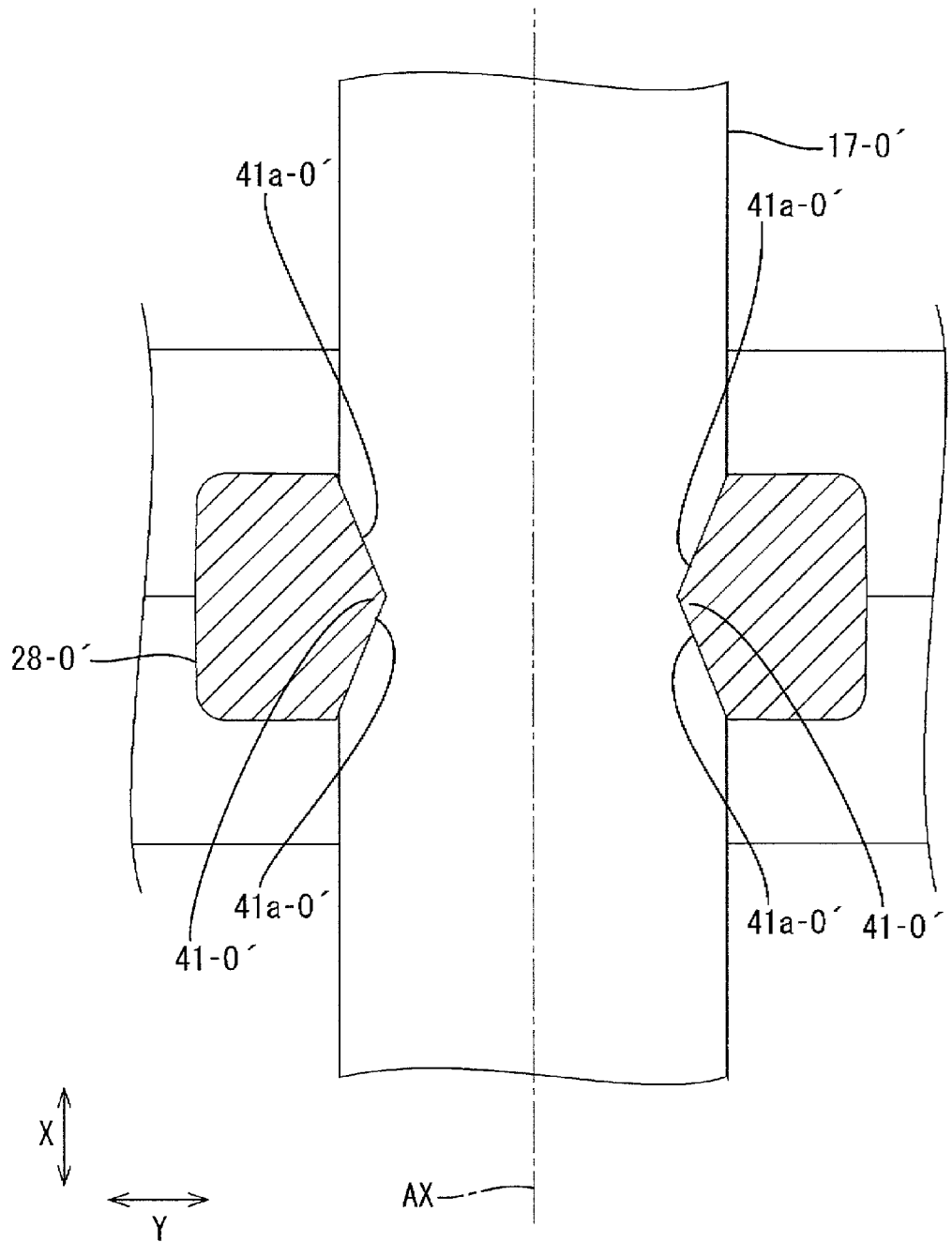
FIG. 43 is a plan sectional view of a holding protrusion according to a variation aspect of the sixteenth embodiment.

As a further variation aspect, as shown in FIG. 43, a holding protrusion 41-O' may have a substantially triangular sectional shape, and tapered surfaces 41a-O' may be directly connected. An angle formed by the tapered surfaces 41a-O' is preferably an acute angle. This can further reduce a covering area of a cold cathode tube 17-O' by a lamp gripping portion 28-O', which is further suitable for increasing an amount of light.

Further Embodiments

The present invention is not limited to the embodiments described in the above descriptions and the drawings, and for example, the following embodiments also fall within a technical scope of the present invention.

Figure 44:
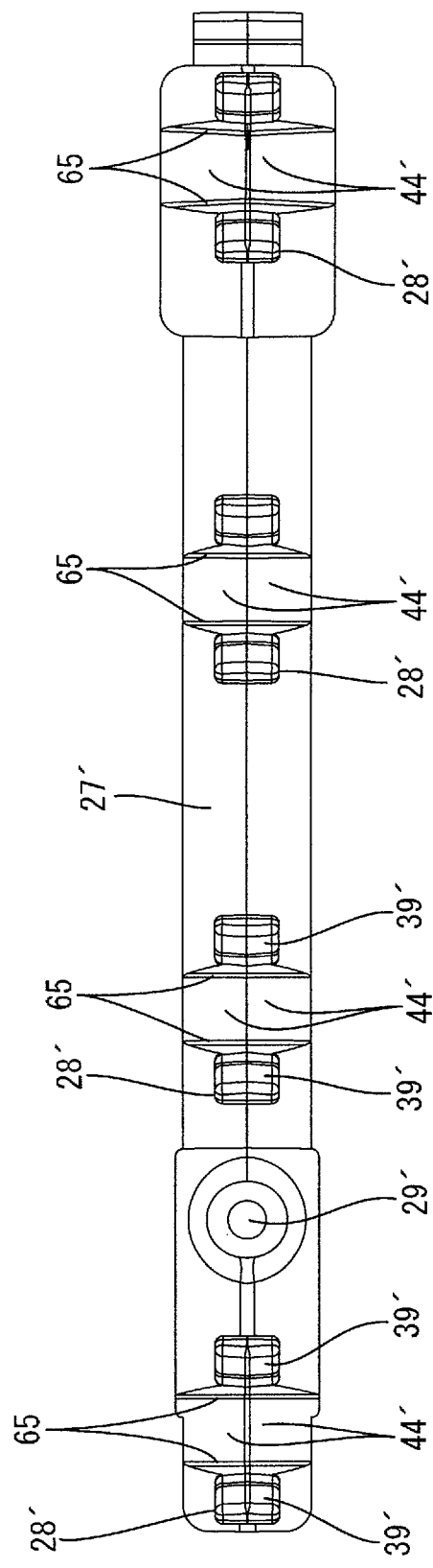
FIG. 44 is a front view of a lamp clip of further embodiments (1) and (5)
Figure 45:
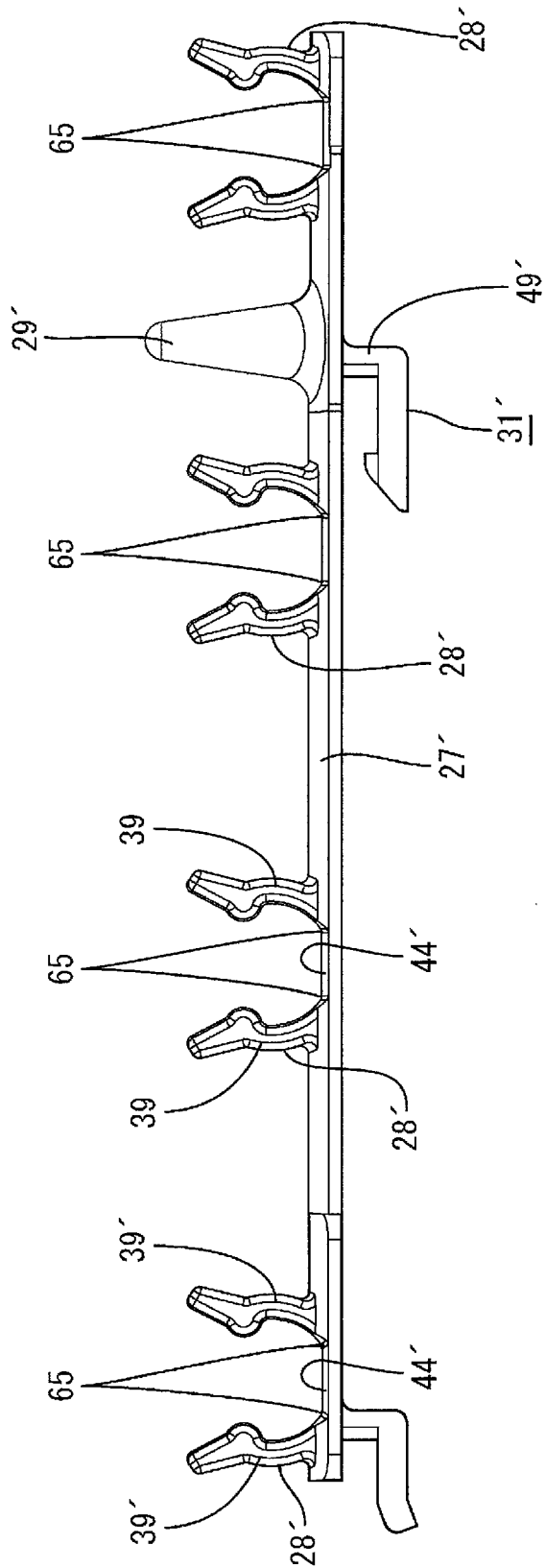
FIG. 45 is a plan view of the lamp clip of the further embodiments (1) and (5)

(1) Besides the above-described embodiments, the number, shape, arrangement of lamp gripping portions on a lamp clip may be appropriately changed. Specifically, it may be allowed that a shape of an inner peripheral surface of a lamp gripping portion 28' is changed, and as shown in FIGS. 44 and 45, auxiliary inclined surfaces 65 sloping upward toward an arm portion 39' are provided in opposite side end positions of inclined surfaces 44' of an inner peripheral surface of the lamp gripping portion 28'. The number of lamp gripping portions may be three or less or five or more. A pair of arm portions that constitute the lamp gripping portion may be asymmetrical to each other. The lamp gripping portion may include one arm portion, and a cold cathode tube may be laterally mounted along a plate surface of a main body. The lamp gripping portion may be placed in a position at a predetermined height raised from the main body.

(2) In the fifteenth and sixteenth embodiments, the entire lamp gripping portion is tapered to form the tapered surface and the extended tapered surface, but the extended tapered surface may be omitted except a tapered surface formed on a holding protrusion, that is, only the holding protrusion may be tapered in the present invention. Further, for example, the tapered surface and the extended tapered surface may be left at the center of the cold cathode tube in the lamp gripping portion, specifically, in a region on a front side of a reference surface parallel to the chassis passing through the center of the cold cathode tube, but the extended tapered surface may be omitted in a region on a back side. This can ensure at least a sufficient amount of light emitted from the cold cathode tube to the front side, and a dark portion is less likely to be seen.

(3) In the first embodiment, the inclined surface (relief surface) and the extended inclined surface (extended relief surface) are formed over the entire inner and outer peripheral surfaces of the lamp gripping portion, but the extended inclined surface may be omitted except an inclined surface formed on a bottom surface in the present invention. Further, a forming range of the extended inclined surface in the lamp gripping portion may be appropriately changed. Both the inclined surface and the extended inclined surface may be omitted.

(4) Besides the above-described embodiments, the number, shape, arrangement of support pins on a lamp clip may be appropriately changed. Specifically, a plurality of support pins may be provided. The support pin may be formed into a pyramidal shape. The support pin may be provided in an eccentric position in a width direction of a main body. The support pin may be provided in a middle position in a length direction of the main body.

(5) Besides the above-described embodiments, the number, shape, arrangement of mounting portions on a lamp clip may be appropriately changed. Specifically, placement of a second mounting portion 31' may be changed so that, as shown in FIGS. 44 and 45, a base portion 49' of the second mounting portion 31' is connected to a position directly on a back side of a support pin 29' of a main body 27'. Three or more mounting portions may be provided. It may be allowed that the first mounting portion does not protrude laterally from an edge portion of the main body. With the change of the mounting portion, the number, shape, arrangement of mounting holes in a chassis and passage holes in a reflection sheet may be appropriately changed.

(6) Also, for example, an extending portion that constitutes each mounting portion may be extended along the width direction of the main body, and the main body may be slid along the width direction and thus attached to and detached from the chassis.

(7) Besides the above-described embodiments, the shape of the main body on the lamp clip may be appropriately changed. Specifically, the main body may be formed into a square shape on the plan view, a circular or an oval shape, or a polygonal shape other than a rectangular shape on the plan view in the present invention. Further, the main body may be mounted to the chassis with a length direction being in parallel with a reference line (length direction of a cold cathode tube). In this case, a plurality of lamp gripping portions may grip one cold cathode tube.

(8) In the first embodiment, the protruding portion has the pair of inclined surfaces along the width direction, but a pair of inclined surfaces along the length direction may be added on opposite edge portions in the length direction of the main body in the present invention. The sectional shape of the protruding portion may be appropriately changed besides the shapes in the first, sixth and seventh embodiments. At this time, the protruding portion may have an asymmetrical sectional shape. The protruding portion together with the inclined surfaces may be omitted. The pedestal portion or the protruding portion may be omitted from the main body.

(9) Besides the above-described embodiments, the number and arrangement of lamp clips provided on the chassis may be appropriately changed. Specifically, as shown in FIG. 46, two lamp clips 18" may be arranged along a long-side direction of a chassis 14" in a position adjacent to a reference line. At this time, a support part 66 including a configuration without a lamp gripping portion 28" from a lamp clip 18" and having only a support pin 29" may be provided separately from the lamp clip 18". Further, the number of provided lamp clips or spaces between the lamp clips in the long-side direction of the chassis may be changed, and also those in the short-side direction of the chassis may be changed.

(10) In the above-described embodiments, the reference line is set in parallel with the length direction of the cold cathode tube, but the reference line may be set perpendicularly to the length direction of the cold cathode tube in the present invention.

(11) In the above-described embodiments, the cold cathode tube is used as a light source, but for example, a different type of light source such as a hot cathode tube may be used in the present invention.

(12) In the above-described embodiments, the chassis is formed of sheet metal, but may be molded of resin.

(13) In the above-described embodiments, the TFT is used as the switching element of the liquid crystal display device, but the present invention may be applied to a liquid crystal display device using a switching element other than the TFT (for example, thin film diode (TFD)), and may be applied to a liquid crystal display device for a monochrome display other than a liquid crystal display device for a color display.

(14) In the above-described embodiments, the liquid crystal display device using a liquid crystal panel as a display panel is exemplified, but the present invention may be applied to a display device using a different type of display panels.

(15) In the above-described embodiments, the television receiver apparatus including the tuner is exemplified, but the present invention may be applied to a display device without a tuner.

(16) In the first, eighth, tenth and eleventh embodiments, the pair of inclined surfaces or curved surfaces with a vertex in the middle position in the width direction are formed on the bottom surface of the lamp gripping portion, but for example, one inclined surface or curved surface with a vertex set at one edge portion of opposite edge portions in the width direction of the lamp gripping portion and sloping downward from the vertex toward the other edge portion may be formed in the present invention.

(17) In the first and fourth embodiments, the first mounting portion and the second mounting portion have different widths and lengths, and correspondingly thereto, the first mounting hole and the second mounting hole have different widths and lengths, but for example, the first mounting portion and the second mounting portion, and the first mounting hole and the second mounting hole may have the same length and different widths, or the same width and different lengths in the present invention. Also in this case, sizes of the mounting portions and the mounting holes are different in a direction perpendicular to an inserting direction of the first mounting portion and the second mounting portion into the first mounting hole and the second mounting hole, and a larger mounting portion is larger than a smaller mounting hole and cannot be inserted thereinto, thereby restricting the lamp clip from being mounted in a wrong mounting direction.

(18) In the first and fourth embodiments, the extending portions of the mounting portions have different widths and lengths, but it may be allowed that the extending portions have the same width and length, at least one of widths (sizes in the X-axis direction in the drawings) or thicknesses (sizes in the Y-axis direction in the drawings) of the base portions are different, and the sizes of the mounting holes are different correspondingly thereto in the present invention. In short, it is sufficient that the sizes in the direction perpendicular to the inserting direction of the mounting portions into the mounting holes are different.

(19) As a further variation aspect of the fourth embodiment, a control portion partially protruding in a length direction may be provided in at least one of the mounting portions, and a notch that allows insertion of the control portion may be provided in a mounting hole corresponding to the mounting portion having the control portion among the mounting holes.

(20) In the above-described embodiments, the protruding portion that constitutes the main body has the angular shape with the pair of inclined surfaces or curved surfaces, but for example, a plurality of angular portions may be arranged on the front side of the pedestal portion to form a protruding portion having three or more inclined surfaces or curved surfaces in the present invention. The protruding portion may have a shape other than an angular shape in the present invention.

The invention claimed is:

1. A lamp holder comprising:
a main body mounted to a mounting member;
a lamp gripping portion provided on the main body and arranged to hold a lamp;
a first mounting portion protruding from the main body so as to extend toward the mounting member and to be inserted in a first mounting hole defined in the mounting member so that a rim of the first mounting hole is sandwiched between the first mounting portion and the main body; and
a second mounting portion protruding from the main body so as to extend toward the mounting member and to be inserted in a second mounting hole defined in the mounting member so that a rim of the second mounting hole is sandwiched between the second mounting portion and the main body, the second mounting portion having a size different from a size of the first mounting portion; wherein each of the first mounting portion and the second mounting portion includes:
a base portion protruding from the main body so as to extend toward the mounting member; and
an extending portion protruding from the base portion and extending along the main body;
the extending portion of one of the first mounting portion and the second mounting portion that has a greater size is arranged to be inserted in only one of the first mounting hole and the second mounting hole;
the extending portion of the first mounting portion and the extending portion of the second mounting portion are inserted into a corresponding one of the first mounting hole and the second mounting hole to be slid in an extending direction in which the extending portions extend and the rim of the first mounting hole and the rim of the second mounting hole are sandwiched between the extending portions and the main body, respectively;
the first mounting portion and the second mounting portion have different sizes measured in a sliding direction and measured in a direction perpendicular to the sliding direction;
the first mounting portion is arranged to protrude in the sliding direction beyond a front edge of the main body;
the first mounting portion has a size in the direction perpendicular to the sliding direction that is greater than a size of the second mounting portion in the direction perpendicular to the sliding direction; and
the first mounting portion includes a guide portion at a distal end portion thereof, the guide portion being arranged such that the distal end portion of the first mounting portion is bent towards the mounting member.

2. The lamp holder according to claim 1, wherein the main body has a substantially rectangular shape with a length direction defined to match the sliding direction.

3. The lamp holder according to claim 1, wherein the guide portion is arranged such that a distance to the main body increases toward a distal end.

4. The lamp holder according to claim 2, wherein a handling portion that protrudes higher than the lamp gripping portion is eccentrically located on a rear side of the main body with respect to the sliding direction so as to be accessible during mounting and removal of the lamp holder.

5. The lamp holder according to claim 4, wherein the handling portion is arranged so as to support a planar optical member placed in a position opposite the mounting member via the lamp.

6. An illumination device comprising:
a plurality of lamps;
a mounting member including a first mounting hole and a second mounting hole in different sizes, the mounting member housing the lamps; and
a lamp holder including:
a main body mounted to the mounting member;
a lamp gripping portion that protrudes from the main body toward the lamp so as to grip the lamp;
a first mounting portion protruding from the main body toward the mounting member and being inserted in the first mounting hole such that a rim of the first mounting hole is sandwiched between the first mounting portion and the main body; and
a second mounting portion protruding from the main body toward the mounting member and being inserted in the second mounting hole such that a rim of the second mounting hole is sandwiched between the second mounting portion and the main body; wherein each of the first mounting portion and the second mounting portion includes:
- a base portion protruding from the main body so as to extend toward the mounting member; and
- an extending portion protruding from the base portion and extending along the main body and the extending portion of one of the first mounting portion and the second mounting portion that has a greater size is arranged to be inserted in only one of the first mounting hole and the second mounting hole;

the extending portion of the first mounting portion and the extending portion of the second mounting portion are inserted into a corresponding one of the first mounting hole and the second mounting hole to be slid in an extending direction in which the extending portions extend;

the first mounting portion and the second mounting portion have different sizes measured in a sliding direction and measured in a direction perpendicular to the sliding direction;

one of the extending portion of the first mounting portion and the extending portion of the second mounting portion which has a largest size is larger than one of the first mounting hole and the second mounting hole having a smallest size;

the first mounting portion is arranged to protrude in the sliding direction beyond a front edge of the main body;

the first mounting portion has a size in the direction perpendicular to the sliding direction that is greater than a size of the second mounting portion in the direction perpendicular to the sliding direction; and the first mounting portion includes a guide portion at a distal end portion thereof, the guide portion being arranged such that the distal end portion of the first mounting portion is bent towards the mounting member.

7. The illumination device according to claim 6, further comprising a planar optical member placed in a position opposite the mounting member via the lamp and a plurality of the lamp holders mounted to the mounting member, wherein:
- each of the lamp holders includes a supporting portion that supports the optical member, the supporting portion being eccentrically located on the main body; and
- the lamp holders are arranged such that the supporting portions thereof are eccentrically positioned on a reference line side, the reference line being defined along a surface of the optical member.

8. The illumination device according to claim 6, further comprising a planar optical member placed in a position opposite the mounting member via the lamp and a plurality of the lamp holders mounted to the mounting member, wherein:
- each of the lamp holders includes a supporting portion that supports the optical member, the supporting portion being eccentrically located on the main body; and
- the lamp holders are arranged such that a distance between a reference line defined along a surface of the optical member and the supporting portion is shorter than a distance between the reference line and a center of the main body.

9. The illumination device according to claim 7, wherein the mounting member includes an area in which the lamp holders are mounted, the area being divided by the reference line into a first area and a second area;
- a first group of the lamp holders is mounted in the first area and a second group of the lamp holders is mounted in the second area; and
- the first group of the lamp holders and the second group of the lamp holders are mounted differently.

10. The illumination device according to claim 7, wherein the reference line is defined substantially parallel to a length direction of each lamp.

11. The illumination device according to claim 10, wherein:
- the main body of each lamp holder has a rectangular shape, the length direction of which crosses the reference line; and
- a plurality of the lamp gripping portions are provided so as to grip the different lamps.

12. The illumination device according to claim 7, wherein:
- the main body has a rectangular shape; and
- the supporting portion is eccentrically provided on the main body off the center in the length direction.

13. The illumination device according to claim 12, wherein:
- a plurality of the lamp gripping portions are spaced from each other in the length direction of the main body; and
- the supporting portion is provided between the lamp gripping portions.

14. The illumination device according to claim 6, wherein:
- the lamp holder includes a plurality of the lamp gripping portions that grip the different lamps; and
- the lamp gripping portions are provided at different intervals.

15. The illumination device according to claim 14, wherein:
- the lamps are mounted in a central area of the mounting member at a higher distribution density than in other areas of the mounting member; and
- the lamp gripping portions are provided in the central area of the mounting member at different intervals including a first greatest interval and a first smallest interval, and the lamp gripping portions are provided in the other areas of the mounting member at different intervals including a second greatest interval and a second smallest interval; and
- the first greatest interval in the central area is smaller than the second smallest interval in the other areas.

16. A display device comprising:
an illumination device according to claim 6; and
a display panel provided in front of the illumination device.

17. The display device according to claim 16, wherein the display panel is a liquid crystal panel constructed such that a liquid crystal is sealed between a pair of substrates.

18. A television receiver apparatus comprising a display device according to claim 16.

* * * * *